(12) United States Patent
Fujita et al.

(10) Patent No.: US 7,971,939 B2
(45) Date of Patent: Jul. 5, 2011

(54) SEAT STRUCTURE

(75) Inventors: Etsunori Fujita, Hiroshima (JP); Yumi Ogura, Hiroshima (JP); Yoshiyuki Ueno, Ichihara (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 55 days.

(21) Appl. No.: 11/547,329

(22) PCT Filed: Apr. 1, 2005

(86) PCT No.: PCT/JP2005/006456
§ 371 (c)(1),
(2), (4) Date: Apr. 19, 2007

(87) PCT Pub. No.: WO2005/094632
PCT Pub. Date: Oct. 13, 2005

(65) Prior Publication Data
US 2007/0236071 A1     Oct. 11, 2007

(30) Foreign Application Priority Data
Apr. 2, 2004   (JP) .................................. 2004-109923

(51) Int. Cl.
*B60N 2/50*     (2006.01)
(52) U.S. Cl. ................................................. 297/452.56
(58) Field of Classification Search ............. 297/452.56, 297/452.52, 452.53, 452.54, 452.13
See application file for complete search history.

(56) References Cited

U.S. PATENT DOCUMENTS 4,883,320 A * 11/1989 Izumida et al. .......... 297/452.56
5,013,089 A    5/1991 Abu-Isa et al.
(Continued)

FOREIGN PATENT DOCUMENTS
JP          U-62-142950          9/1987
(Continued)

OTHER PUBLICATIONS

Notice of Reasons for Rejection issued in Japanese Patent Application No. 2004-109923; mailed Jun. 15, 2010; with English-language translation.

*Primary Examiner* — Peter R. Brown
(74) *Attorney, Agent, or Firm* — Oliff & Berridge, PLC

(57) ABSTRACT

A seat structure which can ameliorate fatigue of a sitting person in accordance with a long period of sitting is provided. In a vehicle seat 10, a back edge side of a lower layer sheet 50 of a cushion material 20, of which a front edge side is fixed to a front edge side of a sitting portion frame 14, is resiliently connected to a back edge side of the sitting portion frame 14 via a movable frame 34 and a torsion bar 46, which is a resilient member. The cushion material 20 has a spring zero characteristic in which a spring constant of a portion that supports a protrusion portion of the sitting person is smaller than a spring constant of other portions. This vehicle seat 10 makes smaller the energy of vibrations which are transmitted to a spinal column portion of the sitting person through the sitting portion frame 14, and peripheral portions thereof convert vibrations corresponding to fluctuations in the body and transmit these through the sitting portion frame 14. α waves of 10 Hz to 12 Hz, which occur in a relaxed waking state, are caused in the brain of the sitting person. Vibrations in a resonance frequency region are attenuated in amplitude and transmitted to the sitting person.

10 Claims, 43 Drawing Sheets

U.S. PATENT DOCUMENTS

| | | | |
|---|---|---|---|
| 5,076,643 A * | 12/1991 | Colasanti et al. | 297/284.6 |
| 5,393,126 A * | 2/1995 | Boulva | 297/452.56 |
| 5,624,161 A | 4/1997 | Sorimachi et al. | |
| 5,775,773 A * | 7/1998 | Schuster et al. | 297/284.1 |
| 5,775,779 A * | 7/1998 | Abu-Isa et al. | 297/452.56 |
| 6,264,279 B1 * | 7/2001 | Chow | 297/452.56 |
| 6,302,487 B1 * | 10/2001 | Fujita et al. | 297/452.56 |
| 6,478,381 B1 * | 11/2002 | Cramb et al. | 297/452.13 |
| 6,485,103 B1 * | 11/2002 | Yamada et al. | 297/452.56 |
| 6,550,859 B1 * | 4/2003 | Andersson et al. | 297/216.14 |
| 6,854,805 B2 * | 2/2005 | Fujita et al. | 297/452.56 |
| 6,932,432 B2 * | 8/2005 | Kawasaki | 297/452.56 |
| 7,044,551 B2 * | 5/2006 | Fujita et al. | 297/284.4 |
| 7,090,300 B2 * | 8/2006 | Fujita | 297/452.49 |
| 2002/0033630 A1 * | 3/2002 | Takata | 297/452.56 |
| 2002/0060493 A1 * | 5/2002 | Nishino et al. | 297/452.56 |
| 2002/0096932 A1 * | 7/2002 | Fujita et al. | 297/452.56 |
| 2002/0135218 A1 * | 9/2002 | Fujita et al. | 297/452.56 |
| 2003/0116999 A1 | 6/2003 | Fujita et al. | |
| 2003/0193231 A1 * | 10/2003 | Fujita et al. | 297/452.56 |
| 2003/0201659 A1 * | 10/2003 | Yasuda et al. | 297/216.13 |
| 2006/0006640 A1 * | 1/2006 | Knight | 285/81 |

FOREIGN PATENT DOCUMENTS

| | | |
|---|---|---|
| JP | A-07-322934 | 12/1995 |
| JP | A-2002-253381 | 9/2002 |
| JP | A 2003-180481 | 7/2003 |
| JP | A-2003-182427 | 7/2003 |
| JP | A-2003-259933 | 9/2003 |
| WO | WO 2004/026080 A1 | 4/2004 |

* cited by examiner

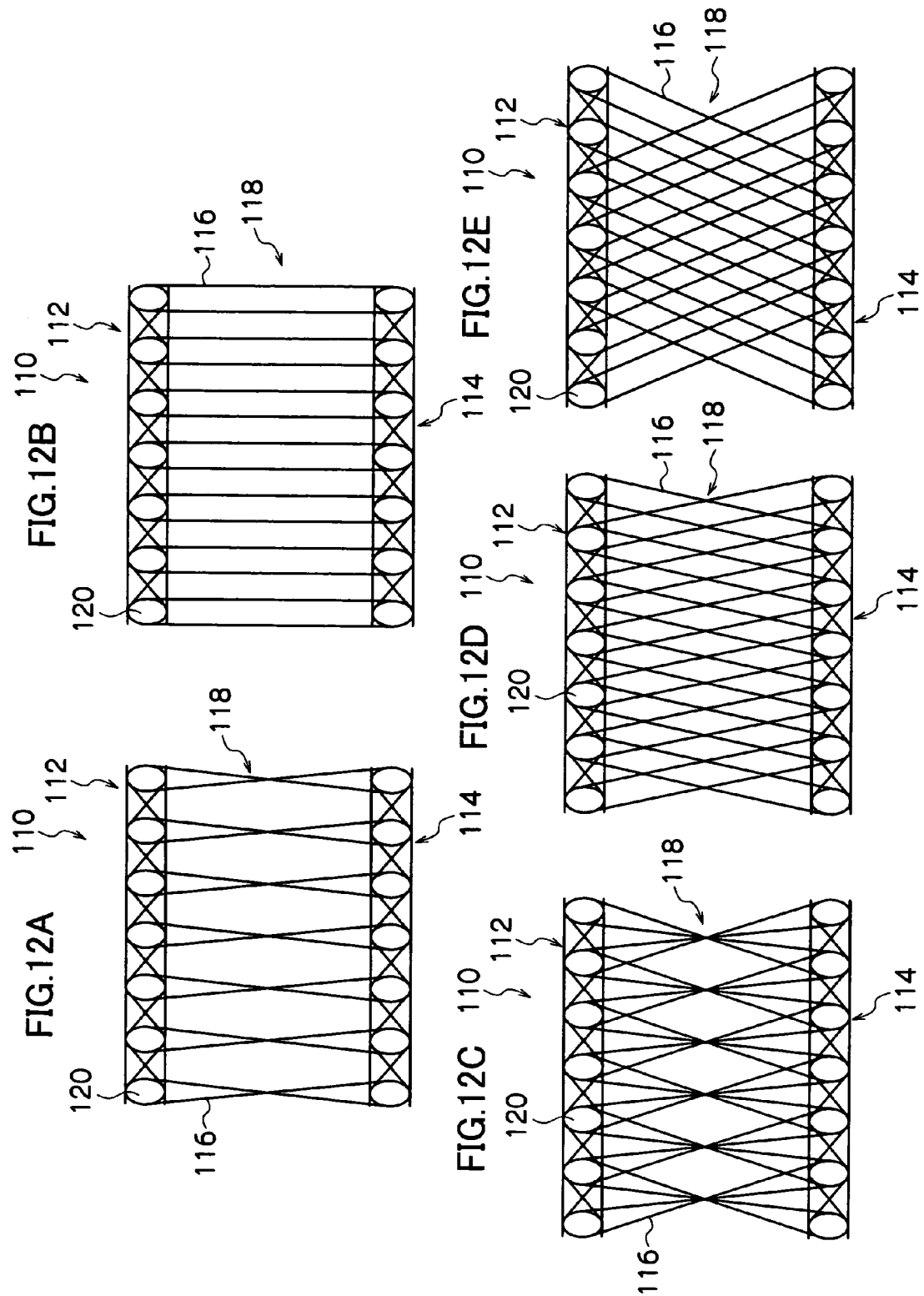

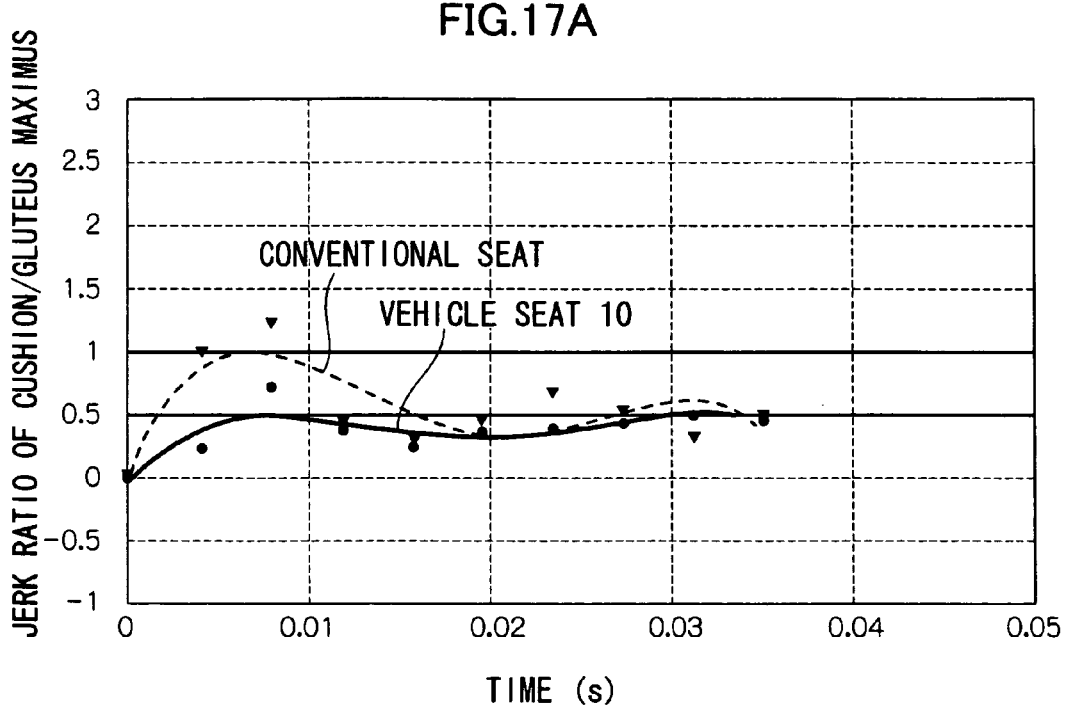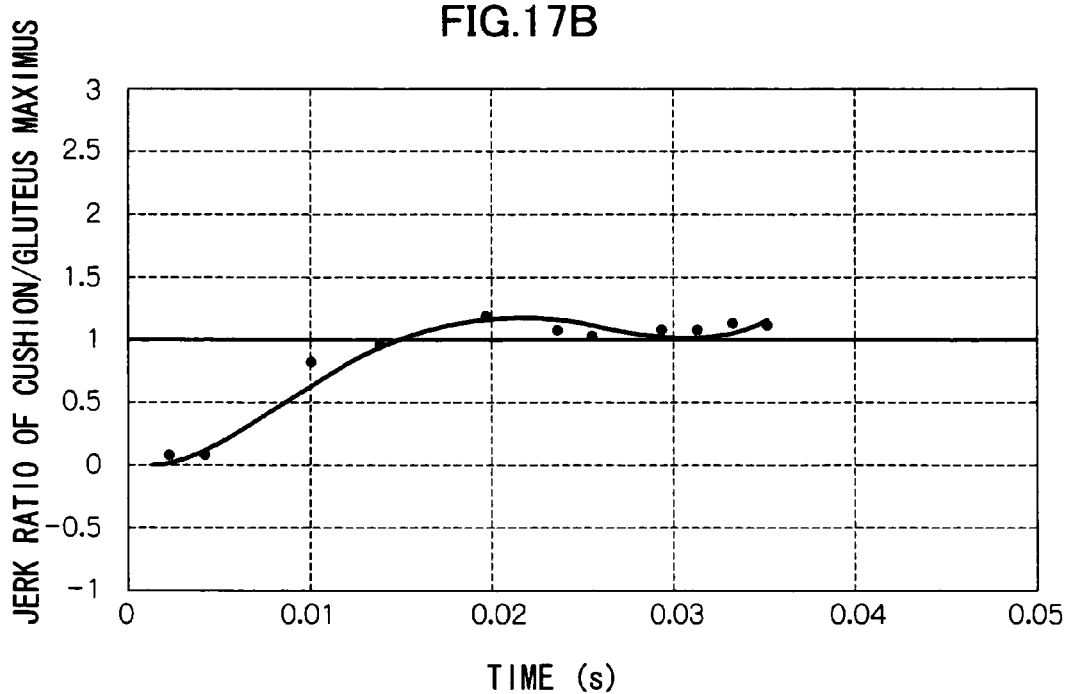

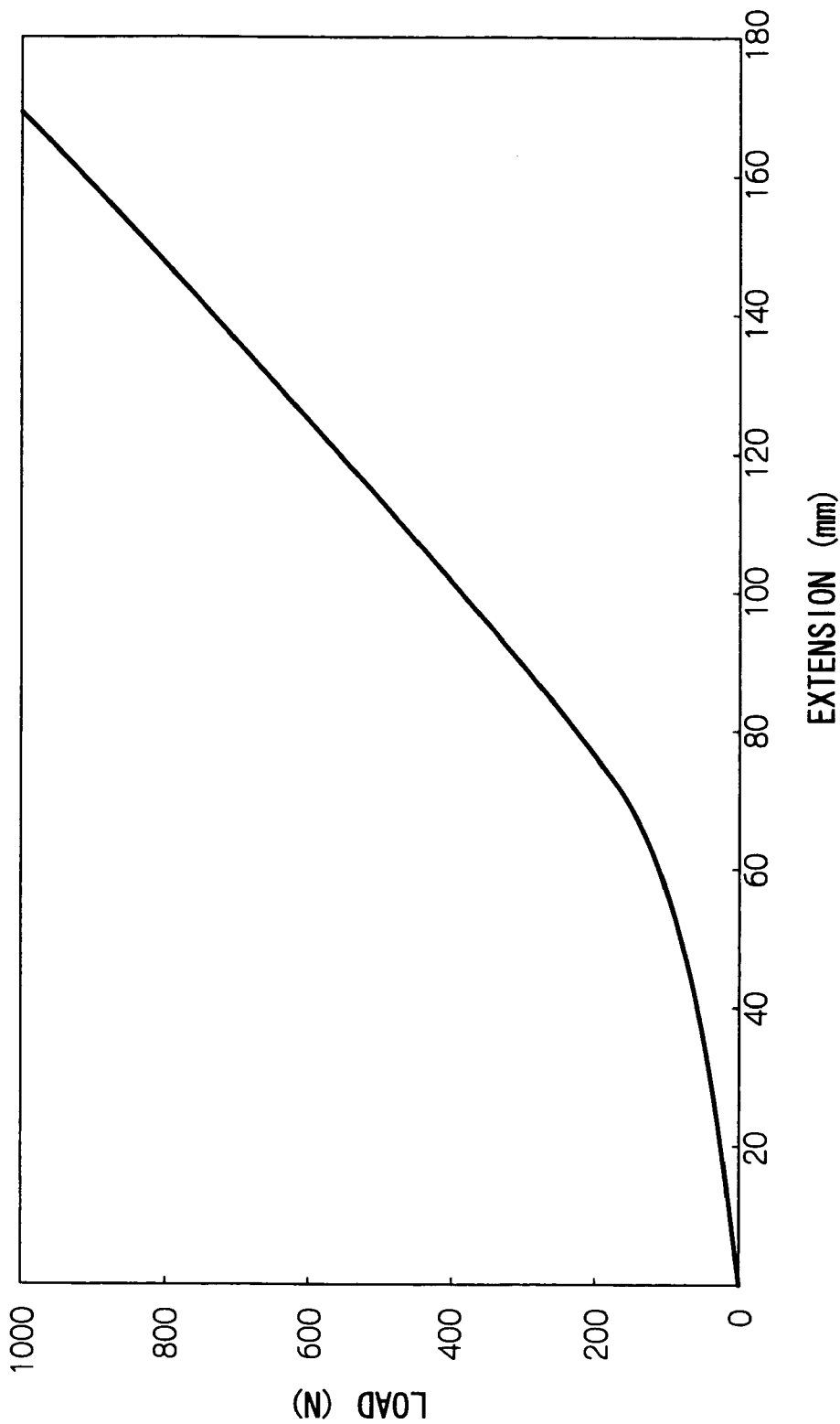
FIG.19 LOADING-EXTENSION CHARACTERISTIC OF SINGLE UPPER LAYER SHEET

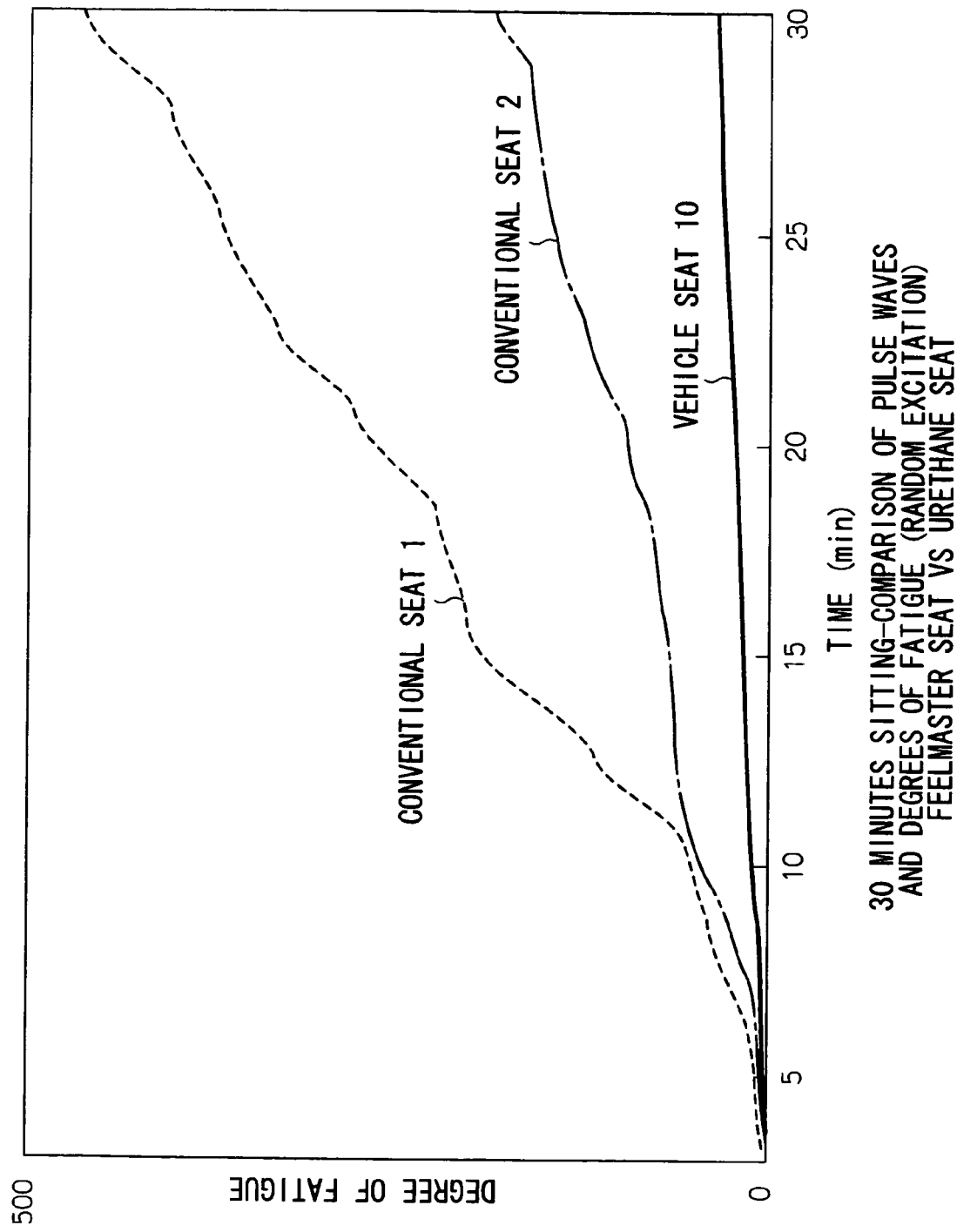

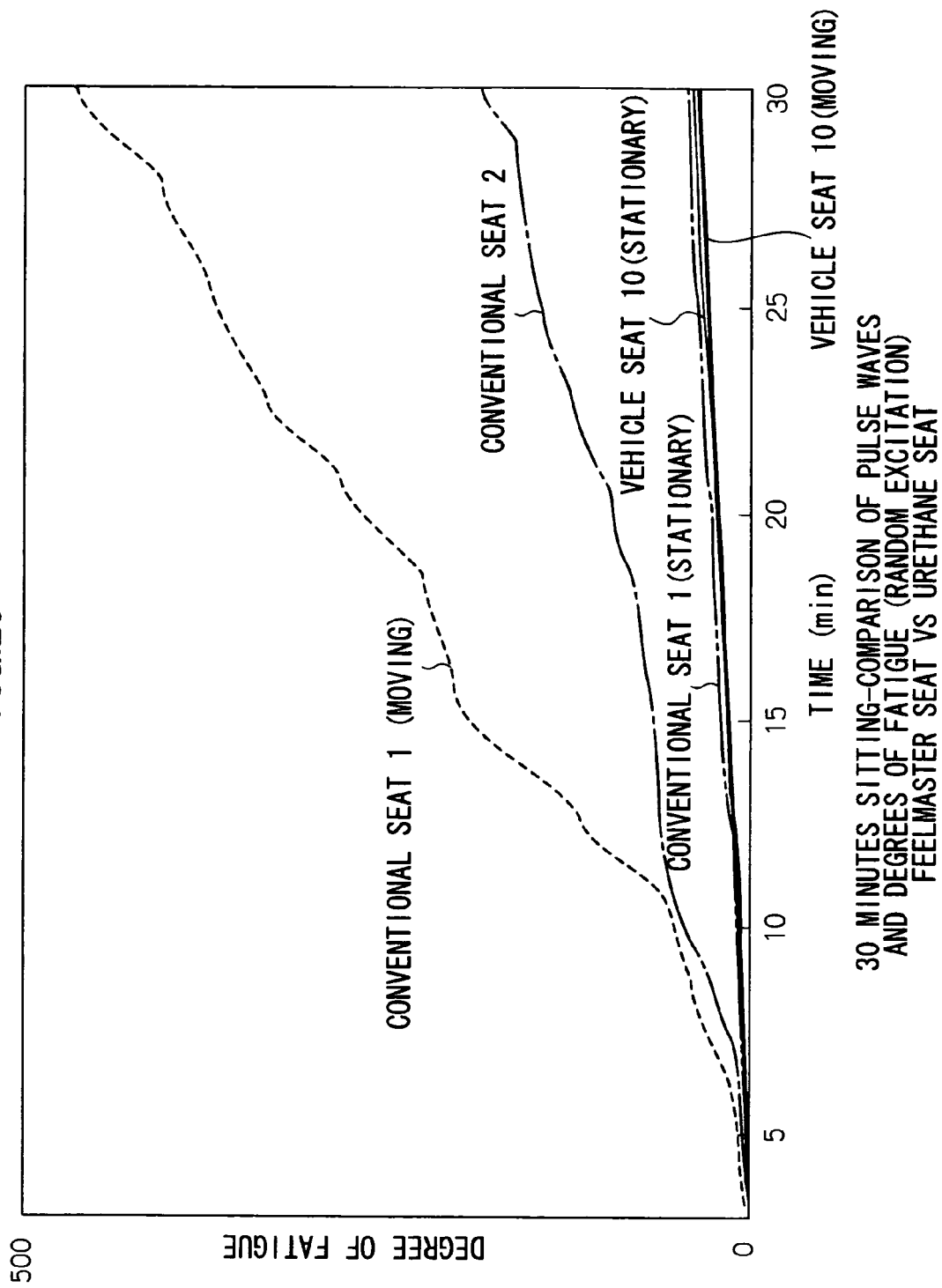

FRONT SIDE

SEAT STRUCTURE

TECHNICAL FIELD

The present invention relates to a seat structure, and particularly relates to a seat structure of a vehicle seat which is mounted at a vehicle such as an automobile or the like.

BACKGROUND ART

As a seat for a vehicle, seats which have a cushion material formed of polyurethane foam (below referred to as urethane) have been known. For the cushion structure of such a vehicle seat, a structure has been widely employed in which a cushion material made of urethane is mounted on a spring material, such as Contour Mat (trade name) or the like, or a plate or the like provided at a sitting portion frame, a back portion frame or the like, and these are covered in a fabric material.

Consequently, it has been known that the shape (a design form) and resilience characteristics of the cushion material and compression characteristics of the polyurethane foam greatly affect characteristics of body pressure distribution from a sitter, vibration absorption and suchlike. By laminating urethanes having various characteristics to structure a cushion material, it is possible to obtain a cushion material provided with spring characteristics (resilience characteristics) close to the spring characteristics of muscles of a buttock portion and the like of a sitter. However, with such structures, there have been problems in that the restoring force tends to be insufficient or that the weight thereof is heavy.

Accordingly, seats have been considered (see, for example, patent reference 1 to patent reference 4) in which, as a cushion material to replace urethane, a pair of ground fabrics and a three-dimensional woven fabric or two-dimensional woven fabric, which is formed by connective fibers arranged between ground fabrics, are stretched onto a back portion frame to constitute a cushion structure. Such a cushion material formed with a three-dimensional woven fabric or two-dimensional woven fabric is an elastic structure constituted with elastic fibers which are resistant to permanent set in fatigue, has a thinner form than urethane, and exhibits resilience characteristics as a substitute for urethane.

In a seat structure of the above-mentioned vehicle seat or the like, it is desirable to ameliorate fatigue caused by a long period of sitting. Here, ameliorating fatigue does not mean dulling of the biological reactions to fatigue, which are signals to the brain of the sitter demanding rest, but rather suppressing the accumulation of fatigue in accordance with sitting and, particularly, the rapid onset of fatigue. Principal characteristics of a seat structure that affect fatigue include three characteristics: body pressure distribution, posture maintenance and vibration absorption. Now, the characteristics of body pressure distribution and posture maintenance affect stresses on the sitter which are based on pressure forces, restraint forces and the like that act on the sitter, and these stresses principally affect peripheral fatigue. On the other hand, vibration absorption characteristics have an influence on stress based on the acceleration of vibrations transmitted to the sitter, and this stress principally affects peripheral fatigue in conditions when the whole body is exposed to vibrations.

Further, peripheral fatigue of a sitter is ameliorated by fluctuating movements. Such fluctuations are biological rhythm oscillations and are ordinarily non-linear oscillations. Stress as described above is ameliorated by fluctuations in blood flow, body movements and the like which are based on these biological rhythms, and peripheral fatigue is ameliorated. Therefore, at a seat structure, it is desirable to allow (not hinder) fluctuations of a sitter, and to more proactively apply stimuli to the sitter which match patterns of fluctuating movement of the sitter.

However, conventional seats as are described above have simply been formed so as to reduce body pressure at particular regions of a sitter and improve absorption of vibrations, impacts and the like, and consideration has not been given to ameliorating fatigue on the basis of the mechanisms of fatigue.

Patent reference 1: The specification of U.S. Pat. No. 5,013,089
Patent reference 2: Japanese Patent Application Laid-open (JP-A) No. 2002-177099
Patent reference 3: JP-A No. 2002-219985
Patent reference 4: JP-A No. 2003-182427

DESCRIPTION OF THE INVENTION

Problem to be Solved by the Invention

In consideration of the circumstances described above, an object of the present invention is to provide a seat structure which can ameliorate peripheral fatigue of a sitter that accompanies a long period of sitting.

Means for Solving the Problem

A seat structure relating to a first aspect of the present invention is a seat structure provided with: a sitting portion frame; and a cushion material including a sheet material, of which a front edge side is fixed at a front edge side of the sitting portion frame and a back edge side is connected to a back edge side of the sitting portion frame via a resilient member, the cushion material including spring characteristics in which, in a stationary sitting state, a spring constant of a portion that supports a protrusion portion of a sitter is smaller than a spring constant of another portion.

At the seat structure relating to the first aspect of the present invention, in a state in which a person is seated stationary on cushion material, that is, an equilibrium state without load variations, there is a spring characteristic (below referred to as a spring zero characteristic) in which a spring constant below hipbone joints, which are protruding portions of the sitter, is smaller than a spring constant of other portions of the sitter. The spring constant below the hipbone joints is, for example, 0 N/mm to 50 N/mm. Consequently, the seat structure, which is structured with the back edge side of the sheet material of the cushion material connected to the sitting portion frame via the resilient member, is a vibration system of which mass is large and a spring constant is small. That is, a vibration system of which an attenuation ratio is extremely large, below a hipbone joint, at which body weight of the sitter is concentrated. Meanwhile, at a portion other than below the hipbone joints, there is a vibration system of which the attenuation ratio is comparatively small and the spring constant is comparatively large, that is, having sufficient restoring force.

Thus, when a vibration is input through the sitting portion frame, sense of bottoming out is suppressed by the small attenuation ratio at portions other than below the hipbone joints and, because of the large attenuation ratio based on the above-described spring zero characteristic, vibration below the hipbone joints of the buttock portion is reduced and rebound from the seat is suppressed. Consequently, relative displacement between the seat and the sitter is kept small. Therefore, because pressure variations due to the vibration input are small, changes in posture of the sitter are not generated but the seat and the sitter move integrally. Consequently, even when a vibration in a resonance frequency region of the spinal column of the sitter is input (commonly being around 5 Hz), a period of movement of a line of sight of the sitter coincides with movements of the vehicle, and stresses applied to the sitter are ameliorated. Further, if a vibration in a frequency region which generates α waves (8 Hz to 13 Hz) in the brain of the sitter is input (commonly being around 10 Hz), an amplitude that is transmitted to the sitter is attenuated by the above-described spring zero characteristic. Consequently, it is possible for α waves to be generated in the brain of the sitter and for comfortable sensations to be sensed, while unsettling sensations applied to the sitter are suppressed. From the above, with this seat structure, the spring zero characteristic that is produced by a person sitting suppresses application to the sitter of stresses which cause an accumulation or intensification of fatigue with a long period of sitting.

Further, the spring zero characteristic which is locally produced in the cushion material as described above will not disrupt the fluctuation periods of the person (for example, rhythms of cutaneous blood flows) because blood vessels of the sitter will not be crushed by inputs of external vibrations, will reduce displacements relative to the seat, and will enable the application of low frequency fluctuation vibrations of the sitter, and promote blood flows of the sitter and contribute to amelioration of fatigue. That is, biological rhythms of the sitter are drawn into the vibrations that the seat transmits to the sitter, and it is possible to proactively cause fluctuations of the sitter (apply stimuli which match patterns in fluctuations of the sitter due to the drawing-in effect).

Thus, the seat structure relating to the first aspect of the present invention can ameliorate peripheral fatigue of a sitter that accompanies a long period of sitting.

Further, in the seat structure relating to the first aspect of the present invention, a vibration transmissibility when a vibration in the resonance frequency region of the spinal column of the sitter is input via the sitting portion frame may be approximately 1, and a vibration transmissibility when a vibration in the frequency region which causes α waves in the brain of the sitter is input via the seat frame may be approximately 0.55 or less. With this seat structure, when a vibration in the resonance frequency region of the spinal column of the sitter is input, because the vibration transmissibility is approximately 1, that is, because it is transmitted to the sitter with amplitude being hardly amplified or attenuated, in combination with the smallness of the relative displacement as described above, movements of the line of sight of the sitter substantially coincide with movements of the vehicle. Consequently, stress applied to the sitter is ameliorated with certainty. On the other hand, when a vibration in the frequency region which generates α waves in the brain of the sitter (commonly being approximately 10 Hz) is input, this vibration is attenuated to an amplitude of not more than 0.55 times the input amplitude. Consequently, it is possible for α waves to be generated in the brain of the sitter and for comfortable sensations to be sensed, without unsettling sensations being applied to the sitter.

Furthermore, in the above-described seat structures relating to the first aspect of the present invention, a resonance frequency of a system including the sitter, the cushion material and the resilient member may be made in a range of at least 3 Hz and at most 4 Hz. With this seat structure, because the resonance frequency (natural frequency) of the vibration system constituted to include the sitter (principally mass thereof) is in the range of not less than 3 Hz and not more than 4 Hz, the frequency transmissibility of the resonance frequency region of the spinal column of the sitter (as mentioned above, around 5 Hz) can be set to about 1. In particular, characteristics of the cushion material and the resilient member, and design of the connecting structure, are desirably such that the resonance frequency of this vibration system is in the range of not less than 3 Hz and not more than 4 Hz even when body weights of sitters, which is to say, the masses of the vibration system, differ. That is, such that a weight dependence of the resonance frequency is suppressed.

A seat structure relating to a second aspect of the present invention is a seat structure provided with: a sitting portion frame; and a cushion material including a sheet material, of which a front edge side is fixed at a front edge side of the sitting portion frame and a back edge side is connected to a back edge side of the sitting portion frame via a resilient member, in which seat structure an attenuation ratio when a sitter displaces upward is set larger than an attenuation ratio when the sitter displaces downward.

With the seat structure relating to the second embodiment of the present invention, when the sitter displaces downward, a large attenuation effect is caused by the resilient member deforming and the sheet material (for example, a three-dimensional woven fabric or a two-dimensional woven fabric slackening, and an attenuation ratio when the sitter displaces upward is larger than the downward attenuation ratio. Because the attenuation ratio at a time of displacing upward (below referred to as attenuation ratio $\zeta u$) is larger than the attenuation ratio when the sitter displaces downward, that is, presses against the cushion material (below referred to as attenuation ratio $\zeta d$), bouncing up of the sitter (rebounding) when, for example, an impact vibration, an impact force or the like acts is prevented. Thus, application to the sitter of stress that causes accumulation or intensification of fatigue is suppressed. Further, because a difference is provided between the up and down attenuation ratios, causing of a sense of bottoming out due to an increase in acceleration is prevented without the attenuation ratios of the system being excessive.

Thus, with the seat structure relating to the second aspect of the present invention, peripheral fatigue of the sitter in accordance with a long period of sitting can be ameliorated. In particular, it is preferable if the attenuation ratio $\zeta d$ is in the range 0.1 to 0.25 and the attenuation ratio $\zeta u$ is in the range 0.15 to 0.3, it is particularly even more preferable if the attenuation ratio $\zeta d$ is in the range 0.15 to 0.25 and the attenuation ratio $\zeta u$ is in the range 0.20 to 0.3, and it is further preferable if the difference between the attenuation ratio $\zeta d$ and the attenuation ratio $\zeta u$ is at least 0.05. With the former constitution, because the attenuation ratio $\zeta d$ is in the range 0.1 to 0.25, bottoming out is not caused even with a displacement downward of the sitter accompanying, for example, an impact. Because sufficient attenuation force acts to absorb an impact, vibration or the like, and the attenuation ratio $\zeta u$ is in the range 0.15 to 0.3, bouncing up of the sitter is effectively prevented. Further, with the latter constitution, because the attenuation ratio $\zeta u$ is not more than 0.3 and the difference of the attenuation ratios $\zeta d$ and $\zeta u$ is not less than 0.05, excessive forces accompanying the energy dissipation are prevented from acting on the sitting portion frame and the sitter.

Further, in the above-described seat structures relating to the first or second aspect of the present invention, the resilient member may deform such that the back edge side of the sheet material moves at least one of forward and downward when a load to downward acts on the cushion material. With this seat structure, when a load acts downward on the sheet material in accordance with sitting, the resilient member resiliently deforms and the back edge side of the sheet material moves forward and/or downward. Consequently, an increase in tension of the sheet material in accordance with the sitting, that is, an increase of the spring constant of the vibration system which is constituted to include the sitter, the cushion material and the resilient member, is suppressed. That is, the spring constant of the aforementioned vibration system is principally the spring constant of the resilient member, and setting of vibration characteristics of the vibration system to desired characteristics is enabled. In particular, with a structure in which the back edge side of the sheet material descends while moving forward (moves forward while descending) because of a load downward accompanying sitting, in other words, with a structure such that the back edge side of the sheet material moves both in a direction approaching the front edge side and in a direction of distorting downward, an increase in tension of the sheet material accompanying sitting is further suppressed, and the above-mentioned effects become pronounced. Further, because an increase in tension of the sheet material in accordance with sitting is suppressed, the sheet material easily deforms to follow body movements of the sitter, and absorb body movements in accordance with breathing by the sitter. That is, hindrance of breathing of the sitter by the sheet material is avoided. In particular, the descending movement while the back edge side of the sheet material moves forward corresponds with breathing movements of the sitter, specifically, movement directions of the sacral bone in accordance with breathing. Consequently, the resilient member deforms and the back edge side of the sheet material moves in correspondence with body movements (loading changes) in accordance with breathing of the sitter, and the sitter can breathe without excessive use of muscular force. In other words, because the seat does not hinder breathing of the sitter (fluctuations of the body that accompany breathing), application to the sitter of physical and mental stress which cause an accumulation or increase in fatigue is thus effectively suppressed. Furthermore, because of the drawing-in effect in which vibrations draw in the breathing rhythms of the sitter when slight vibrations are input, a formation such that breathing of the sitter is promoted is enabled.

A seat structure relating to a third aspect of the present invention is provided with: a sitting portion frame; a cushion material including a sheet material of which a front edge side is fixed at a front edge side of the sitting portion frame; and a resilient member which is provided between a rear portion of the sitting portion frame and a back edge side of the sheet material, tensioning the sheet material onto the sitting portion frame, and deforming such that the back edge side of the sheet material descends while moving forward when a downward load acts on the sheet material.

With the seat structure relating to the third aspect of the present invention, when a downward load acts on the sheet material in accordance with sitting, the resilient member resiliently deforms and the back edge side of the sheet material descends while moving forward. That is, the rear end of the sheet material moves in a direction which reduces tension. Thus, an increase in tension of the sheet material in accordance with sitting, that is, an increase in the spring constant of the vibration system that includes the sitter, the cushion material and the resilient member is suppressed. This skyhook damper-type effect enables setting of a resonance frequency of this vibration system to be low while providing the required attenuation characteristics and restoring force. Further, because tension of the sheet material is kept low by the spring constant provided at the back edge side, compression of the buttock portion of the sitter, a sense of bottoming out and the like due to an increase in tension are ameliorated. Furthermore, when, for example, an impact vibration, impact force or the like acts, tension of the sheet material is reduced by a displacement (deformation) of the resilient member at the back edge side at which a spring constant due to the tension of the sheet material is small, a movement of the sitter downward (a side of pushing against the cushion material) occurs, consequent attenuation occurs, and the impact is effectively absorbed. Consequently, vibration forces which are input to the sitter are smaller, and application to the sitter of stress which causes an accumulation or increase of fatigue is suppressed.

Thus, with the seat structure relating to the third aspect of the present invention, peripheral fatigue of the sitter that accompanies a long period of sitting can be ameliorated.

Further, in the above-described seat structures which are provided with a resilient member which deforms when a weight acts downward on the sheet material such that the back edge side of the sheet material moves forward and/or downward (descends while moving forward), structures may be formed which are further provided with, at the cushion material, another sheet material which is stretched onto the sitting portion frame at an upper side of the sheet material and which presses a region of the sheet material corresponding to a buttock portion of a sitter such that the resilient member is deformed. With this seat structure, the other sheet material (referred to below as an upper side sheet material) which is stretched onto the sitting portion frame at the upper side of the sheet material whose back edge side is connected to the sitting portion frame via the resilient member (below referred to as a lower side sheet material, regardless of the presence or absence of the other sheet material), pushes the lower side sheet material downward. That is, the upper side sheet material deforms the resilient member prior to sitting and maintains this urging force of the resilient member by friction against the lower side sheet material. Therefore, tension of the lower side sheet material is reduced. Further, during sitting, because the lower side sheet material supports a portion of the body weight of the sitter, an increase in tension of the lower side sheet material is further suppressed. Thus, an effect due to the structure which is provided with the resilient member which deforms such that the back edge side of the sheet material moves forward and/or downward (descends while moving forward) when a load acts downward on the sheet material is even more pronounced. Further, if a portion of the lower side sheet material that corresponds to the buttock portion of the sitter is formed so as to be disposed at an upper side relative to an upper edge of the sitting portion frame when not sat on, an adequate stroke length can be assured even if the sitting portion frame is formed as a thin-form structure. Further, because restoring force is imparted to the upper side sheet material by the lower side sheet material (and the resilient member), weakening is ameliorated and vibration characteristics are improved.

Furthermore, in the above-described seat structure provided with the other sheet material, the other sheet material may be structured with a three-dimensional woven fabric or a two-dimensional woven fabric. With this seat structure, the upper side sheet material is a three-dimensional woven fabric or two-dimensional woven fabric which can provide spring characteristics and attenuation characteristic resembling those of human muscle in a material thereof. Therefore, a structure which presses the lower side sheet material, which is directly stretched onto the sitting portion frame and distorts in a compression direction together with the buttock muscles of the sitter in accordance with sitting, can be realized. Further, the three-dimensional woven fabric or two-dimensional woven fabric, when stretched onto the sitting portion frame, has load-distortion characteristics which are spring characteristic which more closely resembles human muscle the greater the extension (a non-linear spring characteristic). Therefore, specification so as to, for example, moderate or eliminate the weight dependency of the resonance frequency of the vibration system that is constituted to include the sitter is enabled. This is an effect due to the spring combination of the upper and lower sheet materials having muscle-like characteristics, and enables absorption of body weight differences of sitters. Furthermore, by combining the upper side sheet material having the above-described load-distortion characteristic with the lower side sheet material which is connected to the sitting portion frame via the resilient member, it is possible to structure a layer resembling characteristics of the muscles of the sitter from a seat cushion (a seat portion) of two layers having spring characteristics. With such a structure, hindrance of blood movements due to the crushing of muscles of the sitter as a result of a long period of sitting, obstruction of blood movement due to impact vibrations, and the like are prevented, and changes of body pressure are made smaller, contributing to an amelioration of fatigue.

Further still, in the above-described seat structures provided with the other sheet material, the structure may be formed to make jerks of a seat cushion which is structured to include the sitting portion frame and the cushion material smaller than jerks of muscle themselves of the buttock portion of a sitter. With such a seat structure, jerk characteristic of the seat cushion (lower layer) which is structured to include the sitting portion frame and the cushion material (the lower side and upper side sheet materials) reduces an extension in the tension direction of the lower side sheet material, and reduces changes in compression characteristics due to tension. Thus, relative to a jerk characteristic of muscles of the buttock portion of the sitter themselves, a softer characteristic (jerk of the seat cushion being smaller than jerk of the muscles) is formed. Therefore, a change in acceleration when an impact vibration, a light collision load or the like is input is absorbed in stages, and there are no extremely large values. Correspondingly, because the period of action is lengthened, impact force is absorbed. Consequently, stress accompanying increases in acceleration are ameliorated.

Further, in the above-described seat structures which are provided with a resilient member which deforms such that the back edge side of the sheet material moves forward and/or downward (descends while moving forward) when a load to downward acts on the sheet material, a structure may be formed which is further provided with a pivoting member, of which a lower end side is supported at a back edge side of the sitting portion frame to be pivotable about an axis along a left-right direction of the sitting portion frame, and an upper end side is anchored at the back edge side of the sheet material which is connected to the sitting portion frame via the resilient member, the resilient member being a torsion bar which is provided at the pivoting axis of the pivoting member, and which resiliently twistingly deforms in accordance with pivoting of the pivoting member. With this seat structure, the back edge side of the lower side sheet material is anchored at the upper end side of the pivoting member whose lower end side is pivotably supported at the back edge side of the sitting portion frame, and the torsion bar is provided at the pivoting axis of the pivoting member so as to twistingly deform resiliently accompanying the pivoting of the pivoting member. That is, the sitting portion frame is connected with the back edge side of the lower side sheet material via the torsion bar, which is a resilient member and, furthermore, via the pivoting member. When a load acts downward on the lower side sheet material, the pivoting member turns such that the upper end side of the torsion bar twists while the back edge side of the pivoting member moves forward-downward, and the back edge side of the lower side sheet material is reliably moved forward-downward. Further, because the torsion bar which is disposed thus functions as a resilient element with good linearity, design and design alterations of a seat structure which exhibits the above-described operational effects are simple. Further, with a structure such that the pivoting member latches with (anchors) the back edge side of the lower side sheet material across a predetermined width (includes an anchoring portion), a tensioned planar area (a stiff surface) is formed at the lower side sheet material, and a slump of posture of the sitter, for example, during roll, is prevented. Further, the lower side sheet material can support the sitter without causing the sitter to feel lines of tension. In particular, in the above-described structure which is provided with the upper side sheet material stretched onto the sitting portion frame, by combining the upper side sheet material with the lower layer sheet material, an anchoring effect is caused by the above-described muscle-like characteristics below the hipbone joints of the sitter, and a slump of posture of the sitter is prevented even when the lower end portion moves in the front-rear direction.

Furthermore, in the above-described seat structures which are provided with the resilient member which deforms such that the rear end portion of the sheet material moves forward and/or downward (descends while moving forward) when a downward load acts on the sheet material, a structure may be formed which is further provided with other resilient members which are respectively provided between two, left and right direction, edge portions at the back edge side of the sheet material, connected to the sitting portion frame via the resilient member, and a back edge side of the sitting portion frame, and which increases a front-rear direction tension of the sheet material that accompanies sitting. With this seat structure, the other resilient members deform with sitting, and front-rear direction tension of the left and right edge portions of the lower side sheet material increase. Thus, the cushion material supports sides of the body of the sitter with high stiffness portions at the two left-right direction side portions, and restricts left-right direction movement of the sitter. Thus, the sitter maintains posture without using muscle force, and fatigue is ameliorated. Further, restoration of the sheet material on load removal is improved by the front-rear direction tension caused by the other resilient members deforming. In particular, in a structure which is provided with the upper side sheet material stretched onto the sitting portion frame, because of the compression characteristic of the upper side sheet material, the sitter can be supported without the sitter being caused to feel lines of tension due to the other resilient members.

Further still, in the seat structures described above which are provided with a resilient member which deforms such that the back edge side of the sheet material moves forward and/or downward (descends while moving forward) when a downward load acts on the sheet material, a structure may be formed which is further provided with a sheet-form member, which is provided forward of positions corresponding to the hipbone joints of a seated sitter, and which restricts distorting downward of the sheet material connected to the sitting portion frame via the resilient member by tension which accompanies sitting. In this seat structure, a region of the lower side sheet material forward of the hipbone joints of the sitter distorts downward in accordance with sitting, but is restricted by the sheet-form member (a tension structure) disposed forward of the positions corresponding to the hipbone joints at the lower side of the lower side sheet material. Thus, a dam-like member is formed at the forward side relative to the hipbone joints of the sitter, and changes in posture, forward-sliding and the like of the sitter are prevented. On the other hand, changes in posture of the sitter along a substantially circular path guided by the dam-like member, due to movements in the center of gravity, are allowed. Thus, the sitter maintains posture basically without using muscle force. In addition, changes in posture to assist fatigue amelioration, changes in posture in accordance with driving operations, and the like are allowed, while postures subsequent to posture changes are maintained without using muscle force. That is, the sitter can maintain optimal posture depending on the fatigue without using muscle force. In particular, if this seat structure is formed as a structure which is further provided with a seat back which supports the sides of the upper body of the sitter, by the seat back resiliently supporting a third lumbar vertebra portion of the upper body of the sitter, curvature of the spinal column accompanying the progress of fatigue shows a straight line direction, and the sitter can maintain optimal posture for the fatigue without using muscle force. Because a back portion sheet material supports the sides of the upper body of the sitter, movements of the sitter in the left-right direction are restricted while changes in posture along the circular arc path accompanying movements in the center of gravity are allowed and, even in response to accelerations in the left-right direction, movements of the upper body will be small and slumping of posture will be infrequent.

Further, in a seat structure relating to the structures described above, a structure may be formed which is further provided with a seat back which includes: a back portion frame which is a resilient structure; a back portion cushion material; a first resilient member which respectively connects two left-right direction end portions of an upper end side of the back portion cushion material to an upper end side of the back portion frame; and a second resilient member which respectively connects two left-right direction end portions of a lower end side of the back portion cushion material to a lower end side of the back portion frame, and is formed so as to support an upper body of a sitter by the resilient members. In this seat structure, a rearward load from the upper body of the sitter from sitting acts on the back portion cushion material of the seat back. For this load, the first resilient member and the second resilient member, which are respectively interposed between upper and lower end sides of the back portion cushion material and corresponding upper and lower end sides of the back portion frame, deform and support it. Furthermore, these first and second resilient members apply movement to the back portion frame, which is a resilient structure, via the cushion material. The back portion frame is formed as, for example, a resilient structure with a pair of, left and right, side frames, upper ends of which are supported with a stiff spring constant and lower ends of which are supported with a smaller spring constant than the spring constant of the upper ends, and deformations of the first and second resilient members due to the back portion frame deforming in accordance with sitting can be suppressed. These springs of the back portion frame are provided by spring characteristics of the structure of the back portion frame itself, metal springs such as plate springs or the like, or the like. Consequently, an increase in tension of the back portion cushion material from sitting is prevented, and therefore a reaction force against the sitter is suppressed. The two left-right direction end portions of the back portion cushion material, at which the tensions of the first and second resilient members act, support the upper body of the sitter from the side (side body support). Thus, with the seat back, a sense of constriction of the sitter due to a reaction force from the cushion material is moderated, and posture maintenance can be achieved. Further, tension of the back portion cushion material at a time of sitting is small and deformations are allowed. Therefore, absorption of slight body movements (fine loading changes) of the sitter is enabled. Therefore, the upper body of the sitter is supported while reaction force from the cushion material is suppressed, while movements (fluctuations) of the upper body are allowed, and stresses accompanying a long period of sitting are ameliorated. By providing such a seat back, a sense of restraint over a long period in accordance with a long period of sitting at the above-described seat structures is reduced, and fatigue of the sitter can be more effectively ameliorated.

A seat structure relating to a fourth aspect of the present invention is provided with: a back portion frame; a back portion cushion material; first resilient members which respectively connect two left-right direction edge portions of an upper end side of the back portion cushion material to an upper end side of the back portion frame; and second resilient members which respectively connects two left-right direction edge portions of a lower end side of the back portion cushion material to a lower end side of the back portion frame, and the seat structure being formed so as to support an upper body of a sitter by the resilient members.

With a seat structure relating to the first aspect of the present invention, a rearward load from the upper body of the sitter in accordance with sitting acts on the back portion cushion material. For this load, the first resilient member and the second resilient member, which are respectively interposed between upper and lower end sides of the back portion cushion material and corresponding upper and lower end sides of the back portion frame, deform and support it. Consequently, an increase in tension of the back portion cushion material from sitting is prevented, while the two left-right direction end portions of the back portion cushion material, at which the tensions of the first and second resilient members act, support the upper body of the sitter from the side (side body support). Thus, a sense of constraint of the sitter is moderated, while posture maintenance can be achieved. Further, because tension at the time of sitting is small and deformations are allowed, absorption of slight body movements (fine loading changes) of the sitter is enabled. Therefore, movements (fluctuations) of the upper body of the sitter are allowed while the upper body is supported, and stress accompanying long periods of sitting are ameliorated.

Thus, with the seat structure relating to the fourth aspect of the present invention, peripheral fatigue of the sitter accompanying a long period of sitting can be ameliorated.

Further, with the above-described seat structures which are provided with the seat back at which the back portion cushion material is connected with the back portion frame by the first and second resilient members, a third resilient member is further provided, which is provided between the back portion cushion material and the back portion frame, and which causes a left-right direction tension at a position of the back portion cushion material that corresponds with a lumbar portion of the sitter. With this seat structure, because of the third resilient member, left-right direction tension acts at a region of the back portion cushion material with a height corresponding to the lumbar portion of the sitter, and there is a higher stiffness than at other height direction portions. Thus, a position of the back portion cushion material corresponding to the lumbar portion becomes a forward protruding form due to sitting, and supports with a stronger sense of resilience because of the spring characteristic of the third resilient member which is employed in anchoring of the cushion material is effectively drawn out by the tension which acts on the cushion material, and a preferable body pressure distribution in which a support pressure at the lumbar portion of the sitter is higher than at other portions is realized. Here, inputs of external vibrations are reduced by the resilient support. Further, because the third resilient member is provided, a support pressure of the lumbar portion can be made higher in accordance with posture of the sitter. With a view to posture maintenance at times of fatigue, a line joining a thoracic vertebra portion of the back portion cushion material with a region corresponding to the pelvis is preferably a substantially linear form. However, because the third resilient member makes the support pressure of the lumbar portion higher, even if the spinal column of a fatigued sitter assumes a linear form, the spinal column is supported by a support surface which is produced by a restoring force which, by occurring at the thoracic vertebra portion, acts to return to a straight line the line joining the lumbar vertebrae with the pelvis.

Furthermore, in the above-described seat structure in which the third resilient member is provided at the seat back, the first resilient member, the second resilient member and the third resilient member may respectively be tension coil springs. In this seat structure, the first resilient member, the second resilient member and the third resilient member, which are tension coil springs, deform so as to respectively tip (so as to curve along a longitudinal direction) and support the upper body of the sitter. The first resilient member, second resilient member and third resilient member keep support force low in a state of being respectively tipped primarily rearward in response to a small load, and in response to a large load, stretch further and generate a large support force. Consequently, a sitter with a small physique (a light body weight) is supported with a low support force, a person with a large physique (a person with a heavy body weight) is supported with a high support force, and individual differences in physique are absorbed.

A seat structure relating to a fifth aspect of the present invention is provided with: a back portion frame; and a back portion cushion material with at least one end side of an up-down direction of which connected to the back portion frame via a resilient member, which is tensioned onto the back portion frame, and which forms a flat backrest in a non-sitting state.

With the seat structure relating to the fifth aspect of the present invention, the backrest which is formed by the back portion cushion material being stretched onto the back portion frame is formed to be substantially flat (a linear form when viewed in side view) in a non-sitting state. Consequently, creases and the like do not occur at the backrest and appearance is excellent. Because the back portion cushion material is connected with the back portion frame via the resilient member and is stretched onto the back portion frame, the backrest is easily deformed into arbitrary shapes.

Consequently, in a sitting state, the backrest deforms to a three-dimensional shape corresponding to a body form of the sitter and supports the sitter. In a stationary sitting state, at the backrest which is substantially flat when not sat on, an unstable portion with low tension occurs, and the unstable portion makes posture changes of the sitter easy. In a fatigued state, the upper body of the sitter tends to have the buttocks slid out relative to a posture in a state in which fatigue is low, and thereby assumes a somewhat backward-leaning posture, and a periodicity which does not hinder this posture change is produced at the backrest. For example, in a state in which fatigue of the sitter is low, a support force of a back portion at the backrest is comparatively low. Therefore, when fatigue increases and the buttocks slide, the back portion moves rearward while the lumbar portion tends to move forward. Further, when the sitter adopts the posture which is somewhat backward-leaning, because support force of the lumbar portion of the backrest is low, a forward-leaning action (an operation for returning to the state of the time at which fatigue is low) is easy. Thus, rather than a pushing-out action of the backrest to the sitter at regions not necessary, a support state that corresponds to the degree of fatigue of the sitter is produced, and causation of stress to the sitter is suppressed.

Thus, with a seat structure relating to the fifth aspect of the present invention, peripheral fatigue of a sitter accompanying a long period of sitting can be ameliorated.

Effects of the Invention

A seat structure relating to the present invention as described above has excellent effects in being capable of absorbing whole-body vibrations and impact vibrations, not hindering the biological rhythms of a sitter and therefore ameliorating peripheral fatigue of the sitter accompanying a long period of sitting, and moderating impact forces by ease of movement to rearward of the body at a time of impact and control of attenuation ratios of a seat back and seat cushion which suppress rebounding.

BRIEF DESCRIPTION OF THE DRAWINGS

FIGS. 12A, 12B, 12C, 12D and 12E are, respectively, schematic sectional views of a principal portion of the three-dimensional woven fabric, showing application examples of a pile portion.

FIG. 17A is a graph showing jerk ratios relative to muscle of a sitter of a seat cushion which structures the vehicle seat relating to an embodiment of the present invention, being a graph of jerk characteristics which are softer than muscle.

FIG. 17B is a graph showing jerk ratios relative to muscle of a sitter of a seat cushion which structures the vehicle seat relating to an embodiment of the present invention, being a graph of a jerk characteristic which is similar to muscle.

FIG. 19 is a graph showing a loading-extension characteristic for a single upper layer sheet which structures a vehicle seat relating to an embodiment of the present invention.

FIG. 28 is a graph respectively showing moving fatigue curves of a vehicle seat relating to an embodiment of the present invention and representative conventional seats.

FIG. 29 is a graph respectively showing stationary and moving fatigue curves of a vehicle seat relating to an embodiment of the present invention and representative conventional seats.

BEST MODE FOR CARRYING OUT THE INVENTION

Figure 1:
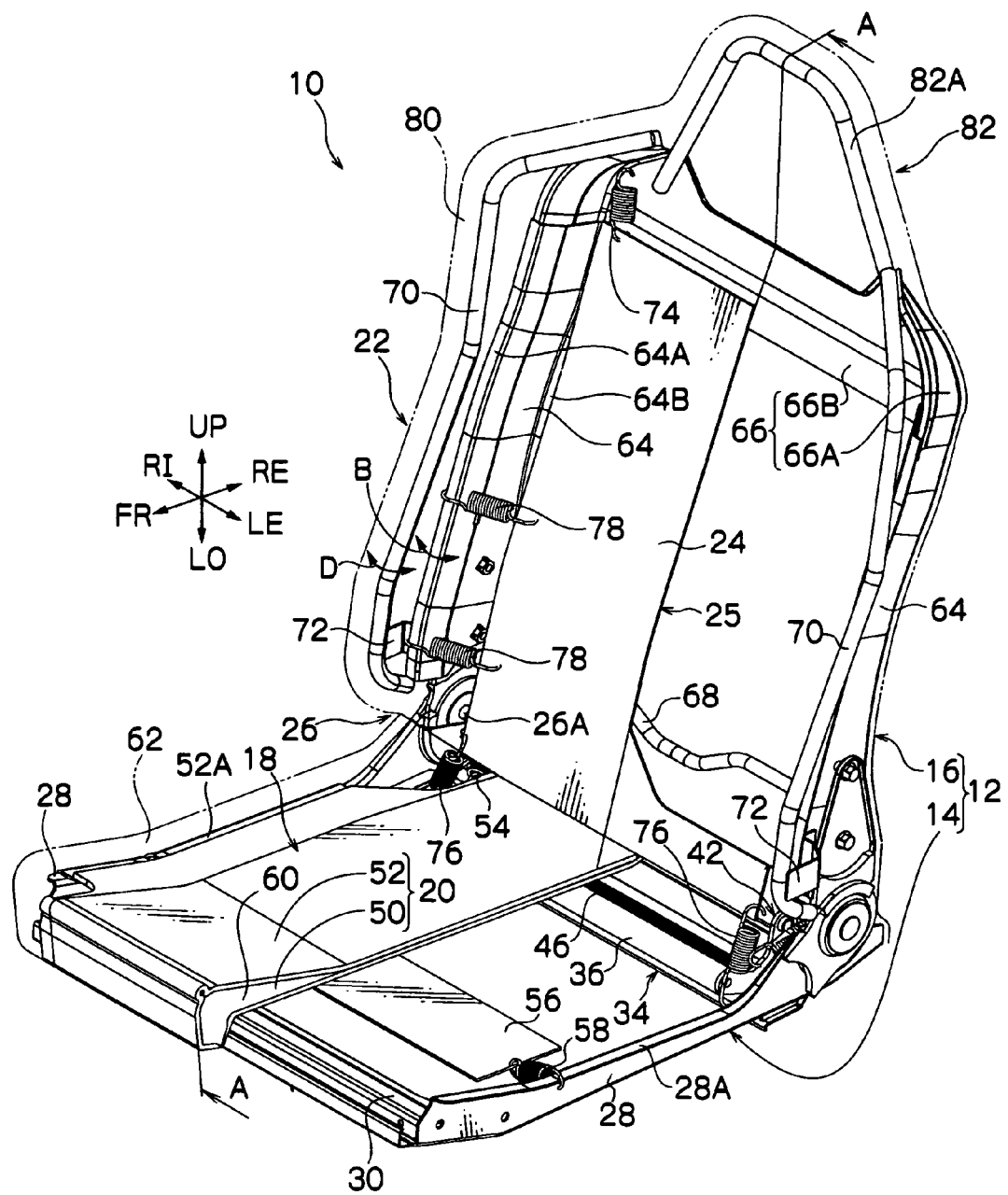
FIG. 1 is a perspective view of a vehicle seat relating to an embodiment of the present invention.

A vehicle seat 10 at which a seat structure relating to an embodiment of the present invention is employed will be described on the basis of FIGS. 1 to 34. Here, an arrow UP, an arrow LO, an arrow FR, an arrow RE, an arrow RI and an arrow LE which are shown as appropriate in the drawings represent, referred to a direction of progress of a vehicle at which the vehicle seat 10 is installed, a forward direction (the direction of progress), a rearward direction, an upward direction, a downward direction, a rightward direction and a leftward direction, respectively. Where up, down, front, rear, right and left are simply referred to hereafter, these correspond with the directions of the respective arrows.

Figure 2:
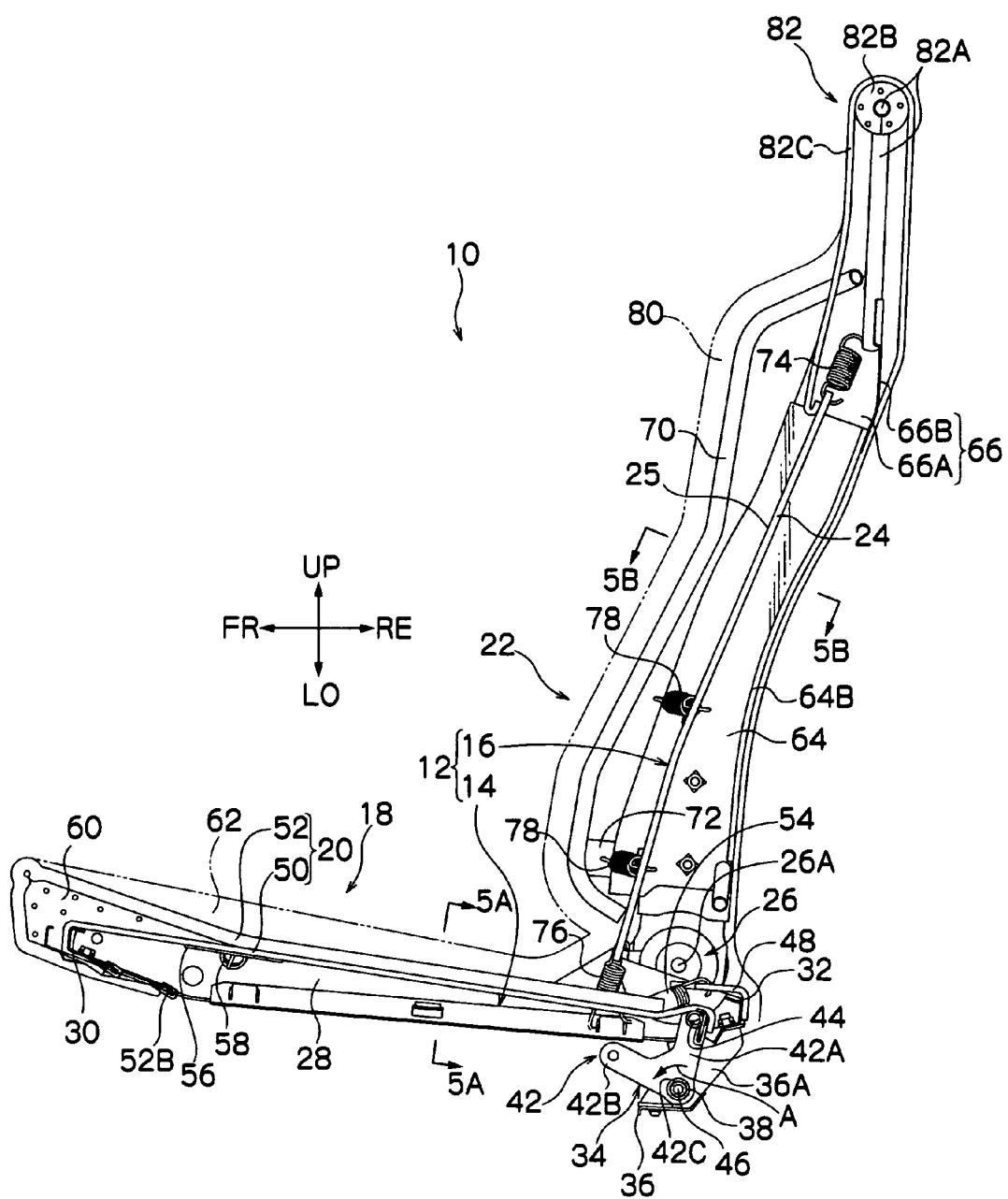
FIG. 2 is a side view of the vehicle seat relating to an embodiment of the present invention.

In FIG. 1, a schematic overall structure of the vehicle seat 10 is shown in a perspective view with a partial cutaway. In FIG. 2, a side view of the vehicle seat 10 is shown. As shown in these drawings, the vehicle seat 10 is provided with a seat frame 12, and the seat frame 12 is structured with a sitting portion frame 14, which is a seat cushion frame, and a back portion frame 16, which is a seat back frame.

A seat cushion 18, which serves as a sitting portion, is formed by provision of a cushion material 20 at the sitting portion frame 14, and a seat back 22 is formed by provision of a back portion cushion material 24 at the back portion frame 16. At the seat back 22, a lower end of the back portion frame 16 is connected with a rear end portion of the sitting portion frame 14 via a reclining mechanism 26, to be pivotable about a support shaft 26A. Thus, pivoting of the seat cushion 18 around the support shaft 26A and support at arbitrary pivoting positions are enabled. Details of this reclining mechanism 26 are conventionally well known. Therefore, a detailed description will not be given.

First, structure of the seat cushion 18 and structure of the cushion material 20 will be described. Then, a specific example of a three-dimensional woven fabric 110 which structures portions of the cushion materials 20 and 24 will be described.

—Structure of Seat Cushion—

As shown in FIGS. 1 and 2, the sitting portion frame 14 that structures the seat cushion 18 is provided with a pair of left and right side frames 28, which are respectively formed with length in the front-rear direction. Further, the sitting portion frame 14 is provided with a front frame 30 and a rear frame 32, which connect the pair of left and right side frames 28 at vicinities of front and rear edges. Thus, the sitting portion frame 14 is formed in a substantially square shape in plan view.

A front portion of each side frame 28 is formed so as to curve upward relative to a lower edge, which is formed to be substantially horizontal at a central portion. At the central portion of each side frame 28, an upper edge portion is continuously inclined such that width in the up-down direction is reduced toward the rear. Thus, the upper edge at a position of each central portion in the front-rear direction that corresponds with hipbone joints of a sitter is disposed lower than an upper edge of the front frame 30. At a rear portion of each side frame 28, the upper edge rises and falls, in a peak shape in side view, such that the above-mentioned reclining mechanism 26 can be attached.

Furthermore, each side frame 28 is structured with flat-plate form member upper flange portion 28A, and flange portion 28B formed with predetermined widths from the upper and lower edge portions. The upper flange portion 28A disposed at the upper edge of each side frame 28 extends to respective outward directions of the seat, and is provided over substantially a whole length in the front-rear direction, excluding a rear portion of the rear portion. Meanwhile, the lower flange portion 28B disposed at the lower edge of each side frame 28 extends to a respective inward direction of the seat, and is provided over substantially the whole length in the front-rear direction.

Figure 4A:
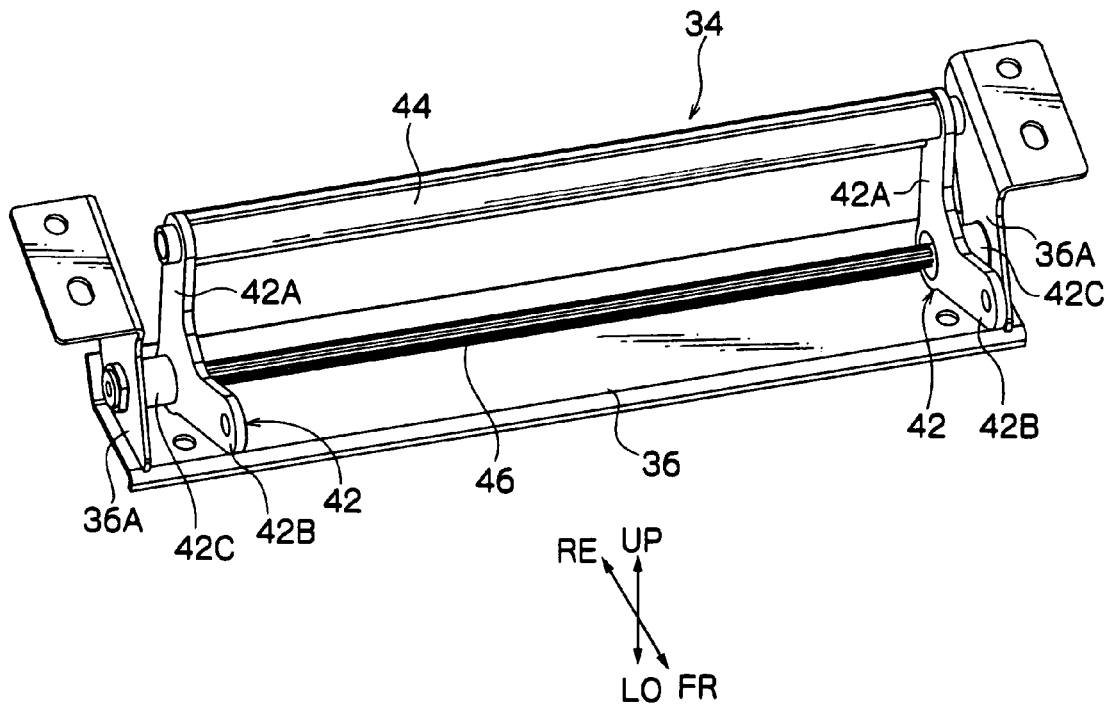
FIG. 4A is a perspective view showing a movable frame which structures the vehicle seat relating to an embodiment of the present invention.
Figure 4B:
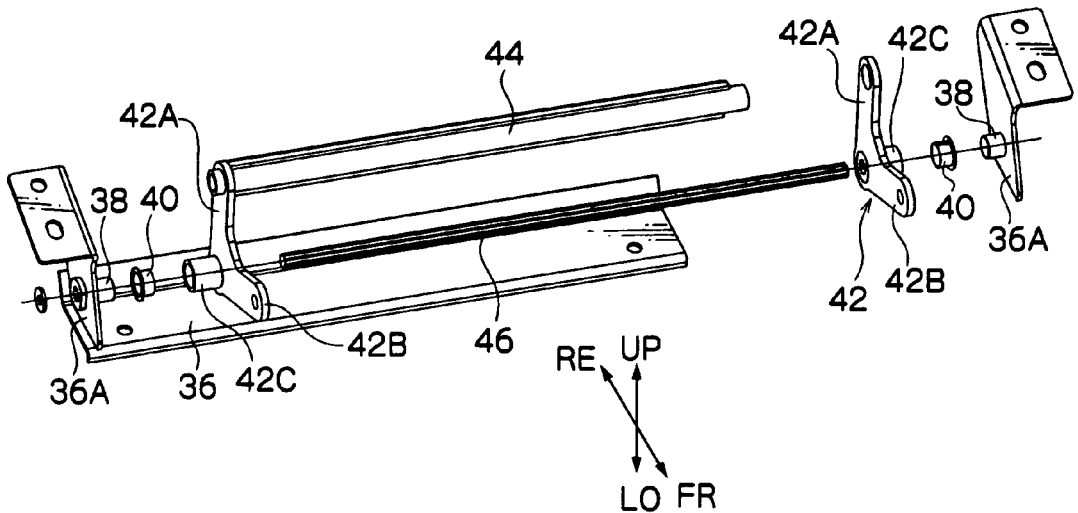
FIG. 4B is an exploded perspective view showing the movable frame which structures the vehicle seat relating to an embodiment of the present invention.

A movable frame 34 is provided at a rear portion of this sitting portion frame 14. The movable frame 34 is provided with a support bracket 36 which protrudes downward at a rear end portion of the sitting portion frame 14 and is fixedly provided. As shown in FIGS. 4A and 4B, the support bracket 36 is provided with a pair of left and right support plates 36A, which are disposed in parallel with the side frames 28 at respective seat inward sides. From lower vicinities of the respective support plates 36A, support shafts 38 are protrudingly provided toward respective seat inward sides to be mutually coaxial. The support shafts 38 pivotably support lower end portions of arm members 42 via respective bushes 40.

The pair of left and right arm members 42 are formed in substantial 'V' shapes in side view with respective first arms 42A and second arms 42B, and are pivotably supported relative to the support bracket 36 as described above by the support shafts 38 being inserted, via the bushes 40, into boss portions 42C which are formed at angle portions disposed at lower ends thereof. Further, the pair of arm members 42 are connected by a connecting pipe 44 which spans across between distal ends (mutual upper end portions) of the respective first arms 42A. The connecting pipe 44 is disposed in parallel with axes of the support shafts 38 along the left-right direction, and is pivotable about the support shafts 38. Meanwhile, a torsion bar 46 is disposed at a pivoting axis of the pair of left and right arm members 42.

The torsion bar 46 is prevented from relative pivoting with respect to the sitting portion frame 14 by one end portion thereof passing through axial portions of the boss portion 42C of the right side arm member 42 and the support shaft 38, and being fitted to the support plate 36A in a pivot-stopping state. Meanwhile, another end portion of the torsion bar 46 is fitted to the boss portion 42C of the left side arm member 42 in a pivot-stopping state, and thus is connected so as to be coaxial and integrally turn with that arm member 42. Thus, the torsion bar 46 is a resiliently twisting structure which is a resilient member at which a torsional load occurs in proportion to the twisting angle of pivoting (pivoting) of the arm members 42.

This movable frame 34 has a rear end portion of the cushion material 20 (a lower layer sheet 50, which will be described later) anchored at the connecting pipe 44 thereof, and is structured such that, in an unloaded state, the first arms 42A of the pair of arm members 42 are tilted slightly rearward relative to an upright state (upper ends are disposed rearward relative to lower ends). In this state, the second arms 42B are disposed forward relative to the first arms 42A.

Furthermore, at left-right direction end portions of the rear end portion of the sitting portion frame 14, respective spring-engaging members 48 are provided. The spring-engaging members 48 are respectively fixedly connected to the rear frame 32 and the rear portions of the corresponding side frames 28. Each spring-engaging member 48 anchors a rear end portion of a tension coil spring 54, which will be described later, and a location of this anchoring is disposed higher than the upper edge of the central portion of the side frame 28.

The cushion material 20 is stretched onto the sitting portion frame 14 described above. The cushion material 20, being structured with the lower layer sheet 50, which serves as a "cushion material" of the present invention, and an upper layer sheet 52, which serves as an "other cushion material" provided at an upper side of the lower layer sheet 50, has a two-layer structure. In the present embodiment, the lower layer sheet 50 and the upper layer sheet 52 are respectively structured with three-dimensional woven fabrics 110 with mesh (net) structures, and are formed to be capable of stretching in their plane directions in accordance with internal attenuation due to tension and of restoration with removal of that tension. Further, the lower layer sheet 50 and the upper layer sheet 52, by being structured with the above-described three-dimensional woven fabrics 110, are made capable of crushing in a thickness direction in accordance with internal attenuation due to loading in a direction perpendicular to the planar directions, and of restoration with removal of that load.

In the present embodiment, the lower layer sheet 50 is formed with a stiff spring characteristic which is hard to stretch both in the lateral and in the longitudinal directions, that is, to front, rear, left and right, and the upper layer sheet 52 is formed with a soft spring constant which is easy to stretch in the left-right reduction and a stiff spring characteristic which is hard to stretch in the front-rear direction. Further, in the present embodiment, the lower layer sheet 50 is formed to be thinner than the upper layer sheet 52, but the thickness thereof may be equal in thickness to the upper layer sheet 52 or thicker than the thickness of the upper layer sheet 52.

Figure 3:
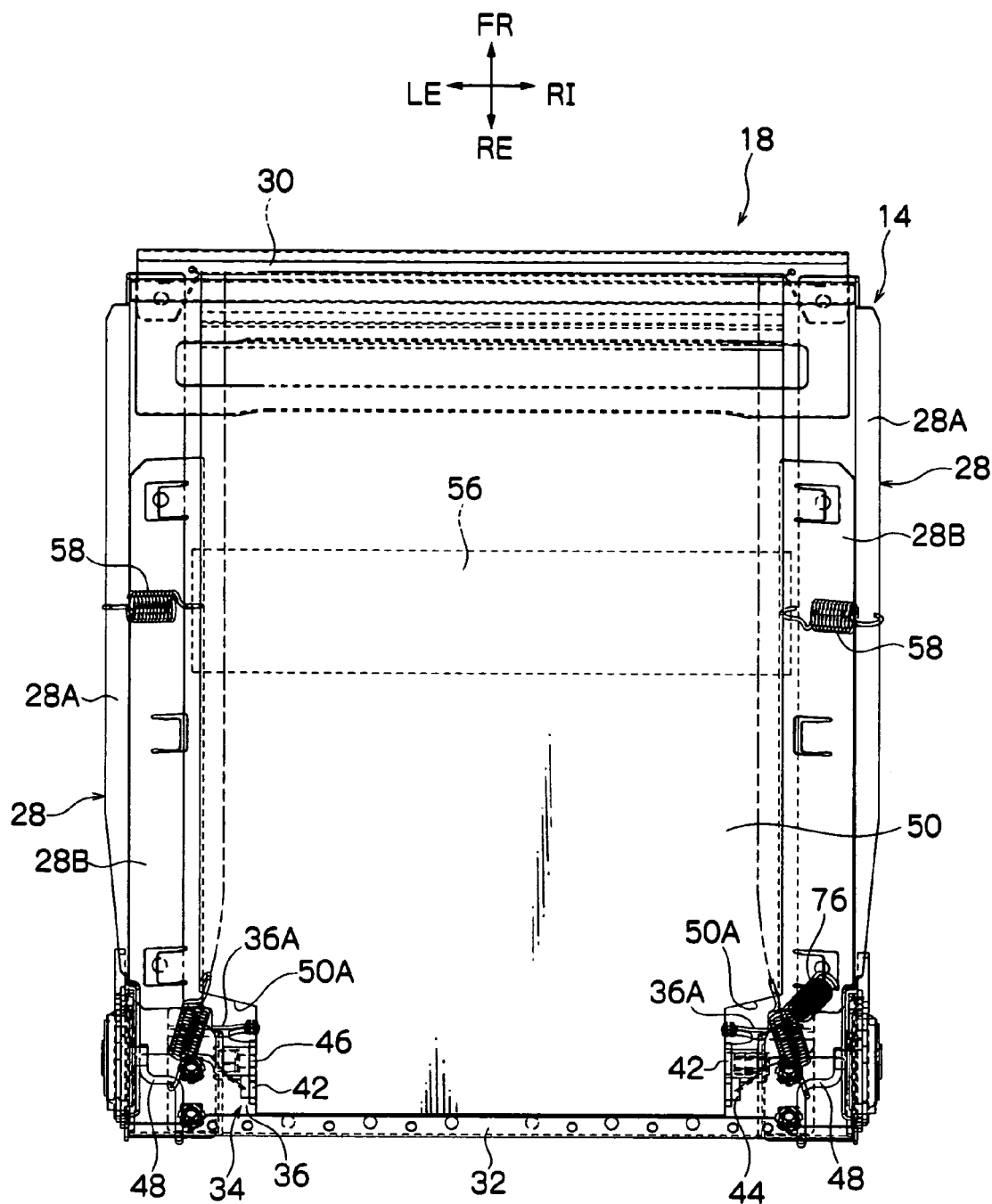
FIG. 3 is a plan view of a seat cushion which structures the vehicle seat relating to an embodiment of the present invention.

At the lower layer sheet 50, a front end portion thereof is wound round and anchored at the front frame 30, and the rear end portion thereof is anchored at the connecting pipe 44 of the movable frame 34. As shown in FIG. 3, a width of the lower layer sheet 50 is set smaller than the spacing between the left and right side frames 28, and gaps are formed between left and right edge portions of the lower layer sheet 50 and the side frames at the corresponding sides. Further, at the rear end of the lower layer sheet 50, the two left and right ends are formed with respective cutaway portions 50A, and the width is made even smaller than at other portions. The width between the left and right cutaway portions 50A of this lower layer sheet 50 corresponds to a length of the connecting pipe 44, and the rear end between the cutaway portions 50A is anchored at the connecting pipe 44 over substantially the whole width. The length of the connecting pipe 44 is set to be larger than distances between hipbone joints of sitters.

By the above, the rear end of the lower layer sheet 50 is movable to follow pivoting of the arm members 42 around the support shafts 38. In a state in which the upper layer sheet 52 is not provided, the lower layer sheet 50 is set to an initial tension (a tension which is principally applied to a torsional load of the torsion bar 46) of 200 N or less and stretching in the front-rear direction of not more than 5%. Respective spring characteristics of the lower layer sheet 50 and the torsion bar 46, an inclination angle of the arm members 42 in a free state of the torsion bar 46 before anchoring of the lower layer sheet 50, a length of the arm members 42 (a pivoting radius of the connecting pipe 44) and the like are determined such that, in this state, the torsion bar 46 is twisted and the first arms 42A are slightly tilted rearward as described above.

The lower layer sheet 50 is distorted downward by sitting, while being caused to descend while moving forward by the connecting pipe 44 of the movable frame 34 pivoting in the direction of arrow A shown in FIG. 2. That is, at the lower layer sheet 50, the rear end which is anchored at the connecting pipe 44 approaches the front end which is fixed to the front frame 30 with sitting, while being supported by a tension based on the torsional load of the torsion bar 46. Therefore, this is a structure in which a tension which acts on the lower layer sheet 50 at this time is smaller in comparison with a case in which the movable frame 34 is not provided (for example, a case in which the other end portion is anchored at a fixed portion of the sitting portion frame 14).

Furthermore, respective front end portions of the tension coil springs 54 are anchored at front edge vicinities, at left-right direction edge portions, of the cutaway portions 50A of the lower layer sheet 50. Rear end portions of the tension coil springs 54 are respectively anchored at the corresponding spring-engaging members 48 of the sitting portion frame 14. In this state, at each tension coil spring 54, the front end thereof is disposed at the seat inward side and the upper side relative to the rear end thereof. The tension coil springs 54 are set to a free state or a state of being extended to within a predetermined range (in the present embodiment, an extension amount of at most 10 mm) in a state in which the upper layer sheet 52 is not provided.

These tension coil springs 54 are extended by the lower layer sheet 50 distorting downward in accordance with sitting, and apply tension to the two left-right direction end portions of the lower layer sheet 50. That is, at a time of sitting, while the movable frame 34 (the torsion bar 46) adjusts in a direction which reduces a front-rear direction tension between the cutaway portions 50A (a left-right direction central portion) of the lower layer sheet 50, the tension coil springs 54 fulfil a function of adjusting front-rear direction tensions at the two left-right direction end portions of the lower layer sheet 50 in a direction in which the tension is increased. Thus, the tension coil springs 54 are a structure which causes tension in the front-rear direction of the lower layer sheet 50 at left-right direction outer side portions relative to the pelvis of a sitter, and provides a high tension to portions of the lower layer sheet 50 which support a thigh portion (body side) of the sitter.

Further, as shown in FIGS. 1 to 3, a belt member 56 is disposed between the side frames 28, slightly to the forward side relative to a front-rear direction central portion, and serves as a "sheet-form member" with a rectangular form with length in the left-right direction. The belt member 56 is a cloth-like member (a two-dimensional tension structure or the three-dimensional woven fabric 110) which is difficult to stretch in the length direction, and at two left-right direction end portions disposed between the side frames 28 one of the end portions of respective tension coil springs 58 are anchored. Respective other end portions are anchored at the upper flange portions 28A of the side frames 28, and the tension coil springs 58 are set with length in the left-right direction in plan view and, at a time of non-loading, are inclined such that the anchoring positions at the belt member 56 are disposed lower than the anchoring positions at the upper flange portions 28A in front view. In this state, the belt member 56 touches or is very close to a lower face of the lower layer sheet 50.

Thus, this is a structure in which, when the lower layer sheet 50 distorts downward with sitting, the belt member 56 presses against the lower layer sheet 50 and the tension coil springs 58 extend, and downward distorting of a region of contact of the lower layer sheet 50 with the belt member 56 is restricted by this reaction force. That is, the tension coil springs 58 and the belt member 56 apply tension (a pressure difference) to the lower layer sheet 50 with the sitting, such that a dam-like member S (see FIG. 6), which is a portion at which the lower layer sheet 50 which has distorted downward in accordance with the sitting rises up toward the front frame 30, is formed at a predetermined position (to be described later) in the front-rear direction.

According to the above, the lower layer sheet 50 is a structure in which an area of tension with tension directions in three dimensions (to be described later) is generated by the movable frame 34 (the torsion bar 46), which is a two-dimensional spring element which forms a planar area of tension, and the left and right tension coil springs 54, which are one-dimensional spring elements which form respective lines of tension.

Here, the arm members 42 of the movable frame 34 correspond to a "pivoting member" of the present invention, the connecting pipe 44 corresponds to an "anchoring portion" of the present invention, the torsion bar 46 corresponds to a "resilient member" of the present invention, and the tension coil spring(s) 54 correspond to "other resilient member(s)" of the present invention.

Figure 5A:
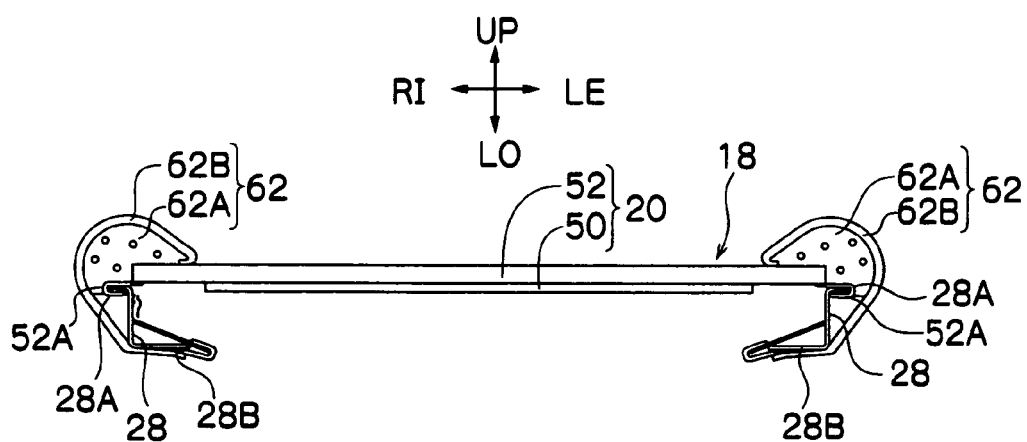
FIG. 5A is a sectional view cut along line 5A-5A of FIG. 2.

The upper layer sheet 52 is stretched onto the sitting portion frame 14 at the upper side of the lower layer sheet 50. Specifically, as shown in FIG. 5A, hook portions 52A of the upper layer sheet 52, which are provided along the front-rear direction at the two left and right edges, are anchored at the upper flange portions 28A of the corresponding side frames 28. Further, hook portions 52B of the upper layer sheet 52, which are provided along the left-right direction at the front edge, are formed so as to turn in around the front frame 30 and are anchored at a lower portion of the front frame 30. The rear end of the upper layer sheet 52 is fixedly connected to a lower end of the back portion cushion material 24 of the seat back 22 and/or connected (supported) at the rear end of the sitting portion frame 14 via a weak spring or cloth, and is set to state close to being a substantially free end. In a non-sitting (unloaded) state, stretching of the upper layer sheet 52 in the left-right direction and the front-rear direction are both not more than 5%.

At this upper layer sheet 52, a rear portion thereof is layered over the lower layer sheet 50, and a front portion and the portion which turns in at the front side of the front frame 30 are spaced apart from the lower layer sheet 50 by a spacer member 60, which is provided between the upper layer sheet 52 and the lower layer sheet 50. The spacer member 60 is structured of, for example, polyurethane foam or the like. Thus, a front edge portion of the seat cushion 18 is formed to be ridged-up relative to other portions. Further, as shown in FIG. 2, a rear portion of the upper layer sheet 52 weakly presses downward against and slightly distorts a rear portion of the lower layer sheet 50. Thus, in the state in which the upper layer sheet 52 is stretched on, the torsion bar 46 turns slightly in the direction of arrow A (in a range which maintains the aforementioned rearward tilt) and tension of the lower layer sheet 50 is lowered.

In this state (the non-sitting state), the left and right tension coil springs 54 are slightly extended. A restoring force of the lower layer sheet 50 which is caused by the torsion bar 46 slightly twisting and the tension coil springs 54 extending is retained by friction between the upper layer sheet 52 and the lower layer sheet 50. Further, in this state, as shown in FIG. 5A, a front-rear direction portion of the lower layer sheet 50 which includes the portion corresponding to the hipbone joints of a sitter is disposed at an upper side relative to the upper edges of the side frames 28, that is, the upper flange portions 28A at the central portions. Thus, a structure is formed in which, in accordance with pivoting of the connecting pipe 44 in the direction of arrow A at a time of sitting, a downward movement stroke length of the rear end portion of the lower layer sheet 50 (a distorting tolerance, which will be described later) is assured.

Furthermore, side supports 62 with length in the front-rear direction, which respectively protrude upward relative to the upper layer sheet 52, are provided at two left and right edge portions of the seat cushion 18. As shown in FIG. 5A, the side supports 62 are structured with cushion members 62A, which are provided on the two left and right edge portions of the upper layer sheet 52 (left-right direction outer sides relative to the lower layer sheet 50) and the upper flange portions 28A of the side frame 28, and skin materials 62B, which cover the cushion members 62A. The cushion members 62A are structured by, for example, polyurethane foam or the like and can be integrated with the spacer member 60. Of the skin materials 62B, portions at one edge are connected with the upper side of the upper layer sheet 52 at left-right direction outer side portions relative to the lower layer sheet 50, and portions at the other edge are anchored at the lower flange portions 28B of the side frames 28.

These side supports 62 are principally provided on the upper layer sheet 52 that is disposed at the upper side relative to upper edges of the side frames 28, and thus are structured using the small volume cushion members 62A. Further, by employing such structures of the side supports 62, a structure in which the upper layer sheet 52 is directly stretched onto the sitting portion frame 14 as described above can be realized.

At the seat cushion 18 which is structured as described above, basically, the lower layer sheet 50 principally supports the body weight of a sitter and the upper layer sheet 52 supports a portion of the body weight of the sitter. Further, at the lower layer sheet 50, tension from the torsion bar 46 principally supports the body weight of the sitter, and tension from the tension coil springs 54 partially support the body weight of the sitter. At the seat cushion 18, because the upper layer sheet 52 is combined with the lower layer sheet 50 in which the area of tension is generated in three-dimensional directions in accordance with sitting as described above, overall compliance conforms with (matches) the compliance of a human body (the sitter) and impedance (force transmission characteristics) of muscle, which changes in accordance with a degree of nervous tension, posture and the like and/or vibrations, so as to ameliorate stresses such as pain, discomfort and the like which are based on pressure, restraint force and the like applied to the sitter and vibration transmissions.

Specifically, at the seat cushion 18, the rear end of the lower layer sheet 50 is anchored at the connecting pipe 44 and is supported at the sitting portion frame 14 via the torsion bar 46. Thus, overall tension is kept low, while tensions at the two left-right direction end portions due to the tension coil springs 54 are set high and tension at the front portion due to the belt member 56 and the tension coil springs 58 is set high. The high-tension regions due to the tension coil springs 54 realize body side support structures which support portions of the sitter, from the buttock portion to the thigh portion, from the side. Further, the belt member 56 and the tension coil spring 58 form the aforementioned dam-like member S with sitting, forward of the region corresponding to beneath the hipbone joints of the sitter.

Now, in order to generate the aforementioned area of tension in order to cause the cushion material 20 to conform with compliance, impedance and the like of muscles of the body, the above-described structural elements and the like are formed, disposed and/or specified with dimensions referred from a position Z below the body, that is, the hipbone joints. It is known that body pressure (support pressure) of the sitter is high in a vicinity of the position Z below the hipbone joints (for example, approximately 50% to 80% of body weight is concentrated in ranges with diameters of 98 mm centered directly below the hipbone joints), and the specification of dimensions of the portions structuring the seat cushion 18 with reference to the position Z below the hipbone joints is for specifying the above-mentioned area of tension on the basis of this knowledge. Here, specific dimensions and the like of the structural elements and the like are adjusted in accordance with angles according to hip point heights, design forms and body form differences of the vehicle seat 10 (design differences related to body shape specified for each of marketing regions, types of vehicles of installation and the like).

In the present embodiment, a position below the hipbone joints of the sitter is specified at a position with a separation in the front-rear direction of approximately 150 mm from the rear end of the seat cushion 18 (a front face of a lower portion of the seat back 22 during sitting). Further, the left and right tension coil springs 54 are respectively disposed at outer sides of the pelvis of the sitter, as mentioned above. Furthermore, the belt member 56 is disposed such that the dam-like member S is formed in a range within 100 mm forward of the position below the hipbone joints. In the present embodiment, the dam-like member S is formed at a position approximately 30 mm to 50 mm forward from the position Z below the hipbone joints. That is, the dam-like member S is formed such that, whoever is sitting, there will be no forward-sliding, there will be little compression of cutaneous blood flows, movement of the sacral bone in accordance with breathing is not obstructed and it is possible to sit in substantially the same position.

According to the above, at the seat cushion 18, there is structure with which forward-sliding of a sitter is impeded or suppressed by the dam-like member S, which is a resilient body, and front-rear and left-right movements of the sitter are suppressed by body side support of the sitter from the buttock portion to the thigh portion by high-stiffness surfaces at both the left and right edges. Thus, at the seat cushion 18, there is structure which eliminates forward-sliding, a hammock sensation, which is an effect in which a sitting posture does not stabilize, and the like, and which provides a flat sensation with respect to rolling, left-right direction inputs and the like. Further, at the seat cushion 18, for a person with a large physique, the body sides from the buttock portion to the thigh portion are supported at positions with higher surface stiffness due to being closer to tension lines due to the tension coil springs 54, and for a person with a small physique, the above-described body sides are supported at positions of comparatively low surface stiffness, which are separated to seat inward sides from the tension lines due to the tension coil springs 54, and a structure is formed which absorbs differences in physique.

Meanwhile, a portion of the seat cushion 18, other than the two left and right edges at which the tensions of the tension coil springs 54 act and the front portion at which downward distorting of the lower layer sheet 50 is restricted by the belt member 56, serves as a low-stiffness surface due to the support structure of the lower layer sheet 50 by the movable frame 34 via the torsion bar 46. At the seat cushion 18, the length of the connecting pipe 44 is set larger than distances between hipbone joints, such that this low-tension surface includes positions below the hipbone joints of sitters. Thus, a structure is formed in which, for bone protrusion portions, such as a sacral bone portion, a hipbone portion and the like, larger changes occur locally in the cushion material 20 than at peripheral portions, but in regard to portions peripheral to the bone protrusion portions, which feature large amounts of muscle, large changes do not occur, due to cushion characteristics of the seat cushion 18 which resemble muscle, as described later. Further, because tension due to the torsion bar 46 acts two-dimensionally (in a plane) because of the connecting pipe 44, a slump of posture of the sitter is prevented, and creasing of the seat surface due to a concentration of pressure because of a lopsided sitting posture is prevented.

As described above, by the formation of an area of tension with a low-tension portion and high-tension portions at the lower layer sheet 50 due to volume support in the third dimension direction, the cushion material 20 achieves general impedance-matching and compliance-matching with the human body. Consequently, at the seat cushion 18, posture of a sitter is maintained while offset forces (surface tangential directions), pressures (perpendicular directions) and the like which are applied to skin, muscle and the like of the sitter are reduced, and tiring, pain and the like in accordance with a long period of sitting can be reduced.

Figure 8A:
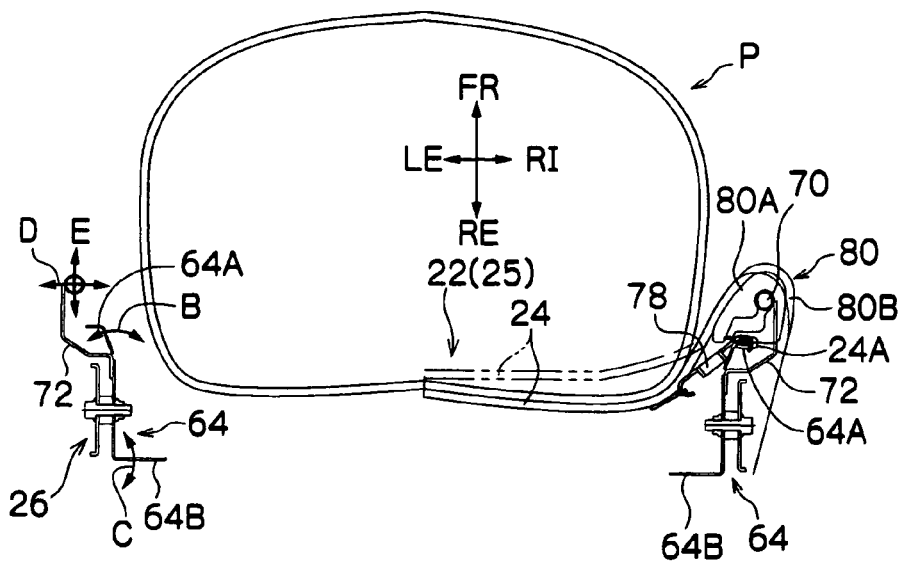
FIG. 8A is a sectional view cut along line 8A-8A of FIG. 6.
Figure 13A:
FIG. 13A is a view showing body pressure distribution of the vehicle seat relating to an embodiment of the present invention.
Figure 13B:
FIG. 13B is a view showing body pressure distribution of a conventional seat for comparison.
Figure 13C:
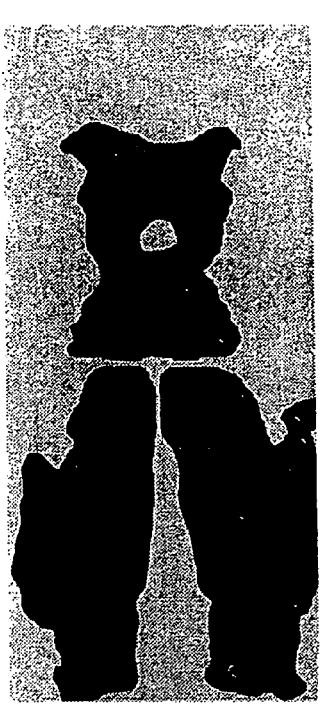
FIG. 13C is a view showing body pressure distribution of a conventional seat which differs from FIG. 13B for comparison.

Now, in FIG. 13A, a body pressure distribution of a person sitting at the vehicle seat 10 is shown. Meanwhile, FIGS. 13B and 8C show body pressure distributions of persons sitting at other vehicles seats, which are shown for comparison. FIG. 13B is a body pressure distribution according to a vehicle seat of a so-called posture maintenance type having hard cushion characteristics (for example, a conventional seat employing polyurethane foam in a cushion material), and FIG. 13C is a body pressure distribution according to a vehicle seat of a so-called body pressure distribution type having soft cushion characteristics (for example, a seat in which a three-dimensional woven fabric is simply stretched onto the sitting portion frame 14).

With the seat cushion 18 of the vehicle seat 10, it is understood that, rearward of a portion corresponding to positions at which the belt member 56 is disposed, the buttock portion and the thigh portion are principally supported by dispersing and supporting body pressure at a continuous support surface with a broad range, while the buttock portion (the pelvis) and the thigh portion are supported from the side with high pressure. That is, the seat cushion 18 is a structure which suppresses left-right direction movements of the sitter by continuously supporting the body sides of the sitter from the buttock portion to the thigh portion as described above, and suppresses movement of the sitter in the front-rear direction by the dam-like member S. Further, at the seat cushion 18, it can be seen that body pressure below the hipbone joints of the sitter is remarkably low. This is due to a spring zero characteristic, which will be described later. The present vehicle seat 10, in consideration of support characteristics due to the seat back 22, which will be described later, can be referred to as a body side support-type seat which is provided with body pressure distribution characteristics.

FIG. 7 are drawings showing a deformed state of the cushion material 20 in a sitting state in schematic views. In these drawings, G represents the thigh portion of a sitter P (see FIG. 6), and H the buttock portion of the sitter P. FIG. 7A shows a sectional view cut along 7A-7A of FIG. 6, which corresponds to approximately 300 mm forward from below the hipbone joints, FIG. 7B shows a sectional view cut along 7B-7B of FIG. 6, which corresponds to approximately 200 mm forward from below the hipbone joints, FIG. 7C shows a sectional view cut along 7C-7C of FIG. 6, which corresponds to approximately 50 mm forward from below the hipbone joints (the position of the center of gravity of the sitter), and FIG. 7D shows a sectional view cut along 7D-7D of FIG. 6, which corresponds to below the hipbone joints, respectively. From these drawings, it is understood that the seat cushion 18 is a structure which supports a rear portion of the thigh portion G and the buttock portion H of the sitter from the side. Here, extension of the lower layer sheet 50 in the front-rear direction is suppressed to 20% or less by operation of the movable frame 34 (twisting of the torsion bar 46).

Figure 14A:
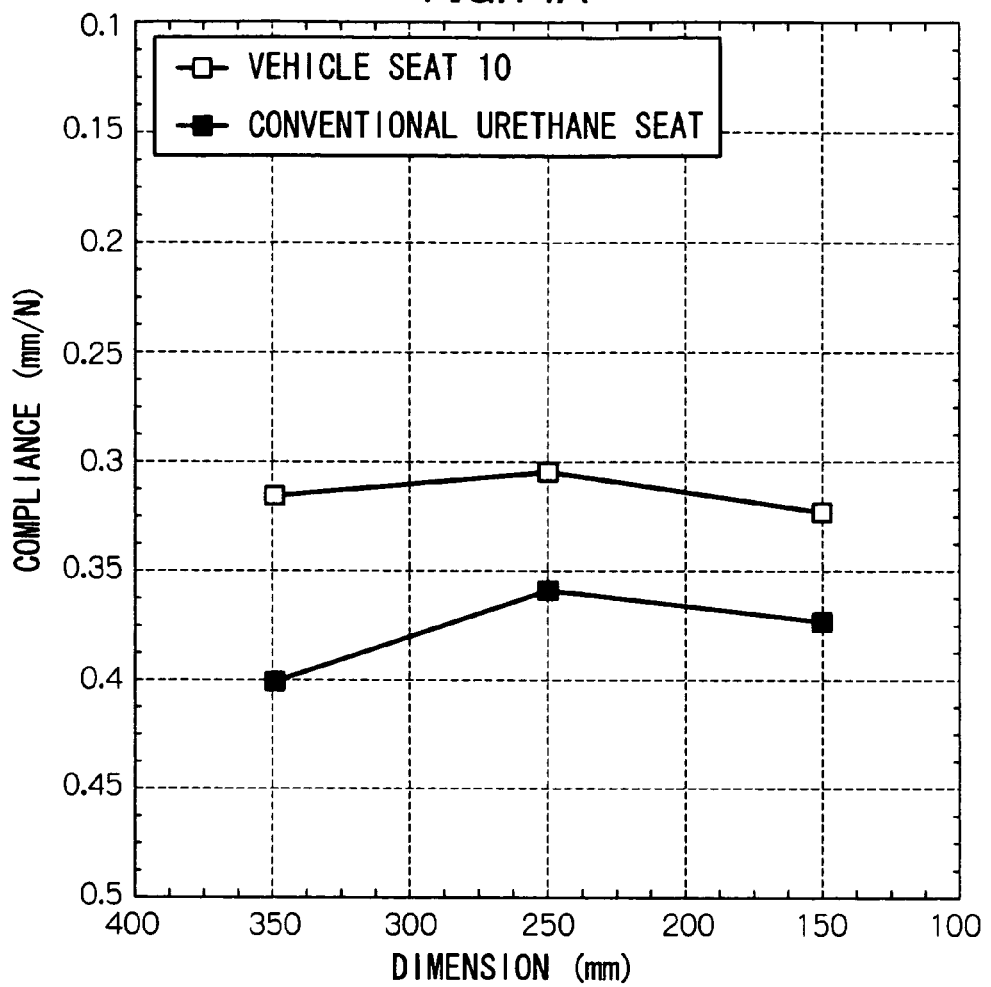
FIG. 14A is a graph showing compliances of portions of a seat cushion structuring the vehicle seat relating to an embodiment of the present invention.
Figure 14B:
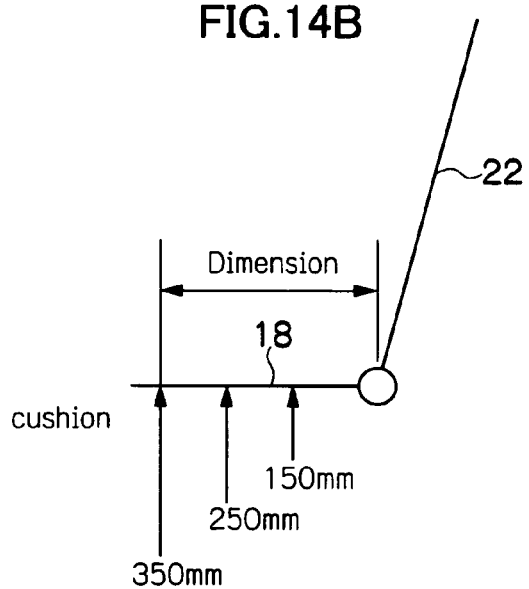
FIG. 14B is a schematic view showing measurement locations of the compliances of FIG. 14A.

Further, in FIG. 14A, compliances of portions shown in FIG. 14B in the front-rear direction of the seat cushion 18 are shown. In this figure, a position 150 mm from the rear end of the seat cushion 18 corresponds to the position below the hipbone joints, a similar position at 250 mm corresponds to slightly forward of the dam-like member S, and a similar position at 350 mm corresponds to a position at which the belt member 56 is disposed. Further, compliances at corresponding positions of a representative conventional seat are shown in this figure for comparison. It can be seen that the seat cushion 18 of the vehicle seat 10 relating to the present embodiment realizes significantly large compliances (small spring constants) in comparison with the conventional seat.

Figure 15C:
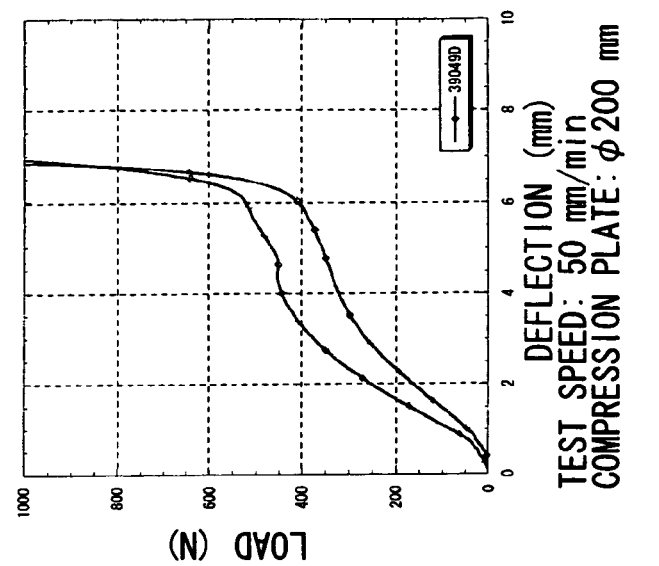
FIGS. 15A, 15B and 15C are, respectively, graphs showing results of measurement, in different conditions, of load-distortion characteristics of an upper layer sheet which structures the vehicle seat relating to an embodiment of the present invention.
Figure 15B:
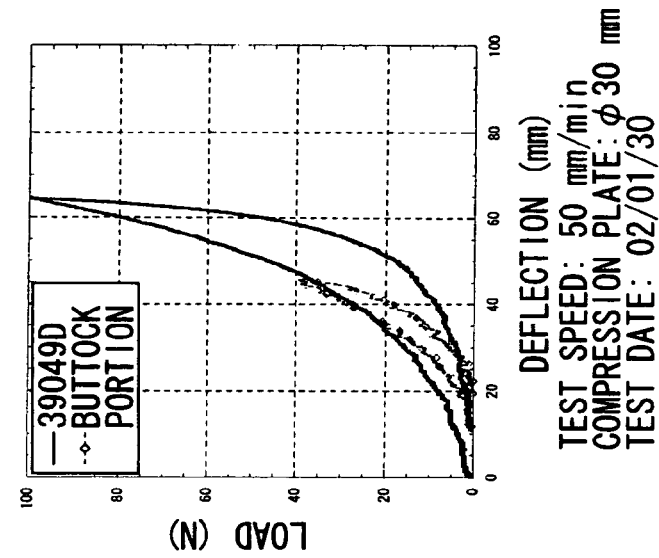
Figure 15A:
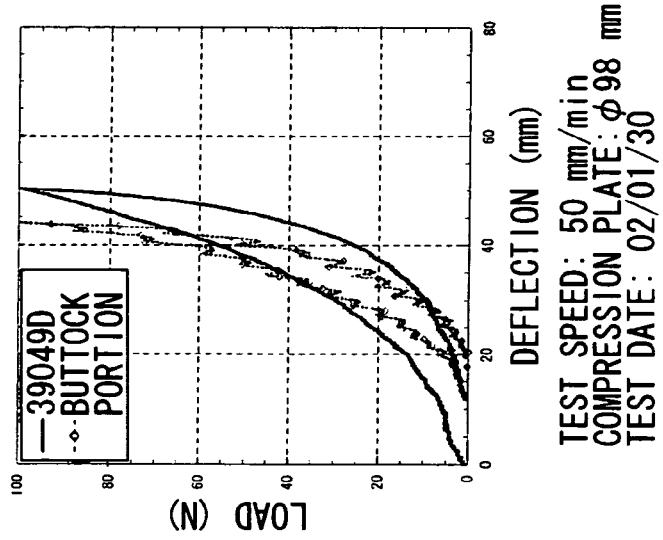

Furthermore, stationary load-distortion characteristics of the single upper layer sheet 52 (the three-dimensional woven fabric 110) are shown in FIG. 15. FIGS. 15A and 15B are stationary load-distortion characteristics of cases in which discs with different dimensions are pressed against a central portion of the upper layer sheet 52, which is stretched onto a rectangular frame-form jig with a size substantially corresponding to the sitting portion frame 14 in a state in which the four sides are fixed, at a speed of 50 mm/min until a predetermined loading. For FIG. 15A, the diameter of the disc is set to 98 mm and the predetermined loading to 100 N. For FIG. 15B, the diameter of the disc is set to 30 mm and the predetermined loading to 100 N. However, for FIG. 15B, a loading upper limit on a human body is set to 40 N. FIG. 15C shows a stationary load-distortion characteristic of a case in which a disc of 200 mm diameter is pressed against a central portion of the upper layer sheet 52, which is simply placed at a solid body surface, at a speed of 50 nm/min until a loading of 1000 N. From these figures, it can be seen that stationary load-distortion characteristics of a human body and the upper layer sheet 52 generally coincide. Further, with the load-distortion characteristic of FIG. 15A according to the disc of diameter 98 mm, which corresponds to a range in which body weight of a sitter is concentrated as mentioned above, it is understood that a spring constant of the upper layer sheet 52 is small. In particular, with the load-distortion characteristic of FIG. 15B according to the disc with diameter 30 mm, which corresponds to a region below a hipbone joint, it is understood that a spring constant of the upper layer sheet 52 is even smaller. With FIG. 15C, it is understood that the load-distortion characteristic of the upper layer sheet 52 is a three-dimensional curve form, and at distorting of around 4 mm, the spring constant, which is the gradient of the load-distortion curve, is substantially zero. According to the above, it is understood from FIGS. 15A and 15B that the upper layer sheet 52 achieves similarity with characteristics of muscle, and it is understood from the characteristic shown in FIG. 15C that stationary loading changes are absorbed, that compliance-matching is achieved by co-operation with metal springs, that impedance changes with further increases/reductions of tension, and that impedance-matching corresponding to fluctuations of the muscles of the human body is achieved.

Figure 16A:
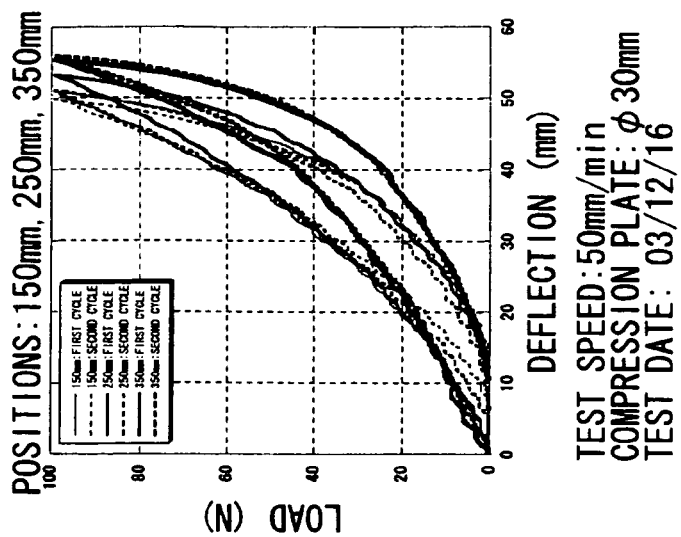
FIGS. 16A, 16B and 16C are, respectively, graphs showing results of measurement, in different conditions, of load-distortion characteristics of a seat cushion which structures the vehicle seat relating to an embodiment of the present invention.
Figure 16B:
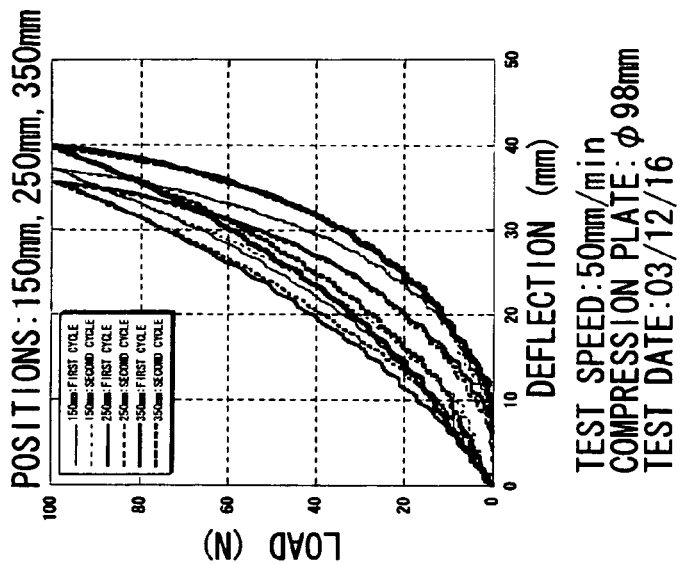
Figure 16C:
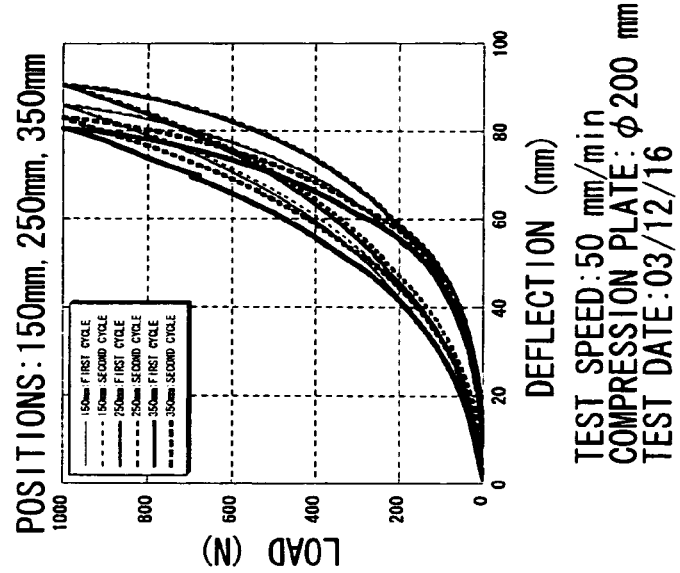

In FIG. 16, stationary load-distortion characteristics of the seat cushion 18 are shown. FIGS. 16A to 16C are stationary load-distortion characteristics of cases in which discs of different dimensions are pressed against positions of the seat cushion 18 corresponding to the measurement positions of the aforementioned FIG. 14, at a speed of 50 mm/min until a predetermined loading. For FIG. 16A, the diameter of the disc is set to 200 mm and the predetermined loading to 1000 N. For FIG. 16B, the diameter of the disc is set to 98 mm and the predetermined loading to 100 N. For FIG. 16C, the diameter of the disc is set to 30 mm and the predetermined loading to 100 N. As shown in these figures, it can be seen that, at the seat cushion 18, the characteristics in which the discs of diameters 30 mm, 98 mm and 200 mm are pressed on are characteristics which are substantially the same regardless of a position of a sitting surface that is pressed. That is, the seat cushion 18 maintains characteristics similar to the load-distortion characteristic of muscle of the human body over the whole sitting surface. Meanwhile, when a large load is applied by pressing on with the disc of diameter 200 mm, the torsion bar 46 twists and the lower layer sheet 50 distorts without tension increasing. Therefore, the spring constant is reduced, in comparison with the characteristic of the single upper layer sheet 52 with four sides fixed. That is, the lower layer sheet 50 principally supports body weight of the sitter, and a structure which produces a stroke length in accordance with sitting is realized.

Further, it is understood that, at the seat cushion 18, a spring constant with respect to a disc with a small surface area, which corresponds to a protrusion portion of a human body, becomes smaller (compliance is larger), and loads that act on protrusion portions of the body are ameliorated, while an anchoring effect which enfolds the protrusion portion in the seat cushion 18 can be produced. That is, because the spring constant becomes extremely small at a pressure range corresponding to a disc with a small area, in an equilibrium state in which there are no loading changes, which corresponds to a stationary sitting state, a characteristic in which the spring constant becomes much smaller at a range corresponding to a region below the hipbone joints than a region at an outer side thereof is realized (below referred to as the spring zero characteristic). This spring zero characteristic produces the above-mentioned anchoring effect, and a forward-sliding prevention effect due to the resilient dam-like member S is pronounced. In particular, it can be seen that the spring constant becomes extremely small at a range with diameter 30 mm below a hipbone joint (see the data for 150 mm in FIG. 16C). Further, because, as mentioned above, approximately 50% to 80% of the body weight of the sitter is concentrated in a range of diameter 98 mm centered directly below the hipbone joint, the experimental results according to the disc of diameter 98 mm shown in FIG. 16B are characteristics close to a load-distortion characteristic of the sitting state. From this figure, it can be seen that if the position below the hipbone joint serves as a reference, there is an ideal characteristic in which a position 10 mm forward (250 mm) is fairly hard, and a seat front end portion (350 mm) is soft. Here, it is understood that the spring constant becomes smaller in the range of diameter 98 mm centered directly below the hipbone joint, in comparison with a region further to the outer side thereof. Furthermore, as shown in FIG. 16A, it is understood that a large spring constant is obtained in response to the pressure with diameter 200 mm, and the seat cushion 18 is provided with sufficient restoring force overall, while the above-described examples of spring characteristics are realized.

At this seat cushion 18, a portion with higher surface stiffness than other portions is formed at the two left and right edge portions and the front portion, in order to realize the aforementioned flat sensation. However, as described above, because the so-called muscle characteristics which are similar to muscles of a sitter are set, crushing of muscles is prevented. Meanwhile, a structure is formed in which, at the other portion of the seat cushion 18, which is a low-stiffness surface, shear forces, perpendicular forces and the like which act on the muscles of the sitter are reduced due to the above-described spring zero characteristic, and compression of blood vessels by pressures due to accelerations caused by vibrations, body weight and the like is suppressed. In particular, shear forces, perpendicular forces and the like that act on muscles surrounding below the hipbone joints (the ranges with approximate diameter 30 mm centered below the hipbone joints), at which the body weight of the sitter is concentrated, are reduced and compression of cutaneous blood flows (blood vessels) is suppressed.

Further still, at a region of the seat cushion 18 including the positions below the hipbone joints at which surface stiffness is reduced as described above, a soft jerk characteristic is realized. That is, a rate of change of acceleration (force) in a moving state is reduced, such that there are no extremely large values and the duration (the duration required for a change of acceleration) is extended. Thus, a structure which absorbs pressure changes of the aforementioned area of tension is formed. Thus, changes in a body pressure distribution at times of input of very small vibrations and the like are suppressed, and the aforementioned preferable body pressure distribution-type body pressure distribution is maintained. The region of the seat cushion 18 including the positions below the hipbone joints at which surface stiffness is reduced as described above absorbs fluctuations of muscles of a sitter, such that reaction forces in accordance with the fluctuations are not applied to the sitter. In FIG. 17A, ratios of jerk of the seat cushion 18 (a region C) to jerk of muscle of the buttock portion of the body are shown. From this figure, it is understood that in the jerk characteristic of the seat cushion 18, the jerk at each point in time is substantially half or less relative to the jerk of the muscle of the buttock portion of the body, which is a characteristic which is significantly soft relative to the muscle. Here, as shown in FIG. 17B, it is possible to specify so as to obtain a jerk characteristic which is substantially equivalent to that of muscle.

Figure 34A:
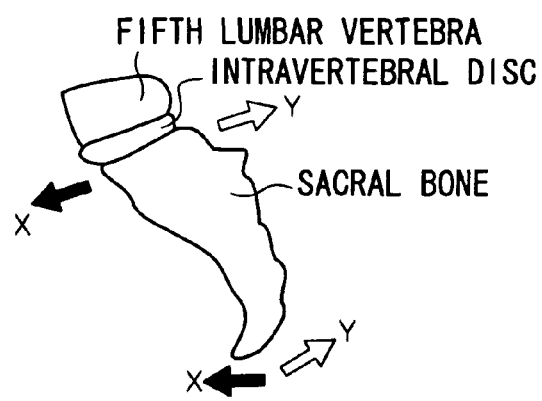
FIG. 34A is a view showing movements of the sacral bone in accordance with breathing of a person.
Figure 34B:
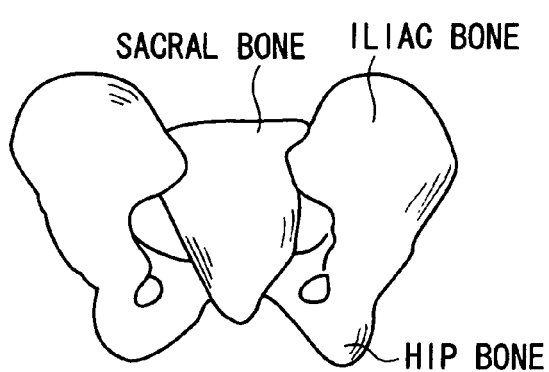
FIGS. 34B and 34C are views showing a positional relationship between the sacral bone and the pelvis.
Figure 34C:
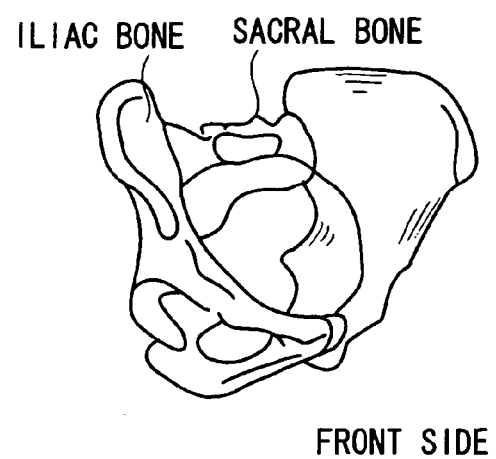

Furthermore, the seat cushion 18 is a structure which realizes the spring zero characteristic by the rear end of the lower layer sheet 50 descending while moving forward (pivoting in the direction of arrow A) in accordance with twisting of the torsion bar, due to loading, and moving in the opposite direction due to loading removal, and therefore is a structure which does not hinder breathing of a sitter. Specifically, as shown in FIG. 34A, the sacral bone of a person in a sitting state moves downward-forward in accordance with inhalation as shown by arrow X, and moves upward-rearward in accordance with exhalation as shown by arrow Y. At the seat cushion 18 which realizes the above-described spring zero characteristic by the above-described movements of the rear end of the lower layer sheet 50, the spring zero characteristic is realized even with displacements in the direction of arrow A. Consequently, in a stationary sitting state, the seat cushion 18 displaces to follow movements of the sacral bone of the sitter with body pressure (loading) hardly changing, and enables the performance of breathing without the sitter using muscle force. Thus, it is possible to maintain posture without suppressing movements of the sacral bone, and therefore stresses (pain at a lumber region) which are applied to the sitter are ameliorated. This operation will be described later. FIGS. 34B and 34C show relationships between the sacral bone and the pelvis.

Further, because the torsion bar 46 of the movable frame 34 (and the tension coil springs 54) serves as a principal spring element in the up-down direction, the seat cushion 18 reduces a spring constant in the up-down direction, and a resonance frequency of a vibration system structured to include the sitter (the natural frequency) is lowered. In other words, because tension of the lower layer sheet 50 is kept low during sitting, the torsion bar 46 is a principal spring element of the seat cushion 18, and it is possible to set the resonance frequency of the above-mentioned vibration system by characteristics of the torsion bar 46. In the present embodiment, a spring constant of the above-mentioned vibration system of which the torsion bar 46 is the principal spring element is set such that a resonance frequency when a sitter of a standard weight is sitting is approximately 3.5 Hz. Thus, because the torsion bar 46 is employed, a structure is realized which sets the resonance frequency low while assuring a restoring force, which was difficult heretofore.

Figure 18A:
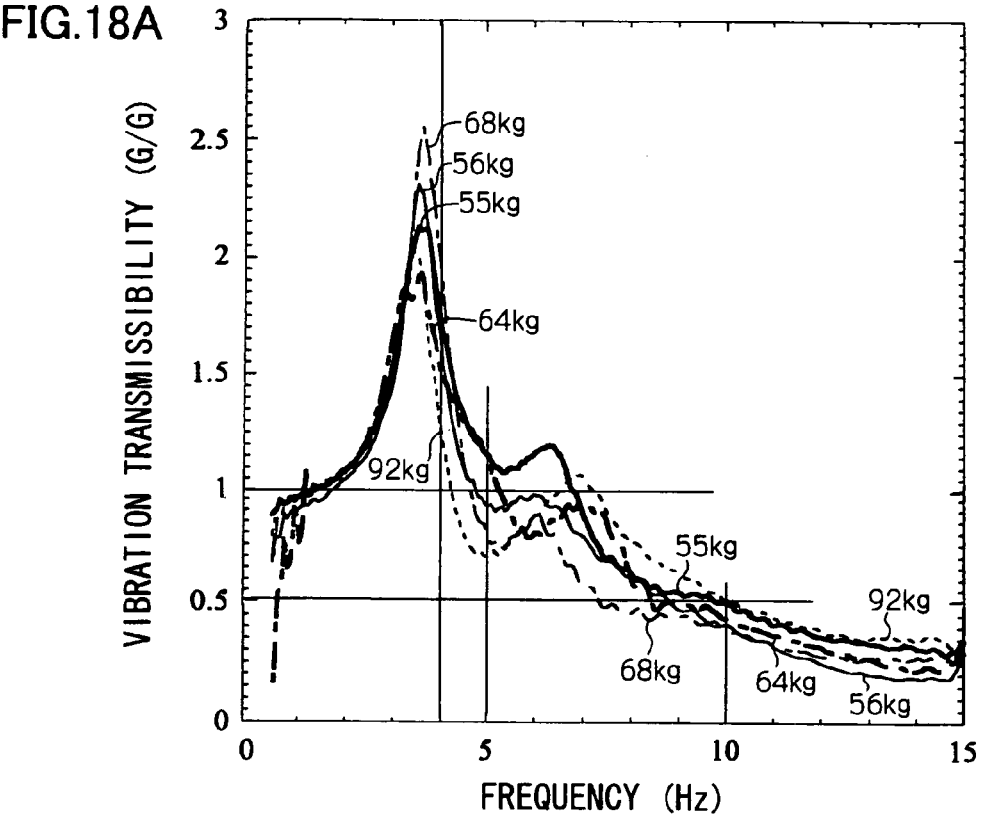
FIG. 18A is a graph showing vibration transmissibilities of a vehicle seat relating to an embodiment of the present invention.

Considering that, in theory, a vibration transmissibility (an input/output amplitude ratio) becomes 1 at a frequency of $\sqrt{2}$ times a resonance frequency, the above-mentioned resonance frequency is set in order for the vibration transmissibility to be approximately 1 when a vibration of around 5 Hz ($\approx 3.5 \times \sqrt{2}$), which is a resonance frequency region of the spinal column of a person, is input. Now, the standard weight is set, for example, for each of customer groups such as marketing regions, vehicles of installation or the like of the vehicle seat 10, but in the present embodiment is set to 64 kg. From vibration transmissibility curves of the vehicle seat 10 which are shown in FIG. 18A, it is understood that a structure is realized in which the resonance frequency is approximately 3.5 Hz, and a frequency at which the vibration transmissibility becomes 1 is approximately 5.2 Hz, which is in the resonance frequency region of the spinal column.

Thus, when a vibration in the resonance frequency region of the spinal column of a person is input to the vehicle seat 10, movements of the line of sight of the sitter coincide with movements of the vehicle seat 10 (the vehicle), and stresses applied to the sitter are ameliorated. Further, this approximately 3.5 Hz is significantly lower than resonance frequencies of various conventional automobile seats, as will be described later. Thus, a resonance frequency region of the above-mentioned vibration system (for example, the width at half-power points) is narrower, and the resonance frequency region is quickly passed through in a process in which frequency continuously rises due to, for example, acceleration of the vehicle.

Furthermore, the seat cushion 18, with the two-layer structure in which the lower layer sheet 50 whose rear end is anchored at the movable frame 34 and the upper layer sheet 52 which is stretched onto the sitting portion frame 14 are combined, is formed with a non-linear spring constant characteristic in which, rather than the load-distortion characteristics shown in the aforementioned FIG. 16, that is, characteristics with comparatively strong linearity, a spring constant (a gradient which is obtained by differentiating loading by displacement) becomes larger the larger a displacement (distortion). Thus, because the spring constant becomes larger the heavier the body weight of a sitter, a dependency on mass (body weight) of the resonance frequency, which is proportional to the square root of a value of the spring constant divided by mass $((k/m)^{1/2})$ is ameliorated, and a structure is formed in which the resonance frequency does not greatly shift even when persons with different body weights are sitting. In the present embodiment, as shown in FIG. 18A, in experimental results with persons of weights from 55 kg to 92 kg sitting, it is confirmed that the resonance frequency is between 3.3 Hz and 3.7 Hz, and a mass dependency of the resonance frequency is extremely small.

The non-linear spring constant characteristic of the seat cushion 18 as described above is realized by a tension characteristic (load-stretch characteristic) of the upper layer sheet 52 which easily stretches in the left-right direction, which is the three-dimensional woven fabric 110, being, for example, a characteristic as shown in FIG. 19, that is, a non-linear characteristic in which loading rises steeply when an amount of stretching reaches a predetermined amount or greater. Because the upper layer sheet 52 with such a characteristic is stretched onto the sitting portion frame 14 separately, spring elements of the lower layer sheet 50, which are constituted by the tension coil springs 54 and the like, are regarded as parallel spring elements, and further, because it principally stretches in the left-right direction and distorts downward due to sitting, singly, the load-stretch characteristic resembles the characteristic shown in FIG. 19.

Because the seat cushion 18 is a structure in which this upper layer sheet 52 pushes the lower layer sheet 50 downward in accordance with sitting, in a state of sitting of a person with a light body weight (of around the standard body weight), that is, in a state in which extension (the spring constant) of the upper layer sheet 52 is small, the lower layer sheet 50 principally supports the body weight of the sitter, and the torsion bar 46 (and the tension coil springs 54) restricts the spring constant of a vibration system of the seat cushion 18 which includes the sitter. On the other hand, in a state of sitting of a person with a heavy body weight, the upper layer sheet 52 is greatly displaced and a body weight that it supports is increased, and a large spring constant of the upper layer sheet 52 (in the extension region at or above the above-mentioned predetermined amount) is added to the spring constants due to the torsion bar 46 and the tension coil springs 54. Thus, at the seat cushion 18, as described above, a non-linear spring constant characteristic is formed in which the larger the displacement, the larger the spring constant. Here, at the upper layer sheet 52, in a case in which displacement is small, the spring constant thereof is small and a large reaction force does not act.

Further, at the seat cushion 18, due to the spring constant characteristic described above, comparatively small loading displacements of around 0.3 G which are generated by, for example, usual running are absorbed in a range of initial tension of the torsion bar 46. Furthermore, at the seat cushion 18, because the principal spring element of the lower layer sheet 50 is the torsion bar 46 whose displacement direction is mechanically determined, front-rear direction vibrations and pitching vibrations which act on the vehicle seat 10 are converted to up-down direction vibrations.

Furthermore, at the seat cushion 18, because the lower layer sheet 50 as described above is a structure in which the rear end thereof is anchored at the movable frame 34 and the rear edge approaches the front edge and reduces tension in accordance with distorting downward, a structure is formed in which a large attenuation acts downward with respect to an impact load. That is, if, for example, an impact load acts and the sitter sinks into the seat cushion 18, the torsion bar 46 momentarily twists and tension of the lower layer sheet 50 relaxes, and a period in which this lower layer sheet 50 causes tension while receiving the load becomes longer, which is to say, a stroke length with respect to the input load becomes larger, and an attenuation ratio becomes larger. Further, because the lower layer sheet 50 is a three-dimensional woven fabric, an attenuation force is caused in accordance with stretching thereof and, in other words, a following delay with respect to the twisting of the torsion bar 46 is caused by a phase delay from the resilient force of this attenuation force and a relaxed state is maintained for a longer period, while a larger attenuation force with respect to the impact load is caused.

Meanwhile, at the seat cushion 18, structure is formed by the torsion bar 46 and the tension coil springs 54 which causes a restoring force upward from the downward distorted state. That is, resilient force of the metal springs with good linearity serves as a restoring force, and thus a case where the restoring force of the seat cushion 18 is insufficient is prevented. Further, in a case in which the body weight of the sitter is heavy, the resilient force of the upper layer sheet 52 added to the above-mentioned large spring constant acts as the restoring force, and a structure is formed which ameliorates mass dependency of the moving characteristics as described above.

Figure 20B:
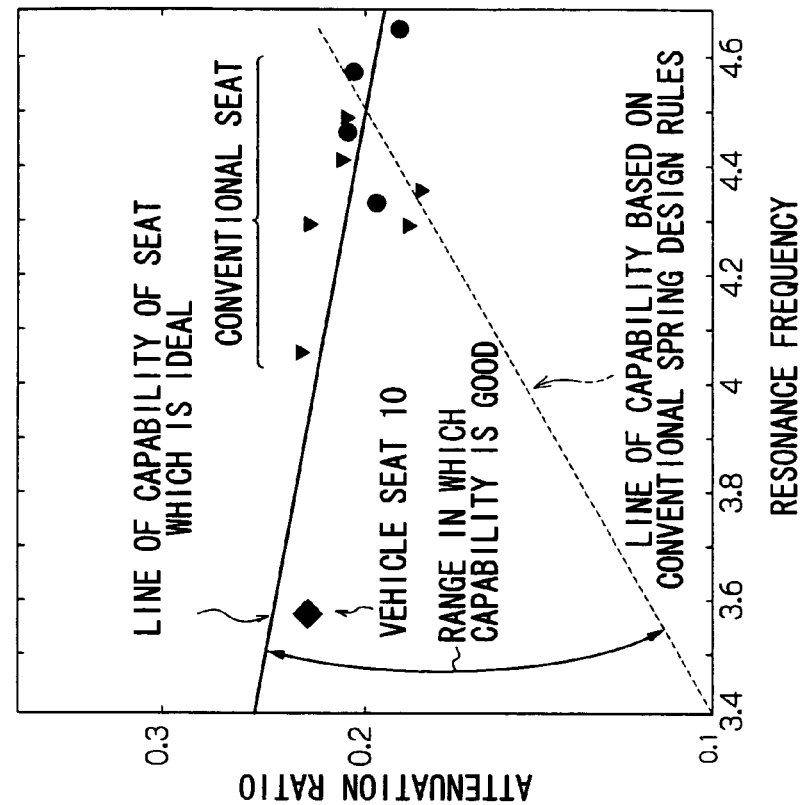
FIG. 20B is a graph showing relationships between resonance frequencies and attenuation ratios in seat cushions of a vehicle seat relating to an embodiment of the present invention and conventional types of seat.
Figure 20A:
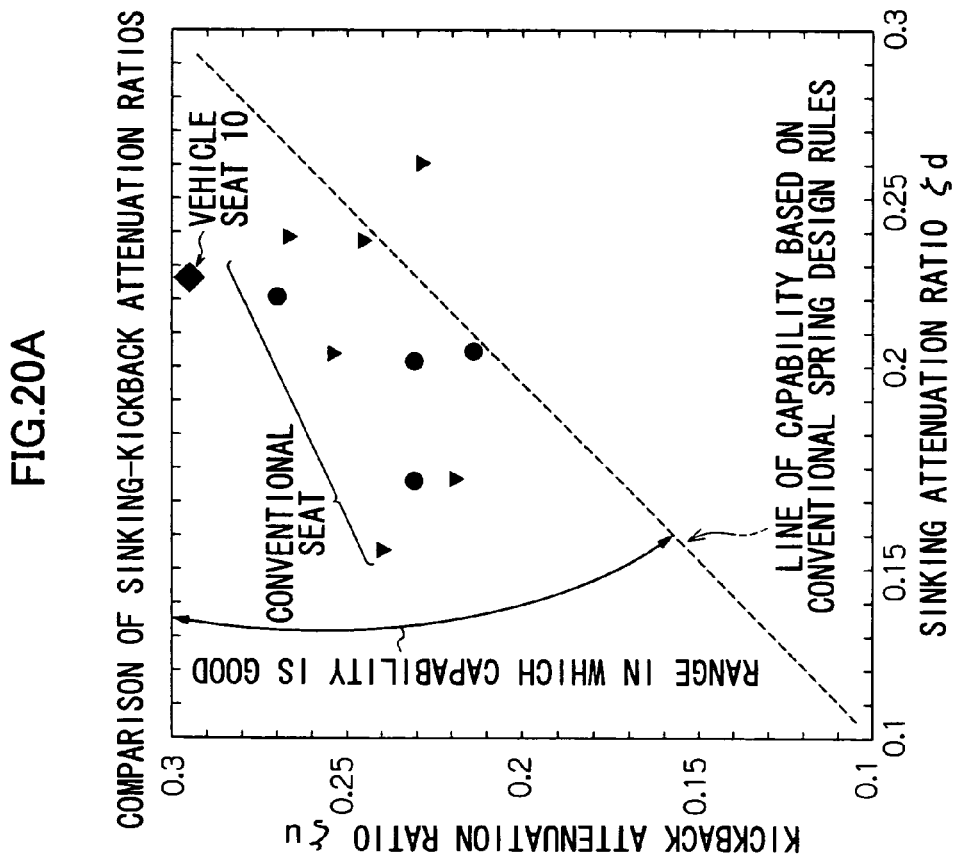
FIG. 20A is a graph showing relationships between attenuation ratios of sinking-in and attenuation ratios of kickback in seat cushions of a vehicle seat relating to an embodiment of the present invention and conventional types of seat.

At this seat cushion 18, as shown in FIG. 20A, structure is formed in which an upward attenuation ratio $\zeta u$ is larger than a downward attenuation $\zeta d$. Thus, at a time of restoration after, for example, an impact load acts and the sitter sinks into the seat cushion 18, a large attenuation acts and a sensation of bottoming out is reduced, and furthermore, displacement upward of the sitter is reduced. That is, the seat cushion 18 is a structure in which attenuation in a loading direction is large and rebounding (bouncing up) of the sitter is prevented. Further, because the attenuation ratio $\zeta u$ is larger than the attenuation ratio $\zeta d$, a required restoration force is assured, while a resonance frequency (natural frequency) can be made smaller, as shown in FIGS. 20A and B.

Figure 21:
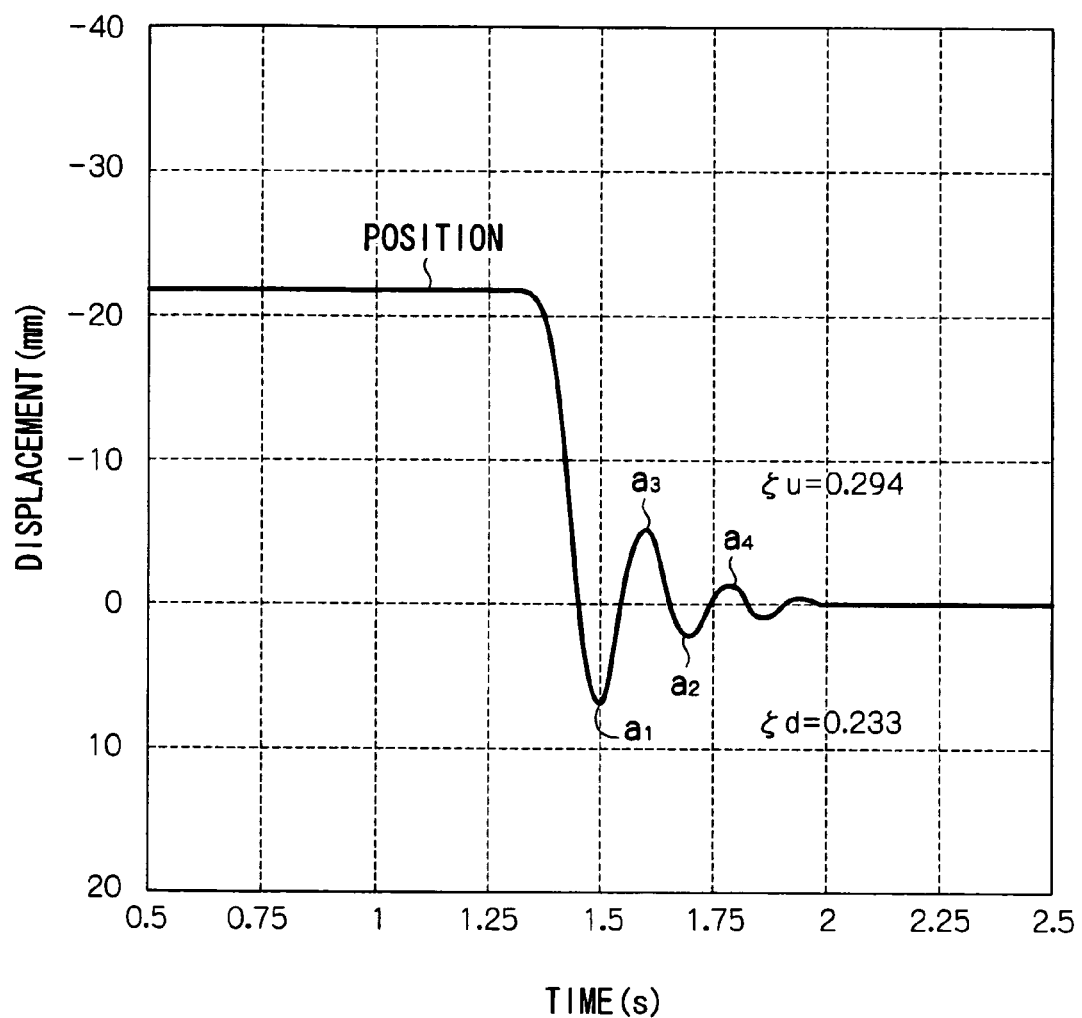
FIG. 21 is a graph showing a displacement response curve for calculating the attenuation ratio of sinking-in and the attenuation ratio of kickback of a seat cushion of a vehicle seat relating to an embodiment of the present invention.

Now, in the present embodiment, the attenuation ratios $\zeta d$ and $\zeta u$ are calculated from a displacement response curve to a weight shown in FIG. 21, of a case in which the weight (6.7 kg) is dropped from a height of approximately 22 mm onto a portion corresponding to the aforementioned region C of the seat cushion 18. Of the displacements in FIG. 21, the positive values correspond to displacements of the seat cushion 18 downward from an unloaded state (sinking in) and the negatives correspond to displacements upward (kicking back) from the unloaded state. $\zeta d$ is calculated from an attenuation ratio of extremal values a1 and a2 of the positive side of the displacement response curve, and $\zeta u$ is calculated from an attenuation ratio of extremal values a3 and a4 of the negative side of the displacement response curve. In the present test, $\zeta d$ is approximately 0.23 and $\zeta u$ is approximately 0.29, and the difference 0.06 therebetween is recognized as a significant difference. Cu is larger thus because extension of the upper layer sheet 52 becomes smaller in a process of displacement upward, and thus an effect of a spring constant of the upper layer sheet 52 becomes smaller, while a function of the upper layer sheet 52 as a spring element is maintained, and a spring constant of the vibration system of the seat cushion 18 is reduced.

Further, because the attenuation ratios $\zeta d$ and $\zeta d$ are respectively comparatively large at 0.23 and 0.29, at the seat cushion 18, structure is formed in which a maximum value of the aforementioned vibration transmissibility is reduced. Thus, structure is realized in which a vibration transmissibility in a case in which a vibration at the resonance frequency is imparted in a state in which a person of standard weight is the sitter is restricted to a range of 2.0±0.2. In the present embodiment, as shown in FIG. 18A, for a sitter of body weight 64 kg, the maximum vibration transmissibility was approximately 1.93. Furthermore, because the attenuation ratio $\zeta d$ is set comparatively small, action from an excessive force on the sitting portion frame 14 at a time of absorption of; for example, impact energy is prevented. Here, a lower limit of the vibration transmissibility is set in order to make a frequency region of the aforementioned half-power points equal to or less than a predetermined width.

Figure 22A:
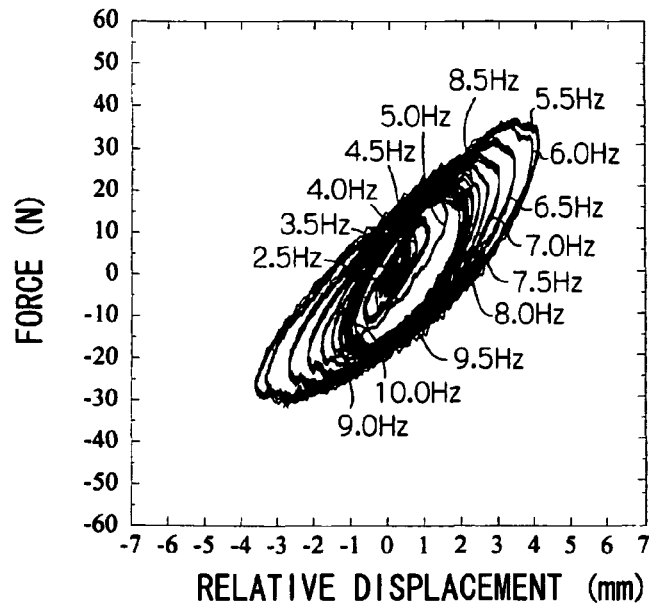
FIG. 22A is a graph showing dynamic characteristics of displacement and loading of a seat cushion of a vehicle seat relating to an embodiment of the present invention.
Figure 22B:
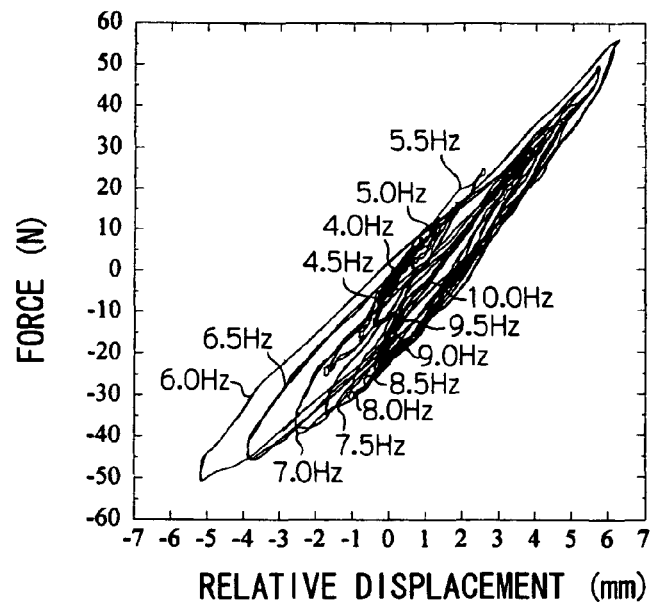
FIG. 22B is a graph showing dynamic characteristics of displacement and loading of a seat cushion of a representative conventional seat for comparison.
Figure 22C:
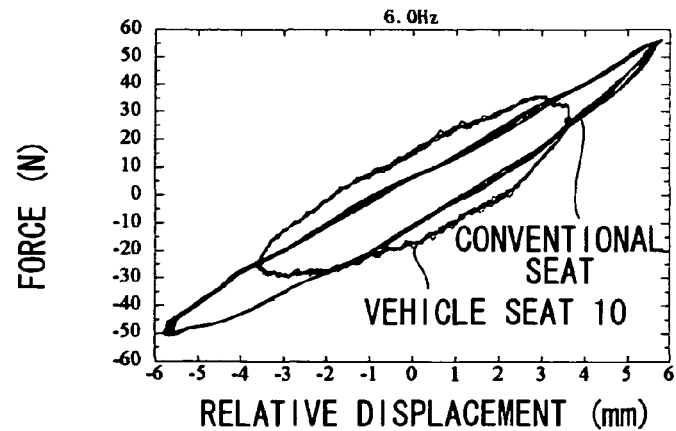
FIG. 22C is a graph in which dynamic characteristics in the vicinity of resonance points of FIGS. 22A and 22B are combined.

FIG. 22A shows relationships (Lissajous) between displacement responses and loading of the weight in cases in which forced vibrations with a predetermined amplitude (peak amplitude 1 mm) are applied to the seat cushion 18, at which the weight (6.7 kg) has been placed. In this figure too, the positive displacements correspond to displacements of the seat cushion 18 downward (sinking in) and the negative displacements correspond to displacements upward (kicking back) from the unloaded state. From this figure, it is understood that the seat cushion 18 applies large attenuations at each frequency (attenuation capacity is large). Further, because the response displacements of the weight are smaller at the upper side than at the downward side at each frequency, particularly in the vicinity of the resonance frequency, it is understood that the attenuation ratio $\zeta u$ is larger than the attenuation ratio $\zeta d$. FIG. 22B is experimental results of the same conditions according to a conventional urethane sheet, which are shown for comparison. It is understood that response amplitudes of the weight are larger because attenuation quantities are smaller in comparison with the vehicle seat 10. In FIG. 22C, the Lissajous curves of the vehicle seat 10 and the above-mentioned urethane sheet at 6.0 Hz, in the vicinity of the resonance frequencies, are combined, and differences between attenuation quantities and response amplitudes of the two are well understood. Here, FIG. 22C is a view constructed in which intermediate points between maxima and minima of the response amplitudes have been adjusted so as to be zero displacements.

Furthermore, at the seat cushion 18, structure is realized in which a vibration transmissibility at 10 Hz is greatly reduced, because the above-described attenuation ratios and low resonance frequency are realized. In the present embodiment, as shown in FIG. 18A, the vibration transmissibility at 10 Hz is suppressed to 0.5 or less except for a sitter of body weight 92 kg. Further, even with the sitter with body weight 92 kg, the vibration transmissibility is around 0.52, and can be said to be suppressed to substantially around 0.5. Meanwhile, 11 Hz is a frequency region which causes α waves (a relaxed waking state) in the brain of a sitter. Here, because vibrations in the vicinity of 10 Hz are attenuated and transmitted to the sitter, α waves are caused without providing an unpleasant sensation to the sitter, and application of a relaxed waking state with little drowsiness is enabled. Here, a frequency of α waves which would be caused when drowsiness was sensed is in the vicinity of 8 Hz.

Further, the upper layer sheet 52 which is the three-dimensional woven fabric 110 requires a certain period until complete restoration of weakening after a long period of use of a unit and it is. However, because the lower layer sheet 50 which is supported at the torsion bar 46 and the tension coil springs 54 is provided, at the seat cushion 18, structure is formed in which weakening of the upper layer sheet 52 is suppressed. Thus, the above-described preferable characteristics are maintained during long periods of sitting.

—Structure of Seat Back—

As shown in FIGS. 1 and 2, the back portion frame 16 which structures the seat back 22 is provided with a pair of left and right back portion side frames 64, respective lower end portions of which are respectively connected with rear end portions of the sitting portion frame 14 via the reclining mechanism 26. Thus, pivoting of the back portion frame 16 about the support shaft 26A and retention at arbitrary positions of pivoting are enabled. The left and right back portion side frames 64 are respectively formed in flat plate-form members, and structured with front flange portions 64A provided protruding to seat outward directions from respective front edges, and rear flange portions 64B provided protruding to seat inward directions from respective rear edges.

The back portion side frames 64 are connected to one another by an upper portion frame 66, which spans across between respective upper end portions. At the upper portion frame 66, respective lower ends are fixed to the respective upper ends of the back portion side frames 64 over substantially the whole width in the front-rear direction, and upper ends are structured by a pair of left and right side portions 66A which are draw in towards the rearward side, which are on the inside of the sea, and a spanning portion 66B, which connects between rear end portions of the pair of left and right side portions 66A. A headrest frame 82A, which will be described later, is fixed to the spanning portion 66B. Further, the left and right back portion side frames 64 are also connected to one another by a connection bar 68, which spans across between respective lower portions. The connection bar 68 is disposed at a height substantially corresponding to lower side tension coil springs 78, which will be described later, and joins rear portions of the left and right back portion side frames 64.

The connection bar 68 contributes to a left-right direction stiffness improvement of the back portion frame 16, and is a structure which is easy to resiliently deform in the direction in which the back portion frame 16 pivots. Specifically, as shown in FIG. 8A, the back portion side frames 64 are capable of resilient deformation in the direction of arrow B, as of the rear flange portions 64B being swung in the front-rear direction, and resilient deformation in the direction of arrow C, as of front end portions pivoting in the left-right direction. This connection bar 68 bridges between the rear ends of the back portion side frames 64 so as to restrict deformation of the back portion side frames 64 in the directions of arrow B and arrow C.

Furthermore, the back portion frame 16 is provided with a pair of left and right support pipes 70. These support pipes 70 protrude forward overall relative to the back portion side frames 64. Regions corresponding to a shoulder portion and a lumbar portion of a sitter particularly protrude forward. Of the support pipes 70, upper end portions, which are curved to seat inward sides and the rearward side, are fixed to the corresponding side portions 66A of the upper portion frame 66, and lower end vicinities are resiliently connected with lower end vicinities of the back portion side frames 64 via brackets 72. In this state, lower end portions of the support pipes 70 are disposed at left-right direction outer sides and forward relative to the corresponding back portion side frames 64. That is, of the support pipes 70, the upper ends are fixed to the upper portion frame 66 and supported with high stiffness, and the lower end sides are support with low stiffness at the brackets 72, which resiliently deform under comparatively low loads (spring constants are small). Consequently, the support pipes 70 are formed with the upper ends being fixed ends, and are resiliently deformable in the directions of arrow D and arrow E shown in FIG. 8A. That is, the left and right support pipes 70 are capable of resiliently deforming the brackets 72, while independently resiliently deforming in respectively directions in which the lower ends mutually move apart and directions of pivoting of the lower ends in the front-rear direction. Further, spring constants of the support pipes 70 in the directions of arrow D and arrow E are significantly smaller than spring constants of the respective back portion side frames 64 in the directions of arrow B and arrow C.

According to the above, the back portion frame 16 is a resilient structure, and the back portion cushion material 24 is provided at this back portion frame 16 to serve as a "back portion cushion material" of the present invention. The back portion cushion material 24 structures a backrest 25 with a single layer in the present embodiment. This back portion cushion material 24 is structured with a tensioning structure having a stiff spring characteristic which is hard to stretch in both the up-down direction and the left-right direction. This tensioning structure may be a two-dimensional weave (a fabric spring material), and may be the three-dimensional woven fabric 110.

At two left and right end portions of the upper end of this back portion cushion material 24, lower ends of tension coil springs 74 which serve as "a first resilient member", upper ends of which are anchored at the upper portion frame 66, are anchored. Further, at two left and right side portions of the lower end of the back portion cushion material 24, upper ends of tension coil springs 76 which serve as "a second resilient member", lower ends of which are anchored at the sitting portion frame 14, are anchored. In this state, the back portion cushion material 24 is stretched on the back portion frame 16 at a tension with which an up-down direction extension is not more than 5%.

Thus, as shown in FIGS. 1 and 2, the back portion cushion material 24 forms the backrest 25, which is substantially flat in a non-sitting state. That is, the backrest 25, which is formed at a left-right direction central portion of the back portion cushion material 24 (between left and right side supports 80, which will be described later) is formed in a straight line form in side view in the non-sitting state, principally due to the tensions of the upper and lower tension coil springs 76 and 78. Because of this form, the backrest 25 is a structure of which the form is altered in three-dimensions conforming to an upper body of a sitter, with tension hardly increasing in accordance with sitting. That is, the upper body of the sitter will be supported by the tension coil springs 74 and 76. Here, the upper end of the back portion cushion material 24 is set to be disposed slightly higher than a position corresponding to the shoulder blades of the sitter, and the lower end of the back portion cushion material 24 is set to a height that is in the vicinity of the seat cushion 18 and will not interfere with the seat cushion 18. Further, the backrest 25 which is substantially flat is formed with an attractive appearance without wrinkles and the like occurring.

Further, one end portions of respective pluralities (twos in the present embodiment) of the tension coil springs 78, which serve as "third resilient members", are anchored at two left and right side portions of the back portion cushion material 24. Respective other end portions of these tension coil springs 78 are anchored at height direction positions of the lumbar portion of the front flange portions 64A of the back portion side frames 64 (such that the lumbar portion is sandwiched by the upper and lower tension coil springs 78). The tension coil springs 78 are disposed substantially horizontally along the left-right direction in front view, and are disposed to be at an angle in plan view such that the back portion cushion material 24 sides are disposed rearward relative to the back portion side frame 64 sides.

Figure 5B:
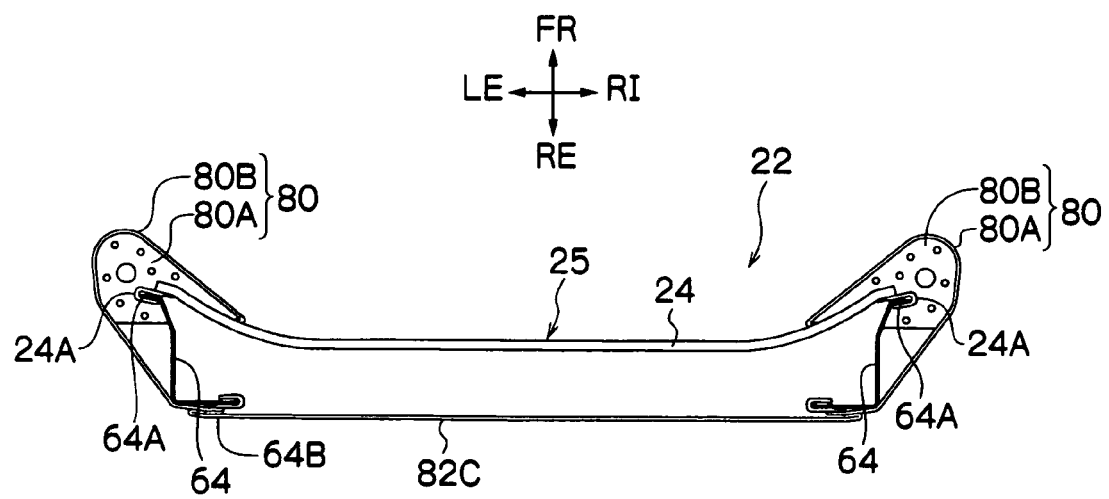
FIG. 5B is a sectional view cut along line 5B-5B of FIG. 2.
Figure 6:
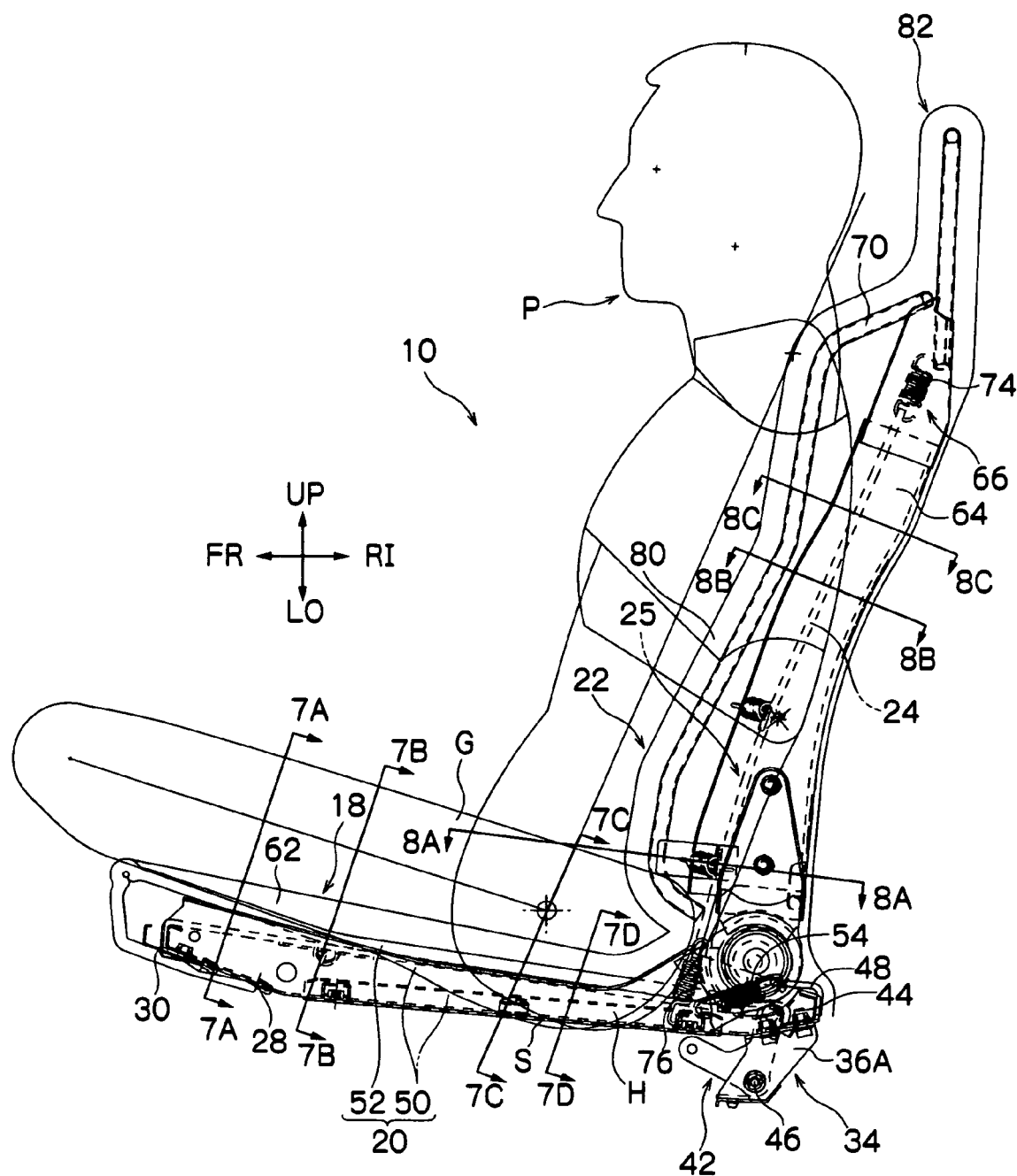
FIG. 6 is a side view showing a sitting state of the vehicle seat relating to the embodiment of the present invention.
Figure 7A:
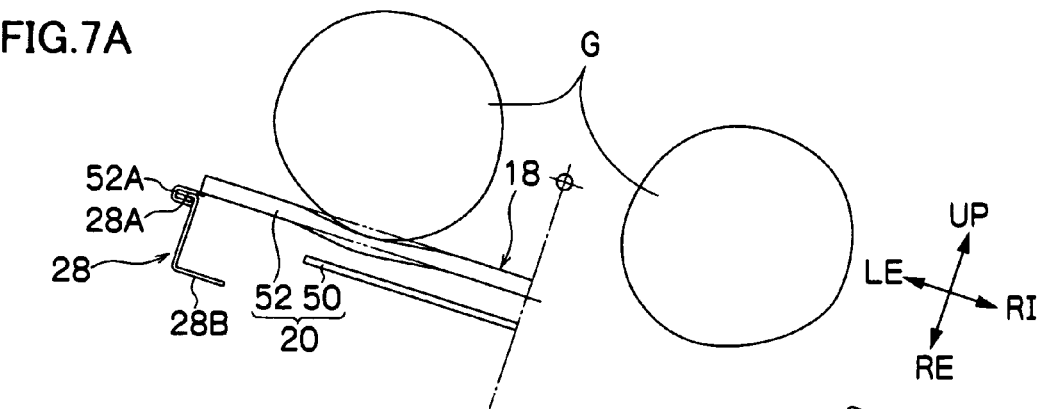
FIG. 7A is a sectional view cut along line 7A-7A of FIG. 6.
Figure 7B:
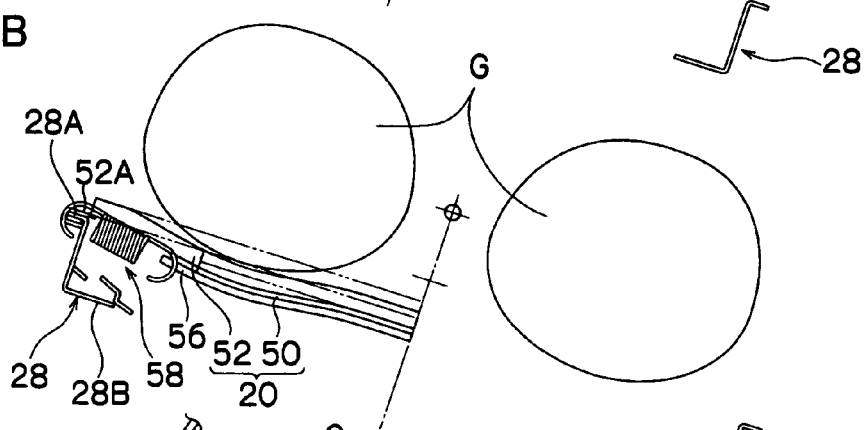
FIG. 7B is a sectional view cut along line 7B-7B of FIG. 6.
Figure 7C:
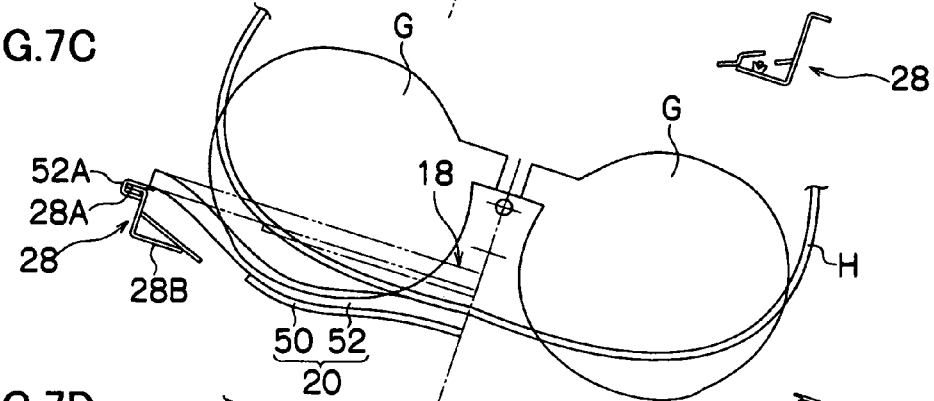
FIG. 7C is a sectional view cut along line 7C-7C of FIG. 6.
Figure 7D:
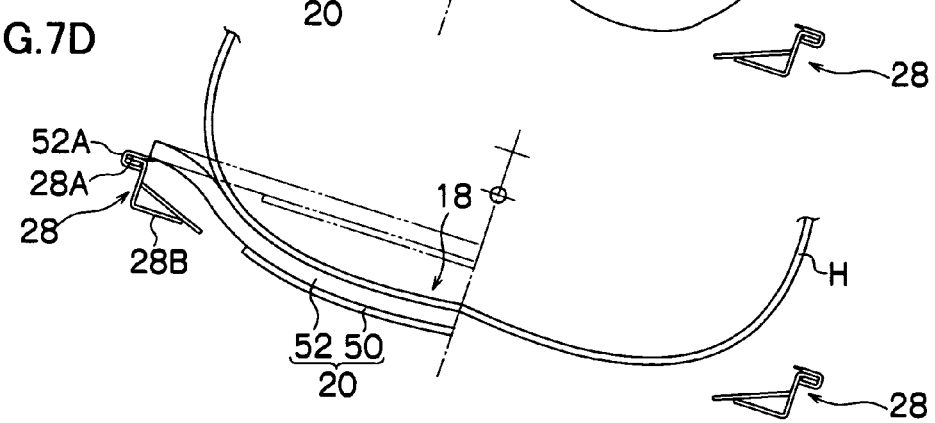
FIG. 7D is a sectional view cut along line 7D-7D of FIG. 6.

In this state, the back portion cushion material 24 is disposed between front and rear ends of the back portion side frames 64 over substantially the whole length, and the tension coil springs 78 are set to free states or states which are slightly extended. Therefore, the tension coil springs 78 are a structure which increases support pressure of a region corresponding to the lumbar portion of a sitter in accordance with sitting without spoiling the above-mentioned flat state of the backrest 25. When a large acceleration is input to the sitter, force is transmitted via the tension coil springs 78 to the back portion side frames 64, and the back portion side frames 64 vibrate in the direction of arrow B and the support pipes 70 in the direction of arrow D, respectively. This is a structure in which an attenuation ratio of a vibration system structured by the seat back 22 and the upper body of the sitter is controlled by these movements of the back portion frame 16. Here, as shown in FIG. 5B, at the two left and right ends of the back portion cushion material 24, hook portions 24A which are provided respectively along the up-down direction are anchored at the front flange portions 64A of the back portion side frames 64, and structure is formed by this anchoring in which tension hardly acts on the back portion cushion material 24. That is, in a relaxed state, the back portion cushion material 24 which spans between the left and right back portion side frames 64 is disposed between front and rear ends of the back portion side frames 64 along substantially the whole length, as described above, by urging forces of the upper and lower tension coil springs 74 and 76.

Further, at the seat back 22, the shape of the backrest 25 from the thoracic vertebra portion to the pelvis of the upper body of the sitter is encouraged to be a substantially linear form and, because of the tension coil springs 78, support pressure of the lumbar portion increases as described above and a shape corresponding to impedance of muscles is also possible to maintain at a time of sitting. That is, the upper and lower tension coil springs 74 and 76 bend as if bowing in accordance with sitting, and a region of the backrest 25 that corresponds to the lumbar portion acts to warp greatly to rearward. However, because the left and right tension coil springs 78 raise support pressure, that is, stiffness of the lumbar portion, a portion of the backrest 25 from the thoracic vertebra portion to the pelvis is maintained in a natural form with compliance according to the impedance of muscle.

Furthermore, the tension coil springs 78 absorb individual differences of physiques of sitters. Specifically, when a person with a large physique is sitting, the tension coil springs 78 extend together with the upper and lower tension coil springs 74 and 76 and raise the support pressure of the lumbar portion, and when a person with a small physique is sitting, the tension coil springs 78 bend in the same way as if bowing, in the same way as the upper and lower tension coil springs 74 and 76 do, and lower the support pressure of the lumbar portion. In either case, a form corresponding to the aforementioned impedance of the muscles is maintained at the backrest 25. When a person with a small physique is sitting, the support pressure of the lumbar portion is comparatively higher at a low position. Thus, in the seat back 22, there is structure which provides the support characteristics that are suitable to the physiques of sitters.

Further, at the seat back 22, the side supports 80 are provided, which are structured at the backrest 25, are provided respectively at the two left and right sides of the backrest 25, and protrude forward relative to the backrest 25. As shown in FIG. 5B, the side supports 80 are structured with skin materials 80B which cover, from outer sides, cushion members 80A which are attached so as to cover the support pipes 70 and front portions of the back portion side frames 64. The cushion members 80A are structured by, for example, polyurethane foam or the like. Of the skin materials 80B, one end portions are connected with front sides of left-right direction side portions of the back portion cushion material 24 by sewing or the like, and the other end portions are anchored at the rear flange portions 64B of the back portion side frames 64.

At the skin materials 80B, in order to, for example, maintain driving posture, upper portions thereof are joined to the back portion cushion material 24 by sewing or the like. However, in a case in which vibration absorption takes priority, it is possible to increase a degree of freedom of the tension coil springs 78 so as not to restrain movements, by providing partial slits and/or sectional connections to the back portion cushion material 24 along the up-down direction. Further, by similar measures, the skin materials 80B are formed so as not to restrict displacements of the back portion cushion material 24 (the backrest 25) at a region at which a soft compression characteristic is desired, for example, between a shoulder blade portion and the lumbar portion of the sitter, or the like. On the other hand, in a case in which characteristics of hardness are given priority, it is possible to form a structure in which the state shown in FIG. 5B continues to a position corresponding to the lumber portion of the sitter and a spring sensation is imparted by the anchoring tension coil springs 78. Furthermore, the skin materials 80B may be structured by a material which is easy to extend, being, for example, a three-dimensional woven fabric or the like, and be structures which do not interfere with deformations of the tension coil springs 78, displacements of the back portion cushion material 24 and the like.

With the seat back 22 described above, flatness of the backrest 25 in the non-sitting state is secured by the tension coil springs 74 and 76 and the tension coil springs 78, while external appearance is improved and tension directions of the back portion cushion material 24 in the sitting state are three-dimensional. Similarly to the seat cushion 18, this is a structure which makes the compliance of the seat back 22 conform with changing impedance, compliance and the like of human bodies. Specifically, in cases in which producing a resilient structure with small tension at a time of sitting has been tried, ordinarily, slackness occurs in a non-sitting state and outward appearance goes saggy. However, in accordance with the present design procedures, both good external appearance in the non-sitting state and small tension in the sitting state can be achieved. Because the tension coil springs 74 and 76 which impart tension in the up-down direction to the back portion cushion material 24 are disposed at the back portion cushion material 24 at the two left-right direction sides, a body side support structure is realized at the seat back 22. Further, because the tension coil springs 78 which impart tension in the left-right direction to the back portion cushion material 24 are disposed in correspondence with the lumbar portion of a sitter, a structure which prevents sinking in of the lumbar portion is realized.

With this seat back 22, a body pressure distribution is as shown in FIG. 13A. With this seat back 22, it is understood that, in comparison with vehicle seats of the posture maintenance type and the body pressure distribution type shown in FIGS. 13B and 13C, body pressure of the lumbar portion is dispersed over a wide range and supported, and in particular, the lumbar portion and the pelvis portion are supported with high sideward pressure. That is, it is understood that, with the seat back 22, movements of the sitter in the left-right direction are suppressed by body side support from the lumbar portion to the pelvis portion. The present vehicle seat 10, combining with the support characteristics according to the above described seat cushion 18, can be described as a body side support-type seat as mentioned earlier.

Figure 8B:
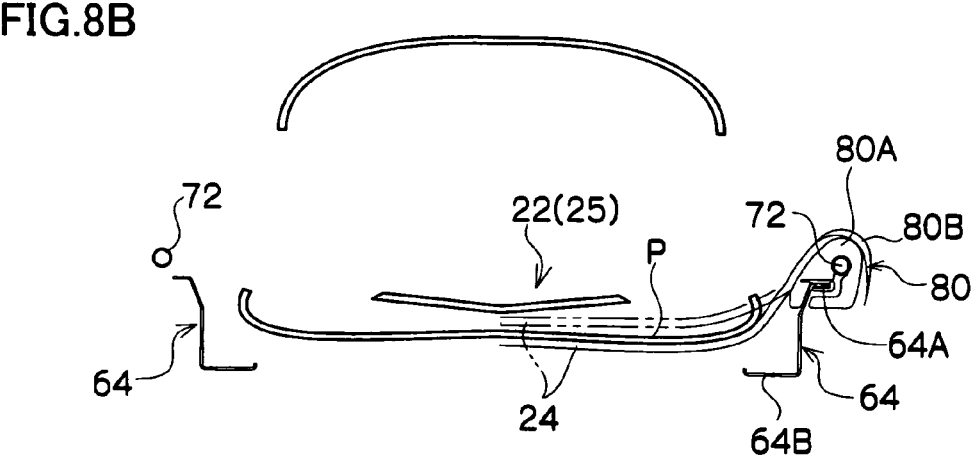
FIG. 8B is a sectional view cut along line 8B-8B of FIG. 6.
Figure 8C:
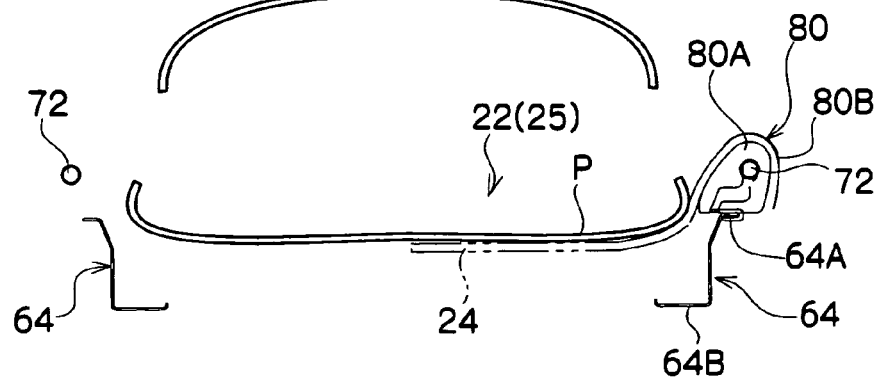
FIG. 8C is a sectional view cut along line 8C-8C of FIG. 6.

FIG. 8 show schematic views of a deformation state of the back portion cushion material 24 (the backrest 25) at this time. In these drawings, the back portion cushion material 24 prior to sitting is shown by dotted lines. FIG. 8A shows a sectional view cut along 17A-17A of FIG. 6, which corresponds to the lumbar vertebrae, FIG. 8A shows a sectional view cut along 17B-17B of FIG. 6, which corresponds to the thoracic vertebra portion, and FIG. 8C shows a sectional view cut along 17C-17C of FIG. 6, which corresponds to the shoulder blades, respectively. From these drawings, it is understood that, at the seat back 22, a support depth of the lumbar portion by the back portion cushion material 24 is deep, and a loading support (a displacement to rearward of the back portion cushion material 24) at the shoulder blade portion by the back portion cushion material 24, which principally supports body sides with the side supports 80, is small. Here, stretching of the back portion cushion material 24 is suppressed to 20% or less in the up-down direction due to deformation of the tension coil springs 74 and 76, and generation of change of tension in the left-right direction suppressed to 20% or less is also provided, by deformation of resilient support members at left-right direction side portions of the seat back 22 (deformation in a pivoting direction of adjacent positions at the front ends of the rear portion side frames, compression deformation of the cushion members 80A, and the like).

Figure 23A:
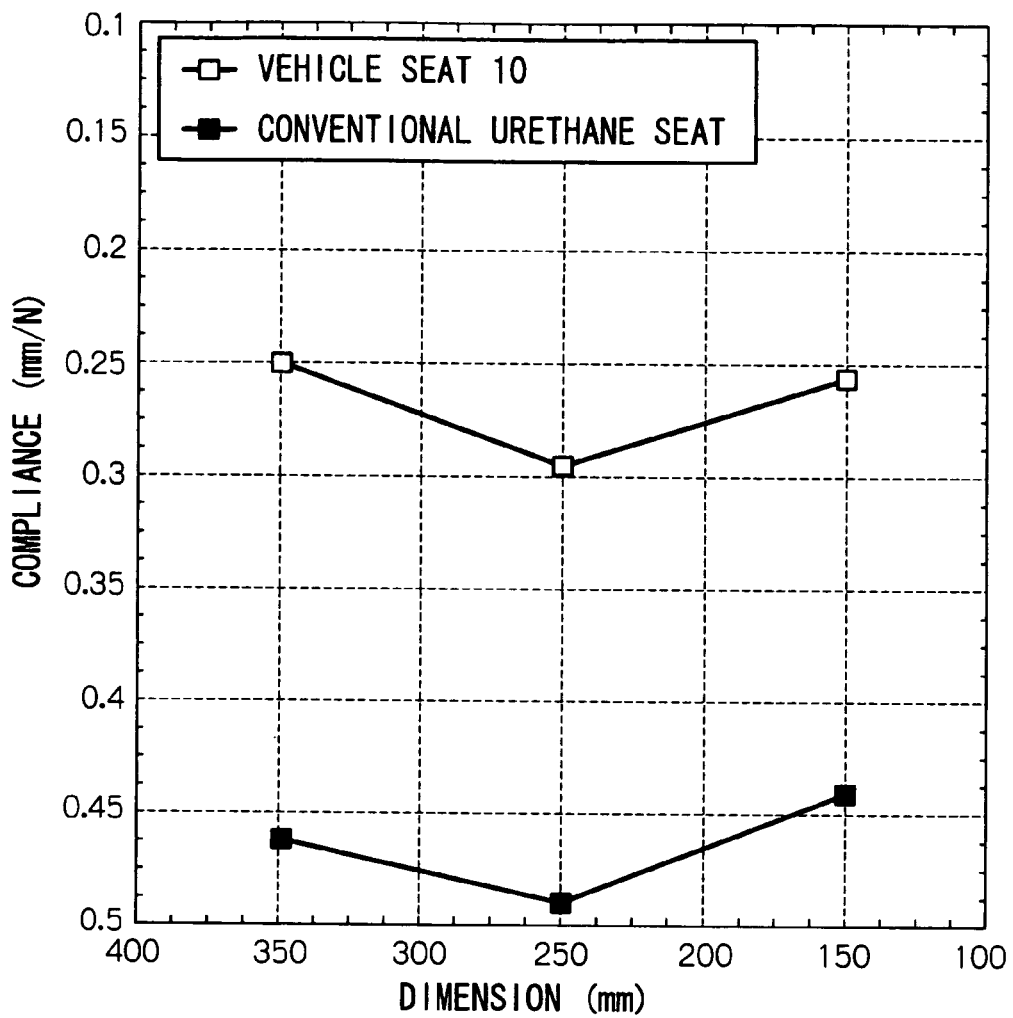
FIG. 23A is a graph showing compliances of portions of a seat back structuring a vehicle seat relating to an embodiment of the present invention.
Figure 23B:
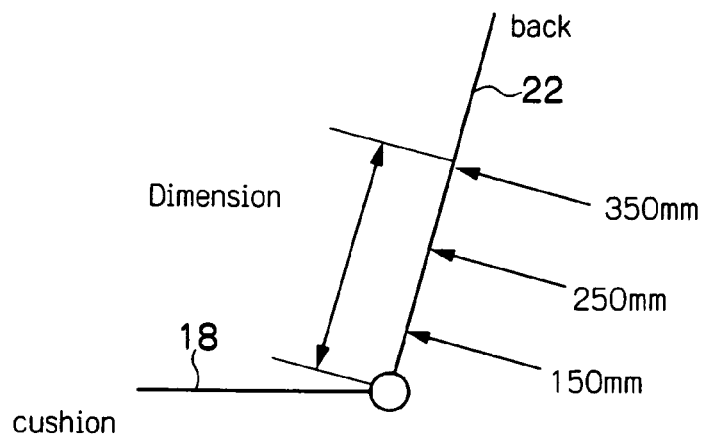
FIG. 23B is a schematic view showing measurement locations of the compliances of FIG. 23A.

Further, in FIG. 23, compliances of the portions shown in FIG. 23B of the up-down direction of the seat back 22 are shown. In this figure, a position 150 mm from the lower end of the seat back 22 corresponds to a lumbar lower portion (a pelvis upper portion), a similar position at 250 mm corresponds to the lumbar portion, and a similar position at 350 mm corresponds to a lower portion of the thoracic vertebra portion. Further, compliances at corresponding positions of a representative conventional seat are shown in this figure for comparison. It is understood that the seat cushion 18 of the vehicle seat 10 relating to the present embodiment realizes significantly large compliances (small spring constants) in comparison with the conventional seat, and that changes are made to the compliances by the resilient support of the lumber portion and the support of the upper portion by a high stiffness portion.

Figure 24A:
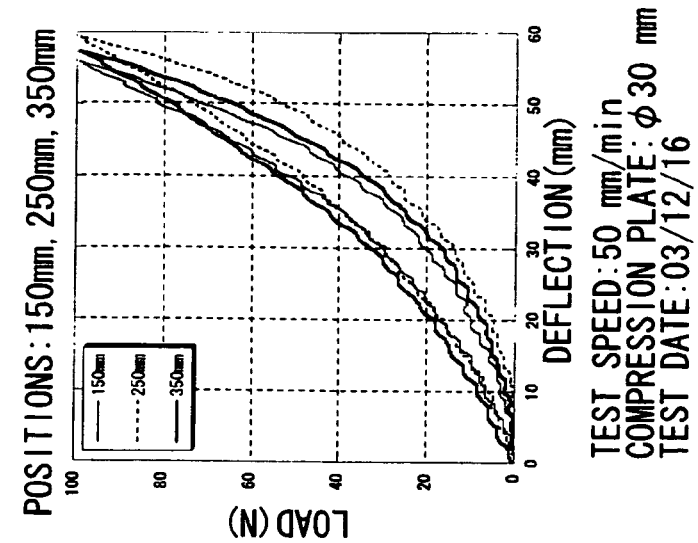
FIGS. 24A, 24B and 24C are, respectively, graphs showing results of measurement, in different conditions, of load-distortion characteristics of a seat back which structures a vehicle seat relating to an embodiment of the present invention.
Figure 24B:
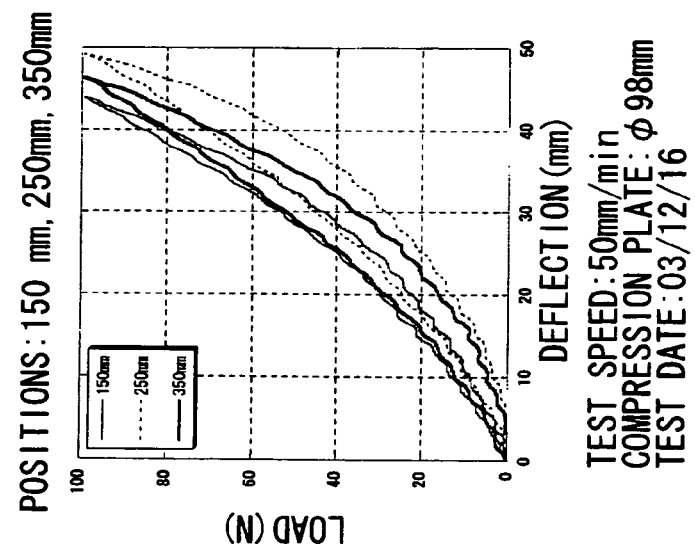
Figure 24C:
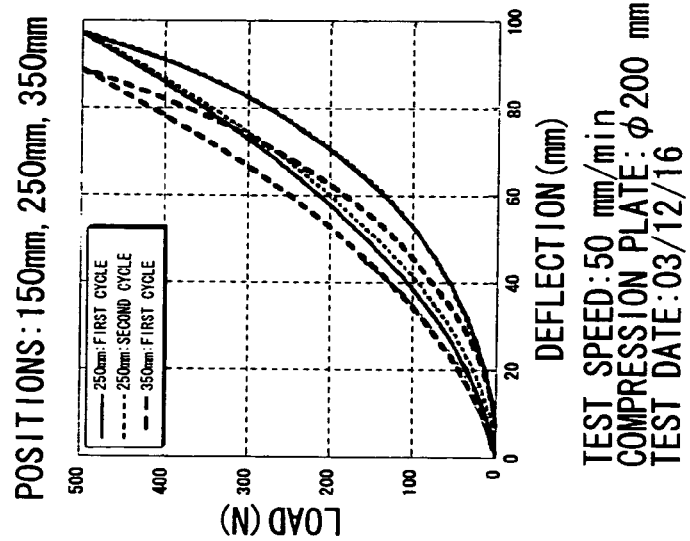

Furthermore, stationary load-distortion characteristics of the back portion cushion material 24 are shown in FIG. 24. FIGS. 24A to 24C are stationary load-distortion characteristics of cases in which discs with different dimensions are pressed against positions of the seat cushion 18 corresponding to the compliance measurement positions of the above-mentioned FIG. 23, at a speed of 50 mm/min until a predetermined loading. For FIG. 24A, the diameter of the disc is set to 200 mm and the predetermined loading to 500 N. For FIG. 24B, the diameter of the disc is set to 98 mm and the predetermined loading to 100 N. For FIG. 24C, the diameter of the disc is set to 30 mm and the predetermined loading to 100 N. From these figures, it is understood that the seat back 22 has continuous characteristics. It is understood that with the pressing by the disc of diameter 200 mm shown in FIG. 24A, stiffness of an upper back portion (at 350 mm) is high, with the pressing by the disc of diameter 98 mm shown in FIG. 24B, stiffness of a chest portion (at 250 mm) is small, and with the pressing by the disc of diameter 30 mm shown in FIG. 24C, the lumber portion (at 150 mm) is strongly supported, the chest portion is greatly distorted, and the upper back portion is supported with a strength somewhere in the middle. By these characteristics, a body pressure distribution corresponding to the body shape of a human is produced, in which pressures at bone protrusion portions are made smaller and spring characteristics can absorb differences in reaction force due to differences in the areas of pressure between the area at the chest portion and the area at the lumber portion to be generally matched. More specifically, a body pressure distribution that corresponding to the shape of a human body is produced, in which pressures on bone protrusion portions which are present from the buttock portion to the lumber portion, such as ridges of the iliac bones and the sacral bone and the like, are made smaller as in the characteristics when pressing with the disc of diameter 30 mm, and spring characteristics generally match those at the chest portion (the upper back portion) which resembles the pressing with the disc of diameter 200 mm and the lumber portion which resembles pressing with two of the discs with diameter 98 mm arranged to left and right (resembles two times a spring constant as with a row of springs). Moreover, individual differences in physique are absorbed. Thus, vibration absorption, posture maintenance, and absorption of impact forces due to large accelerations are balanced.

Further, it is understood that, at the seat back 22, a spring constant with respect to a disc with a small surface area, which corresponds to a protrusion portion of a human body, becomes smaller (compliance is larger), and loads that act on the protrusion portions of the body can be ameliorated. Furthermore, from these figures, it is understood that the spring constant at the above-mentioned 150 mm position, corresponding to the lower lumbar portion at which surface stiffness is higher, is maximized by the tension coil springs 78. Thus, with the seat back 22 too, a characteristic (below referred to as the spring zero characteristic) is realized with which, in the equilibrium state with no loading changes which corresponds to the stationary sitting state, the spring constant is greatly reduced at a range corresponding to a region at which a protrusion portion of the body (a shoulder blade or the like) touches, even relative to a region at an outer side thereof. Thus, the seat back 22 absorbs (does not hinder) body movements of the state of the sitter in accordance with breathing. That is, in the stationary sitting state, the back portion cushion material 24 displaces to follow body movements of the upper body of the sitter with body pressure (loading) is hardly changing, and enables breathing to be carried out without the sitter using muscle force and without sensing reaction force changes.

The seat back 22 described above, in co-operation with the seat cushion 18, raises the hold characteristics (holding) of the sitter and posture maintenance, while allowing posture changes of the sitter.

Holding is determined, when considered in a vertical section, by two-point support of the chest portion (the thoracic vertebra portion) and shoulder portion by the seat back 22, two-point support of the pelvis portion by the seat back 22 and the seat cushion 18, and a support depth of the lumber portion (lumbar portion) with high support pressure. In the vehicle seat 10, the back portion cushion material 24 of the seat back 22 (the backrest 25) as described above supports the body sides of the sitter from the shoulder portion to the pelvis portion and the side supports 80 restrict sideward movements of the sitter, and the support depth of the lumbar portion is deep. Therefore, this is a structure in which holding and posture maintenance are high. In particular, posture of the sitter can be stabilized by an anchoring effect under the hipbone joints due to the spring zero characteristic, and the high support pressure of the lumbar portion (a third lumbar vertebra portion) of the backrest 25 due to the tension coil springs 78.

Figure 25:
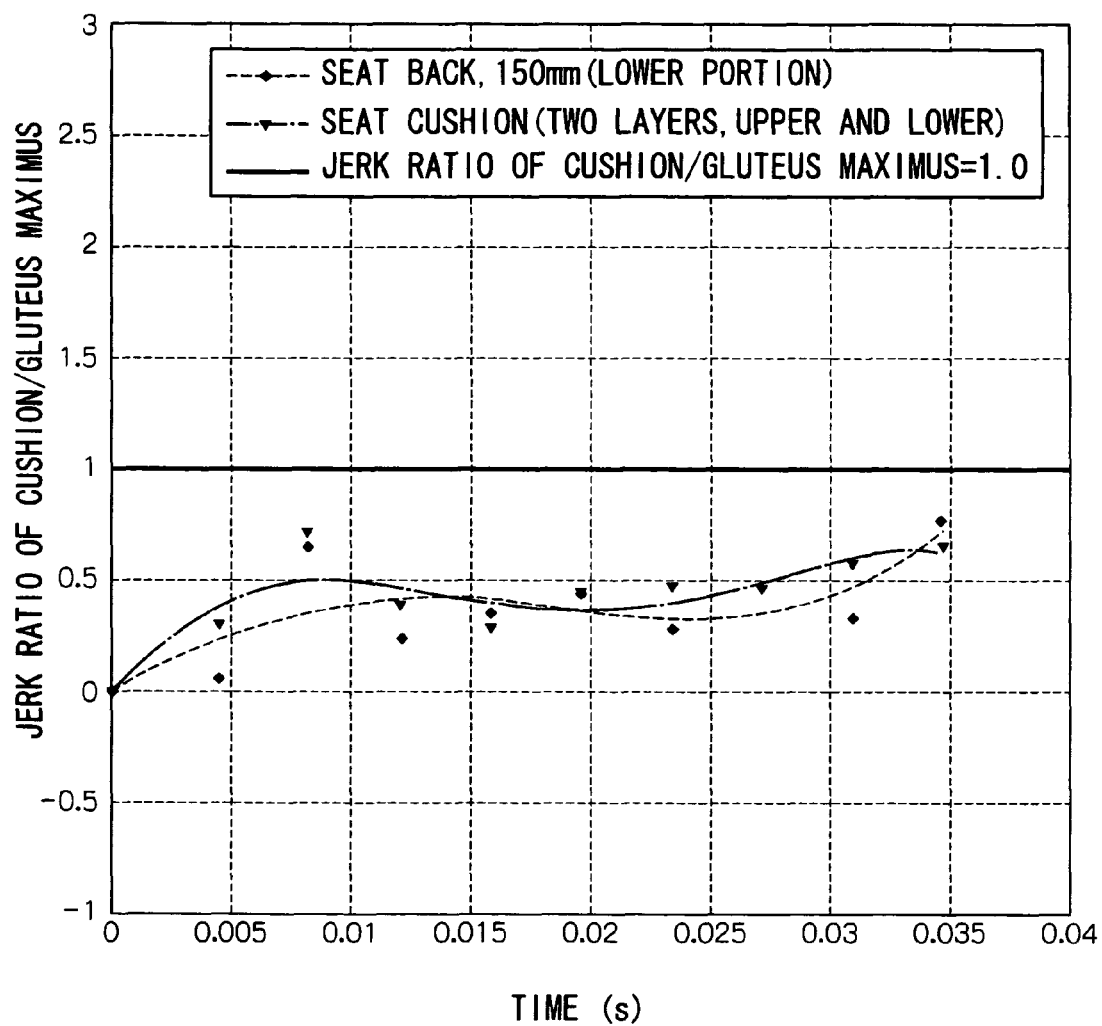
FIG. 25 is a graph showing jerk ratios relative to muscle of a sitter of a seat back which structures a vehicle seat relating to an embodiment of the present invention.

Furthermore, in FIG. 25, ratios of jerk at the lower portion of the seat back 22 (the 150 mm position of FIG. 23B) to jerk of the muscles of the buttock portion of the body are shown. From this figure, it is understood that in the jerk characteristic of the seat back 22, similarly to the seat cushion 18, the jerk is substantially half or less relative to the jerk of the muscle of the buttock portion of the body, which is a characteristic which is significantly soft relative to the muscle. The jerk characteristic of the seat cushion 18, which is shown by the single-dot chain line in this figure (this is the characteristic shown in FIG. 17), and the jerk characteristic of the seat back 22 are at substantially the same level. Therefore, the buttock portion can be supported without inclining (synchronization with buttock retention) by the seat back 22 and the seat cushion 18. Consequently, structure is formed in which posture changes will not be hindered, which will be described later. Furthermore, as described in the descriptions of the seat cushion 18, the jerk characteristic of the seat back 22 can provide a characteristic equivalent to the jerk characteristic of muscle.

Further, at the seat cushion 18, because a region of high surface stiffness is provided by the tensions of the tension coil springs 54 at the outer sides of the region supporting the pelvis portion (below the hipbone joints), there is a soft characteristic but the region around below the hipbone joints is prevented from greatly distorting due to accelerations, inertial forces and the like. Meanwhile, at the seat back 22, as described above, the tension coil springs 78 raise the support pressure of the lumbar portion while restricting movements to rearward. Therefore, a portion of the back portion cushion material 24 corresponding to the lumbar portion is prevented from greatly distorting due to accelerations, inertial forces and the like.

Furthermore, in the vehicle seat 10, although distorting of regions with high support pressure at the seat cushion 18 and seat back 22 as described above is restricted, a further distorting margin (distorting tolerance amount) is provided at these regions, and restoring forces act in response to distorting. That is, at the seat cushion 18, even when the aforementioned external forces act, the cushion material 20 does not bottom out, and the amount of distortion generated at the seat back 22 is an within an allowance for arm extension (for example, in the case of a driver, an arm gripping a steering wheel).

Thus, with the vehicle seat 10, a sense of unity with the vehicle occurs, and posture slumping due to external forces such as the aforementioned accelerations, inertial forces and the like is prevented, and an accumulation in fatigue (described later) of a sitter in accordance with use of muscles (principally back muscles) for restoring posture is prevented. Further, at the seat back 22, because the spring zero characteristic and the generated distortions are provided in the above-described spring equilibrium state, vibrations due to striking of the back portion cushion material 24 (the backrest 25) are reduced, vibrations transmitted to a head portion of the sitter are ameliorated, and α waves at 11 Hz more easily occur.

Furthermore, at the seat cushion 18, because the resilient dam-like member S is formed as described earlier, forward-sliding (buttock-sliding) of the sitter caused by inertial forces, jerks and the like, posture changes due to fatigue, pivoting of the pelvis in accordance with pedal operations and the like are prevented, and slumping of posture is prevented. At the vehicle seat 10, structure is formed in which posture changes are allowed by the structure for preventing forward-sliding with this dam-like member S and the structure for imparting holding by the above-described side body supports.

Posture changes that are allowed here are adjustments of a leaning angle of the trunk (a torso angle), which are performed by center of gravity movements from the hipbone joint point to the forward thigh portion or opposite center of gravity movements. Thus, because the center of gravity moves in the front-rear direction while the forward-sliding prevention state and the body side support state are maintained by the resilient dam-like member S and the pelvis position is maintained at a substantially constant position, this is a structure in which posture changes are performed on a substantially circular arc locus. This locus of posture changes also corresponds to a locus (described later) on which the upper body of the sitter buttock-slides due to the accumulation of fatigue and posture is changed to somewhat backward leaning. Further, a structure is formed in which, in a process of posture change, because contact areas of the sitter with the seat back 22 and the seat cushion 18 are large, slumping of posture is prevented by friction with the body pressure distribution of the above-described body pressure distribution type, and after a posture change, the posture after the change is maintained without the use of muscles, due to the position of the center of gravity, the dam-like member S and the body side supports (the side supports 80), which are support points of the upper body.

Further, the vehicle seat 10 which achieves both posture maintenance (restraint) and tolerance (a degree of freedom) of posture changes as described above is a structure which is also excellent in equilibrium stability. Specifically, as described above, because attenuation in the up-down (gravity) direction at the seat cushion 18 is large, this is a structure in which there is little rebounding (the aforementioned bouncing) of the sitter at times of impact. Further, even if there were a rebound, because left-right direction movements are restricted by the left and right side frames 28 and the left and right side supports 80 of the seat back 22, the flying off of the sitter from the vehicle seat 10 is ameliorated. Furthermore, because the back portion frame 16 is a resilient structure, as described above, the back portion frame 16 deforms (the back portion side frames 64 and the support pipes 70 warp to respective inward sides) at a time of impact (a rear thrust). Thus, a tension increase of the back portion cushion material in accordance with the sitter pressing against the seat back 22 is limited, and a large amount of attenuation acts on the sitter (the attenuation ratio is controlled).

A headrest 82 is provided at upward of the seat back 22 described above. As shown in FIG. 2, the headrest 82 is provided with the headrest frame 82A with a substantially 'U' shape which opens downward, and lower ends of the headrest frame 82A are fixed to the upper portion frame 66 (the spanning portion 66B) of the back portion frame 16. The headrest 82 is a structure in which a skin material 82C covers a cushion member 82B, which is attached so as to cover a left-right direction long side portion at an upper end portion of the headrest frame 82A, from the outside. The cushion member 82B is structured with, for example, polyurethane foam or the like. Of the skin material 82C, one end portion is connected to a front face side at the upper end of the back portion cushion material 24 by sewing or the like, an intermediate portion is wound round and bends back at the cushion member 82B, and an other end portion is anchored at a lower end back face side of the back portion frame 16. That is, the skin material 82C is structured to combine with skin material on the side of the back face of the seat back 22.

—Specific Examples of Three-Dimensional Woven Fabric—

Next, examples of the three-dimensional woven fabrics 110 which are employed as the lower layer sheet 50 and upper layer sheet 52 structuring the cushion material 20 (and the back portion cushion material 24) will be described.

Figure 9:
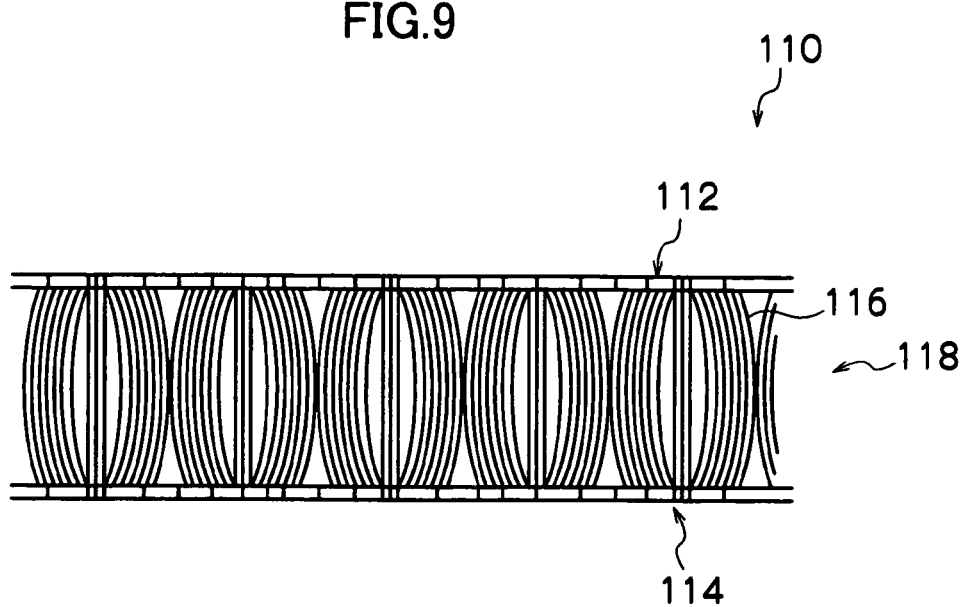
FIG. 9 is a schematic sectional view showing a three-dimensional woven fabric which is employed as a cushion member.

As shown in FIG. 9, the three-dimensional woven fabric 110 is structured by a pair of ground fabrics 112 and 114, which are disposed separated from one another, and a pile portion 118, which is formed by numerous connecting fibers 116 which reciprocates between this pair of ground fabrics 112 and 114 and joins the two.

Figure 10:
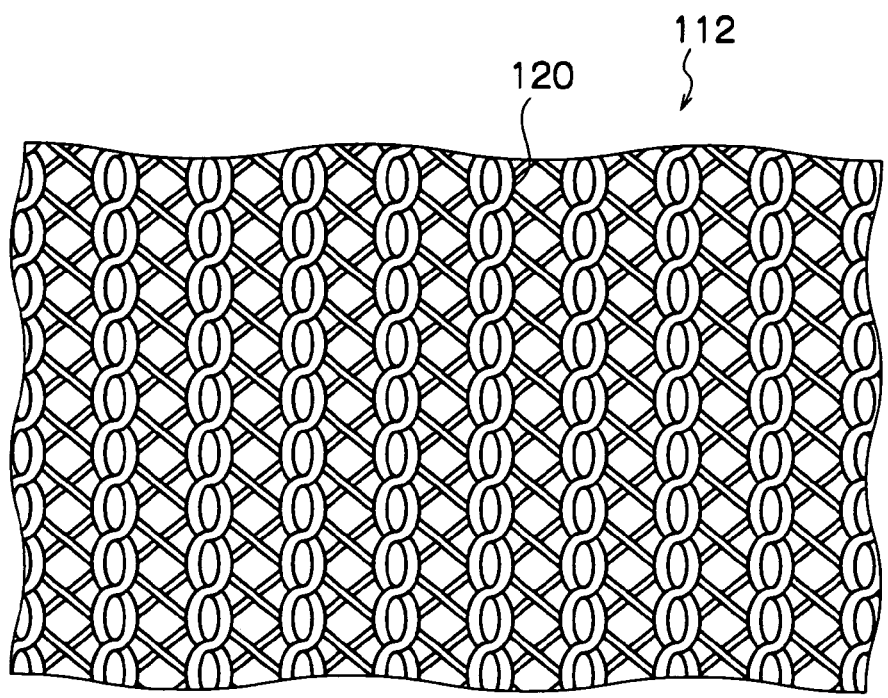
FIG. 10 is a schematic view showing an example of one ground fabric which is employed at the three-dimensional woven fabric.
Figure 11:
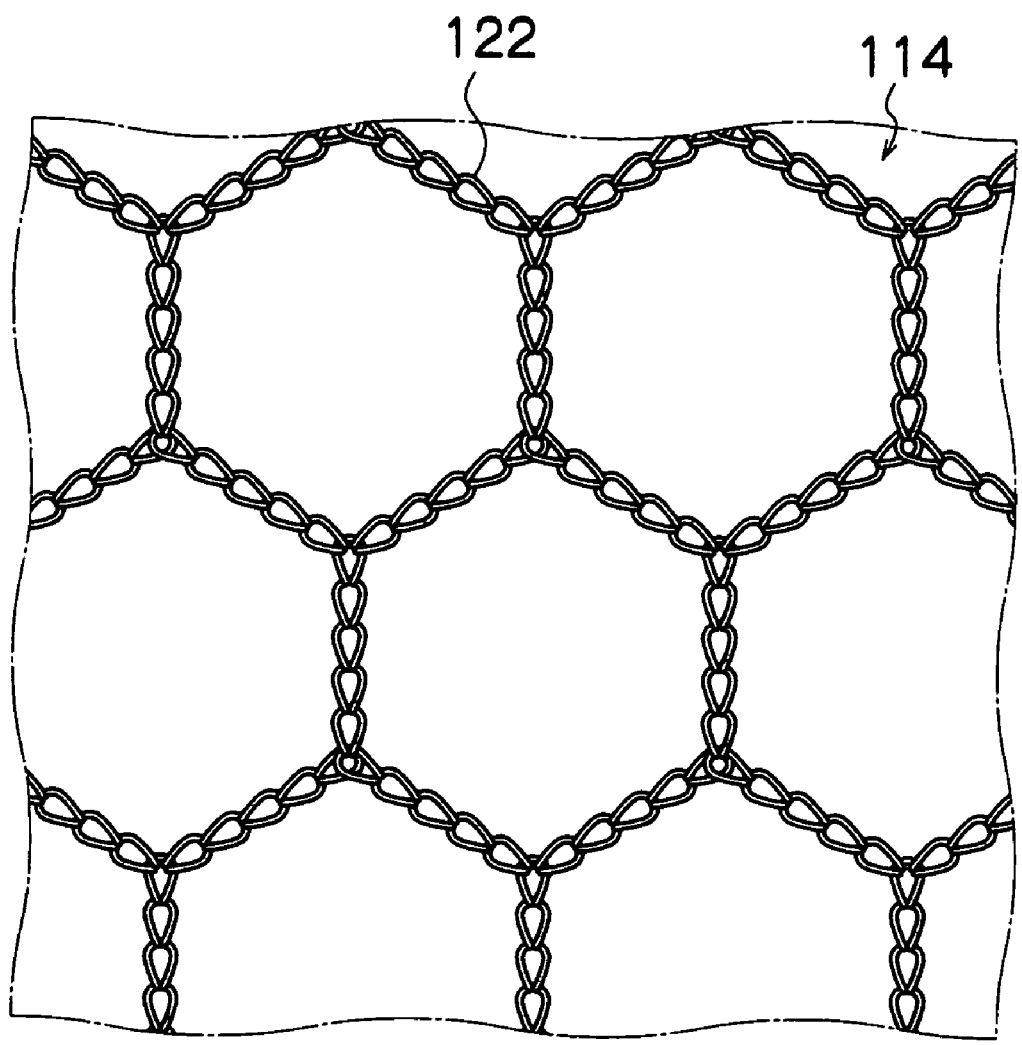
FIG. 11 is a schematic view showing an example of another ground fabric which is employed at the three-dimensional woven fabric.

One of the ground fabrics 112 employs a formation, from a thread 120 in which short fibers are twisted, of a mesh by a flat fabric structure which is continuous in two directions, a wale direction and a course direction, as shown in FIG. 10. Further, the other ground fabric 114 forms, for example, a honeycomb-form mesh from a thread 122 in which short fibers are twisted as shown in FIG. 11. Further, the other ground fabric 114 forms a larger mesh than the one ground fabric 112. Here, the ground fabrics 112 and 114 are not limited to being a fine fabric, a honeycomb form and the like, and may employ fabric structures with other mesh-forms.

As shown in FIG. 9, the connecting fibers 116 form the pile portion 118 which is knitted between the ground fabrics 112 and 114 such that the one ground fabric 112 and the other ground fabric 114 maintain a predetermined spacing. Thus, a predetermined stiffness is imparted to the three-dimensional woven fabric 110 which is a mesh unit.

The three-dimensional woven fabric 110 can be provided with a required firmness strength by a thickness of the ground threads that form the ground fabrics 112 and 114 (the threads 120 and 122) and the like. However, it is preferable if the ground threads 120 and 122 are selected from a range which will not cause problems during knitting operations. Further, as the ground threads 120 and 122, monofilament threads can be employed, but in consideration of texture, softness of surface feel and the like, multifilament threads, spun threads and the like may be employed.

As the connecting fibers 116, it is preferable to employ monofilament threads, and a thickness is preferably in a range of 167 decitex to 1110 decitex. With multifilament fibers, cushioning with which restoring force is excellent will not be obtained. Further, if the thickness falls below 167 decitex, firmness strength of the three-dimensional woven fabric 110 will fall, and if it rises above 1110 decitex, it will be excessively hard and appropriate cushioning will not be obtained.

That is, because monofilament threads of 167 decitex to 1110 decitex are employed as the connecting fibers 116, the load of an occupant seated at the seat can be supported by deformation of the meshes that the ground fabrics 112 and 114 form and deformation due to collapsing, buckling or the like of the connecting fibers 116 which form the pile portion 118, and further, restoring forces of neighboring connecting fibers which impart a spring characteristic to the deformed connecting fibers 116, and a soft structure can be formed with a soft spring characteristic in which concentration of reaction force will not arise.

Here, protrusions and indentations may be formed at the three-dimensional woven fabric 110. That is, as the ground fabrics 112 and 114, they may be knitted such that protrusions and indentations occur at surfaces. When indentations and protrusions are formed, it is possible to form spring elements with substantial arch forms in cross-section at the ground fabrics 112 and 114. Therefore, furthermore, it is possible to impart soft spring characteristics, and a structure can be easily formed with a resilient compliance substantially equivalent to or larger than a resilient compliance of muscle. Here, the resilient compliance is calculated by (distorting amount)/(average pressure value at contacting surface).

Materials of the ground threads 120 and 122 and the connecting fibers 116 are not particularly limited; for example, synthetic fibers, recycled fibers and the like such as polypropylene, polyester, polyamide, polyacrylonitrile, rayon and the like and natural fibers such as wool, silk, cotton and the like can be mentioned. These materials may be used singly, and may be combined in arbitrary combinations. Preferable are thermoplastic polyester-based fibers typified by polyethylene terephthalate (PET), polybutylene terephthalate (PBT) and the like, polyolefin-based fibers typified by nylon 6, nylon 66 and the like, and combinations of two or more types of these fibers.

Further, thread forms of the ground threads 120 and 122 and the connecting fibers 116 are not limited by the above descriptions, and circular section threads, irregular section threads and the like may be employed.

The pile structure of the pile portion 118, which is a manner of arrangement of the connecting fibers 116 forming the pile portion 118, can be classified in the types shown in FIGS. 12A to 12E, which are shown in states in which the connecting fibers 116 connecting the ground fabrics 112 and 114 are viewed from a side face.

FIGS. 12A and 12B are straight types in which the connecting fibers 116 are knitted substantially vertically between the ground fabrics 112 and 114. Of these, FIG. 12A is knitted straight in figure-of-eight forms, and FIG. 12B is simply knitted straight.

Further, FIGS. 12C, 12D and 12E show cross types which are knitted such that the connecting fibers 116 cross partway between the ground fabrics 112 and 114. Of these, in FIG. 12C, the connecting fibers 116 are crossed in figure-of-eight forms, and in FIG. 12D, the connecting fibers 116 are simply crossed, Further, in FIG. 12E, the connecting fibers 116 are grouped into pairs and crossed (double-crossed).

Here, as shown in FIGS. 12C to 12E, when the connecting fibers 116 are diagonally arranged crossed with one another, in comparison with a form in which the connecting fibers 116 are arranged substantially perpendicularly between the ground fabrics 112 and 114 (see FIGS. 12A and 12B), there are advantages in that sufficient restoring force is maintained by buckling strength of the connecting fibers 116 while it is possible to impart a soft spring characteristic with a large compression ratio.

At the lower layer sheet 50 and upper layer sheet 52 which employ the three-dimensional woven fabrics 110 with such mesh structures, springiness is smaller and attenuation ratios are higher, deformations following the body shape of an occupant are easier, and more precise fitting is easier.

Here, the above-described structure of the three-dimensional woven fabric 110 is an example. At the lower layer sheet 50 and the upper layer sheet 52, it is possible to employ three-dimensional woven fabrics with various stitching structures such as, for example, stitching structures which form protrusion portions, indentation portions, ribs and the like on the surface. Further, three-dimensional woven fabrics with different stitching structures in accordance with applications, functions and the like may be employed.

Next, operations of the present embodiment will be described.

At the vehicle seat 10 with the structure described above, when a person sits, of the seat cushion 18, principally the lower layer sheet 50 (the torsion bar 46 and the tension coil springs 54) support the body weight of the sitter, and the upper layer sheet 52 shares the supporting of a portion of the body weight of the sitter. Specifically, the upper layer sheet 52 distorts downward while stretching principally in the left-right direction in accordance with the sitting, and presses the lower layer sheet 50 downward. The lower layer sheet 50, while the torsion bar 46 twists, moves the connecting pipe 44 of the movable frame 34 forward while descending, and suppresses an increase in tension while distorting downward. At this time, the left and right tension coil springs 54 extend and tension lines are formed at outer sides of the pelvis of the sitter. Further, the lower layer sheet 50, by distorting downward, presses the belt member 56 downward and pulls on the left and right tension coil springs 58, and downward distorting of a front portion thereof is restricted.

Thus, at the lower layer sheet 50, overall the surface stiffness is low but the surface stiffness is higher at a region of contact between the two left-right direction end portions at which the tension of the tension coil springs 54 acts and at the belt member 56 than at other portions, and this area of tension is formed and supports the body weight of the sitter. Further, a portion of the body weight of the sitter is supported at the upper layer sheet 52 which is stretched over the sitting portion frame 14 separately from the lower layer sheet 50.

Meanwhile, at the seat back 22, in accordance with sitting, the tension coil springs 74, 76 and 78 bend to rearward as if bowing and extend in accordance with a load received from the upper body of the sitter, and the back portion cushion material 24 displaces rearward without increasing tension. That is, principally the tension coil springs 74, 76 and 78 continuously support the upper body of the sitter, and reaction forces due to tension are made smaller.

According to the above, at the seat cushion 18, in accordance with sitting, the sitter disperses body pressure from the buttock portion to the thigh portion while the body sides are supported, and further, the dam-like member S is formed forward of the hipbone joints. Further, at the seat back 22, in accordance with sitting, the upper body of the sitter disperses body pressure with the seat back 22 while the body sides are supported, and the lumbar portion is supported with high support pressure by the tensions of the tension coil springs 78. Further, the left and right side supports 80 restrict sideward movements from the buttock portion to the shoulder portion of the sitter.

Figure 26:
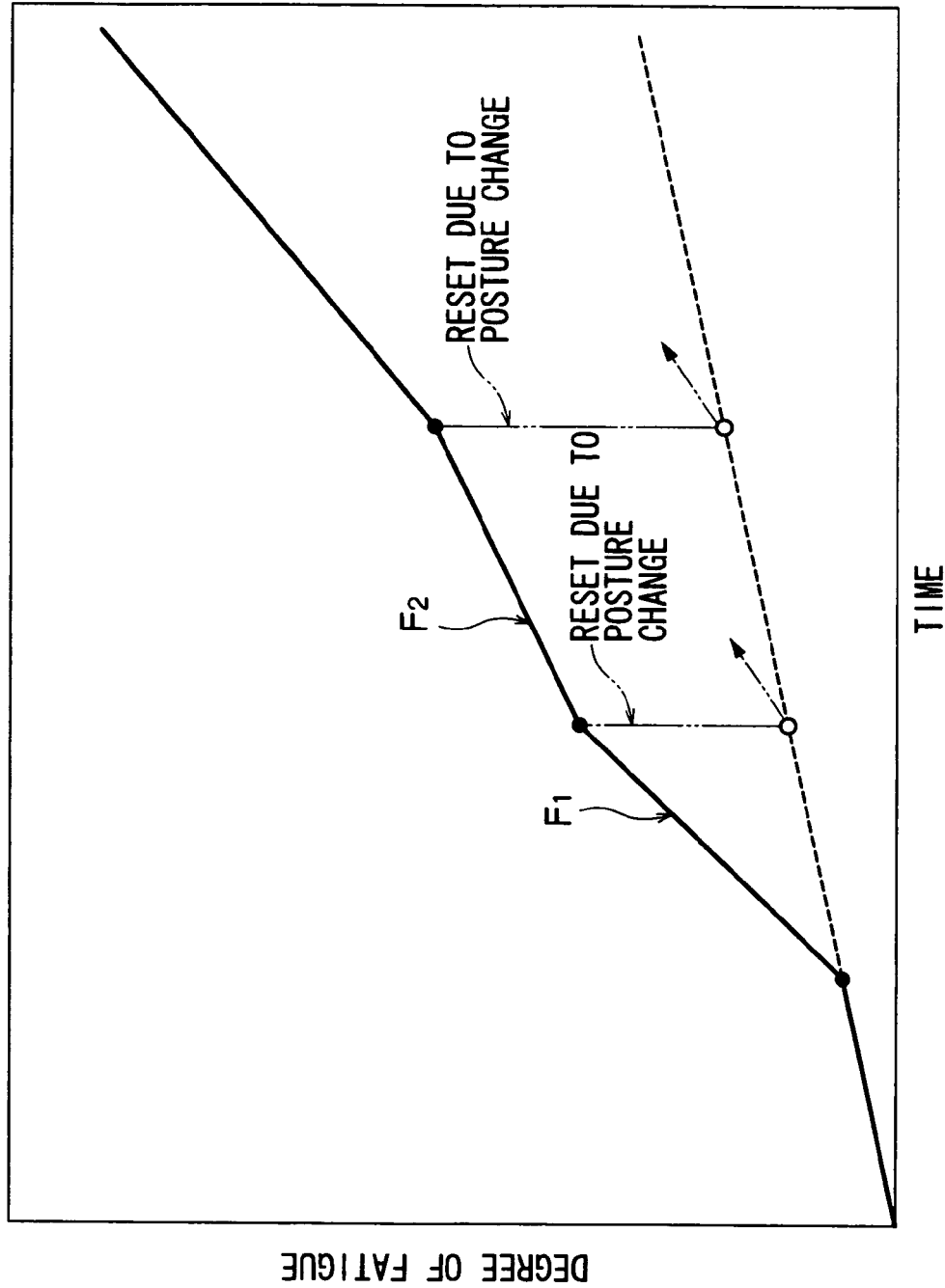
FIG. 26 is a conceptual graph for explaining a fatigue curve which represents a degree of progress of fatigue that accompanies sitting.

Peripheral fatigue (below referred to simply as fatigue) accumulates at a sitter due to a long period of sitting on a seat. If progress in the level of fatigue is taken as degree of fatigue then, as shown in FIG. 26, the degree of fatigue is thought to increase substantially linearly in accordance with the passage of time while stationary. On the other hand, when fatigue signals due to external stimuli, which are shown as F1 and F2 in FIG. 26, are input, the degree of fatigue is thought to rapidly increase. Pain, external stimuli and the like that are causes of fatigue reduce cutaneous blood flows, and therefore it is possible to calculate the degree of fatigue from a waveform of a fingertip plethysmogram. Now, a timescale with which a person senses fatigue is in of the order of minutes, whereas the periodicity of a fingertip plethysmogram of the order of seconds. Therefore, in order to match the timescale of fatigue with the fingertip plethysmogram, the degree of fatigue is calculated from global changes in the fingertip plethysmogram (changes of the low frequency components). Specifically, degree of fatigue is calculated from the trend in the squares of the amplitudes by processing the absolute value of the gradients values of cumulative values over a predetermined duration (in the present embodiment, 18 seconds) of a time series signal of the fingertip plethysmogram, and a fatigue curve is obtained by joining peak points of the degrees of fatigue in each period. It has been ascertained that this fatigue curve substantially matches a muscle fatigue curve according to sensory evaluation, and it has been confirmed that effects due to differences in capabilities of seats and personal differences of sitters show up as differences over a 30-minute test.

Figure 27:
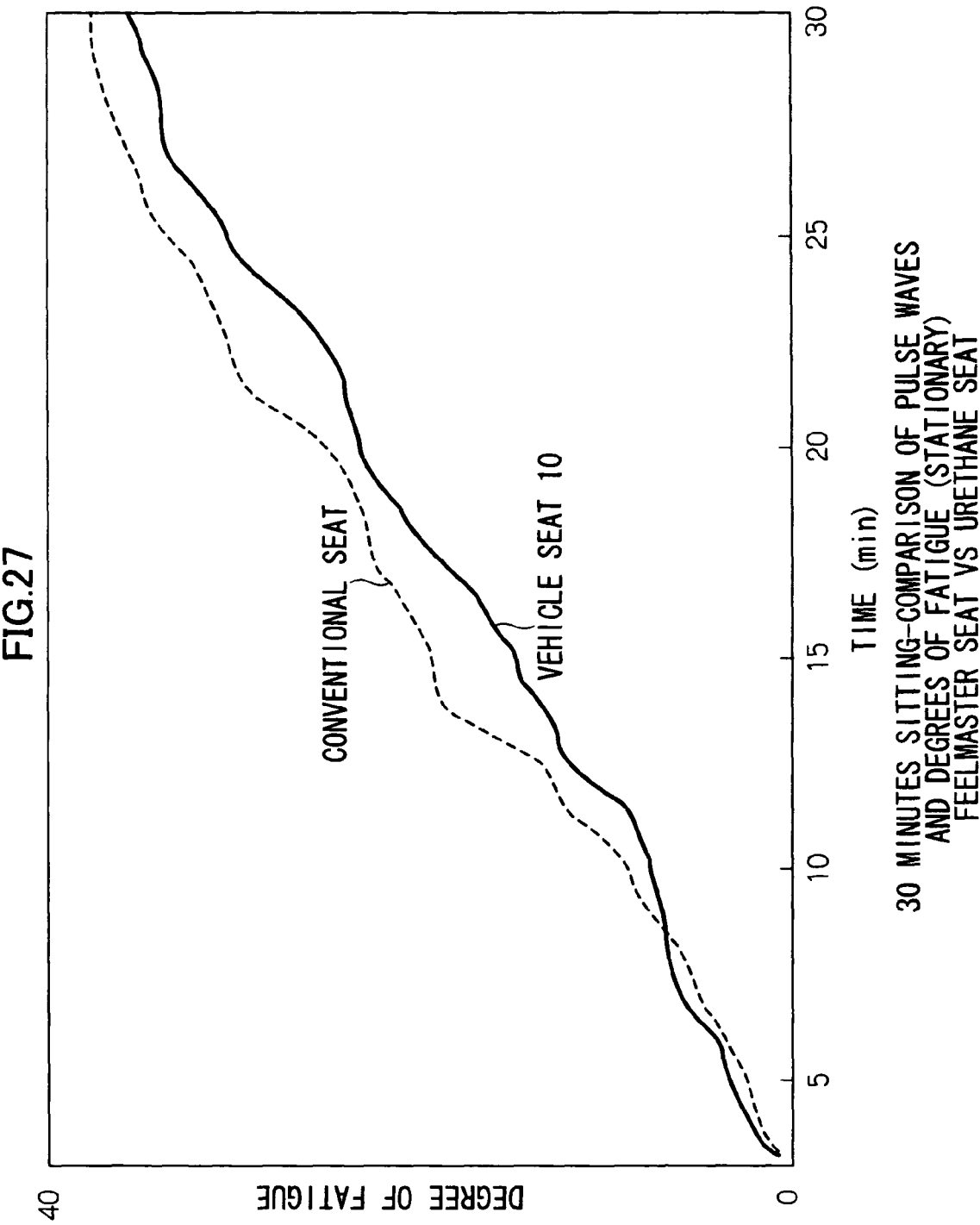
FIG. 27 is a graph respectively showing stationary fatigue curves of a vehicle seat relating to an embodiment of the present invention and a representative conventional seat.

A fatigue curve shown by a solid line in FIG. 27 shows changes with time of the degree of fatigue when sitting for 30 minutes in the stationary vehicle seat 10. A fatigue curve shown by a broken line shows, for comparison, changes with time of the degree of fatigue corresponding to the same subject when sitting for 30 minutes in a conventional vehicle seat (a urethane seat). As is understood from this figure, in regard to stationary fatigue, large differences do not occur between the vehicle seat 10 and the conventional seat in sitting for around 30 minutes.

On the other hand, a fatigue curve shown by a solid line in FIG. 28 shows changes with time of a degree of fatigue when sitting for 30 minutes in the vehicle seat 10 fixed onto an agitation stage and randomly excited. Fatigue curves shown by the broken line and the single-dot chain line show, for comparison, changes with time of degrees of fatigue according to the same subject, in cases of sitting for 30 minutes in respective conventional vehicle seats (urethane seats). Here, the broken line is the degree of fatigue curve of a seat the same as the seat for which a stationary fatigue curve has been shown. Further, the waveform of the random excitation is the same for each seat. As is understood from this figure, in the vehicle seat 10, in comparison with the conventional vehicle seats, the degree of fatigue is remarkably low at the point in time at which 30 minutes has passed. Further, it is understood that with the two conventional vehicle seats, they react sensitively to fatigue signals which are respectively input at about 7 minutes, 11 minutes, 18 minutes, 21 minutes and 28 minutes (inputs of shock vibrations) and the degree of fatigue is rapid, rapidly increased, whereas with the present vehicle seat 10, increases in the degree of fatigue at the above-mentioned times are not observed.

As shown in FIG. 29, in which FIGS. 27 and 28 are superimposed, in the vehicle seat 10, the fatigue curve of the moving sitting state and the fatigue curve of the stationary sitting state substantially coincide. That is, it is seen that external stimuli due to random excitations are absorbed in the vehicle seat 10, and are not transmitted to serve as a cause of fatigue, which alters cutaneous blood flows in the sitter (alters the fingertip plethysmograms).

Herebelow, mechanism of the vehicle seat 10 which realize such effects will be described.

In the vehicle seat 10, because of body side support of the buttock portion and the thigh portion due to tension of the tension coil springs 54, and the resilient dam-like member S formed by the belt member 56 and the tension coil springs 58, left-right and front-rear movements of the sitter are restricted. Meanwhile, at the seat back 22, because of body side support by the back portion cushion material 24 (and support by the side supports 80), and the high support pressure of the lumbar portion due to the tension coil springs 78 which are provided in correspondence with the lumbar portion, the sitter maintains a substantially linear form from the thoracic vertebra portion to the pelvis while left-right movements are restricted. Thus, the sitter can maintain a sitting posture without using very much muscle (principally back muscle) force. That is, muscle fatigue in accordance with a long period of sitting is reduced by the posture maintenance capability of the vehicle seat 10. Here, at the body pressure dispersion-type seat which provides the body pressure distribution shown in FIG. 13B, because a posture maintenance characteristic was low, muscle force was employed by the sitter for posture maintenance, and fatigue amelioration effects were smaller.

Further, at the seat cushion 18, because the spring zero characteristic as described above is realized and the seat cushion 18 follows movements in the directions of arrows X and Y of the sacral bone of the sitter, restrictions of movements of the sacral bone in accordance with breathing of the sitter are remarkably suppressed. Now, if these movements of the sacral bone were to be restricted by the seat, movements of the fifth lumbar vertebra and the third lumbar vertebra would deteriorate, and respiration of intervertebral discs would be suppressed. Correspondingly, transport of waste products, supply of nutrients and the like in the body would be suppressed and fatigue would promptly occur. Furthermore, flexibility of the intervertebral discs of the third lumbar vertebra and the fifth lumbar vertebra would be lost, the muscles would tense, and pain would occur. With the present seat cushion 18, because of an anchoring effect due to the resilient dam-like member S and the spring zero characteristic, forward-sliding (a posture change) of the sitter is restricted, while movements of the sacral bone accompanying breathing are not restricted, as described above (fluctuations of the body in accordance with breathing are allowed). Therefore, fatigue in accordance with a long period of sitting is ameliorated.

Further, in the vehicle seat 10, because the resonance frequency of the vibration system including the sitter is approximately 3.5 Hz, in other words, because the resonance frequency is low, output amplitudes are greatly attenuated relative to input amplitudes, and a resonance frequency region (for example, width of half-power points) is narrow. Consequently, a probability of actual vibrations coinciding with this frequency region is low. Further, varying frequencies pass through this frequency region quickly, and application to the sitter of a stress effect based on accelerations of vibrations is restricted.

Furthermore, in the vehicle seat 10, because the vibration transmissibility of the resonance frequency region (around 5 Hz) of the spinal column of the sitter is approximately 1, when an actual frequency is around 5 Hz, the spinal column, that is, the line of sight of the sitter matches movements of the seat cushion 18. Due to resilient support of the spinal column, pressure changes occur at the intervertebral discs, and waste products are conveyed and nutriment is supplied in the body of the sitter. Accordingly, because the intervertebral discs have sufficient resilience, the intervertebral discs are in a state in which wearing is unlikely. Consequently, stress applied to the sitter due to elasticity of the intervertebral discs is reduced. More specifically, because of the vibration transmissibility being approximately 1 as described above and the aforementioned particularly remarkable spring zero characteristic under the hipbone joints (ranges with diameter 30 mm), under the hipbone joints at which the body weight of the sitter is concentrated, there is a vibration system with a large mass and a small spring constant, that is, a vibration system with an extremely large attenuation ratio is structured. Therefore, at times of input of vibrations which are transmitted from under the hipbone joints to the spinal column and the head portion, phase differences between the vehicle seat 10 (the seat cushion 18) and the sitter are kept small. Moreover, the vehicle seat 10 has high vibration absorption. The spinal column itself also has softness. Therefore, because pressure variations due to vibration inputs are smaller, changes in posture of the sitter are not generated but the vehicle seat 10 and the sitter move integrally and, as described above, the spinal column, that is, the line of sight of the sitter matches movements of the seat cushion 18, and stress applied to the sitter is ameliorated.

Further, still, in the vehicle seat 10, because vibrations of 10 Hz are attenuated and transmitted with amplitudes at half or less than input amplitudes, α waves from 10 Hz to 12 Hz can be generated in the brain of the sitter without applying an unsettling sensation to the sitter. That is, in the vehicle seat 10, it is possible to utilize external vibration inputs to passively draw out α waves. Thus, a relaxing sensation is applied to the sitter, a high quality waking state is produced, and stresses which are a cause of fatigue are reduced. In particular, because of the above-described spring zero characteristic, vibrations that are input from below the hipbone joints and transmitted to the head portion are greatly attenuated, which contributes to only comfortable sensations being effectively sensed by the sitter due to input of these vibrations.

Figure 30A:
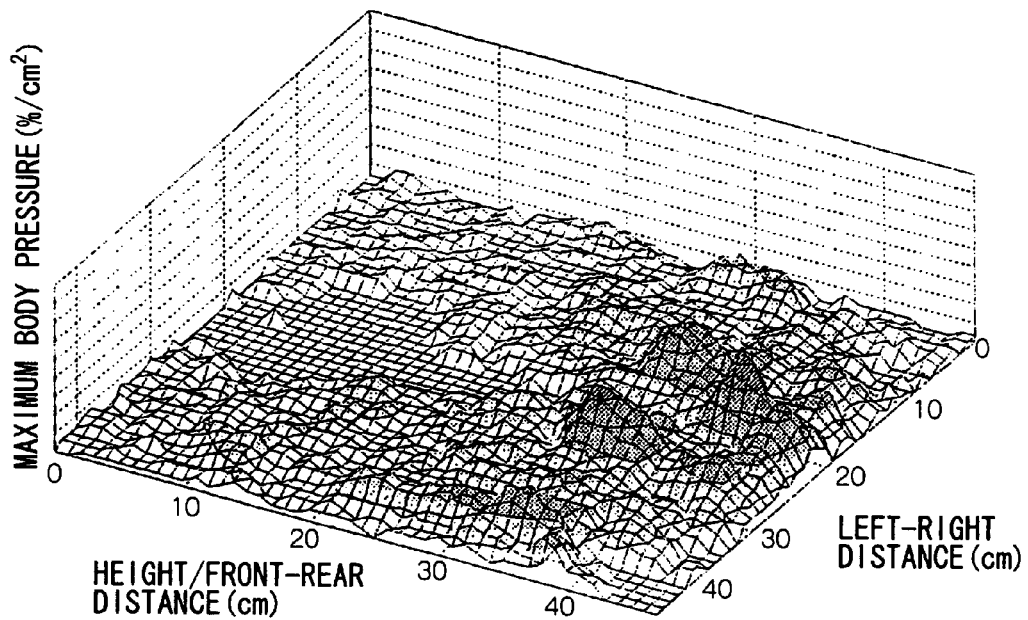
FIG. 30A is a graph showing a body pressure distribution at a time of vibration input at the seat cushion which structures a vehicle seat relating to an embodiment of the present invention.
Figure 30B:
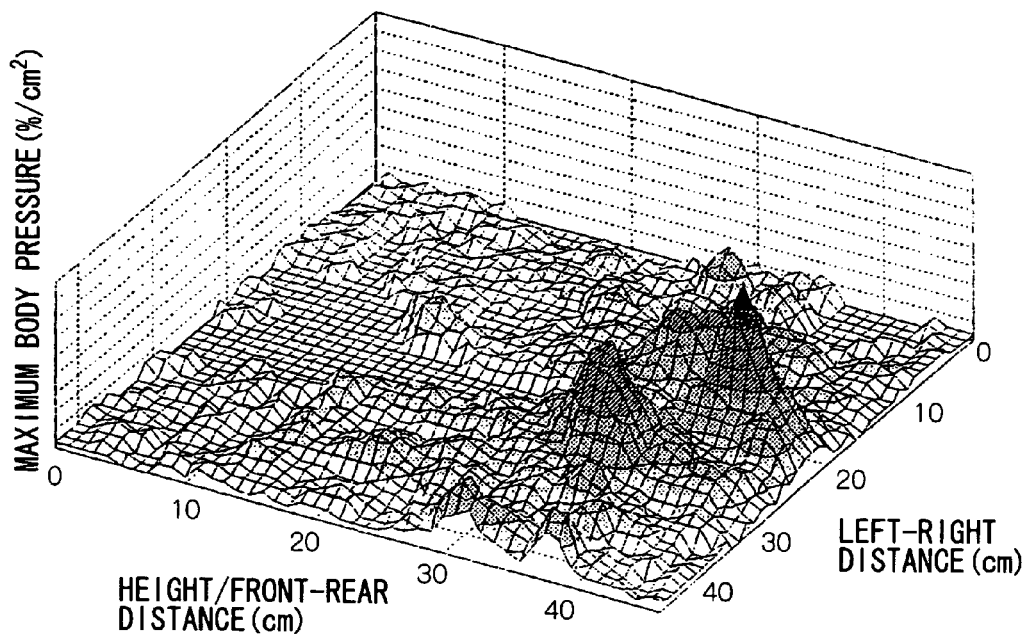
FIG. 30B is a graph showing a body pressure distribution at a time of vibration input at a representative conventional seat for comparison.
Figure 31:
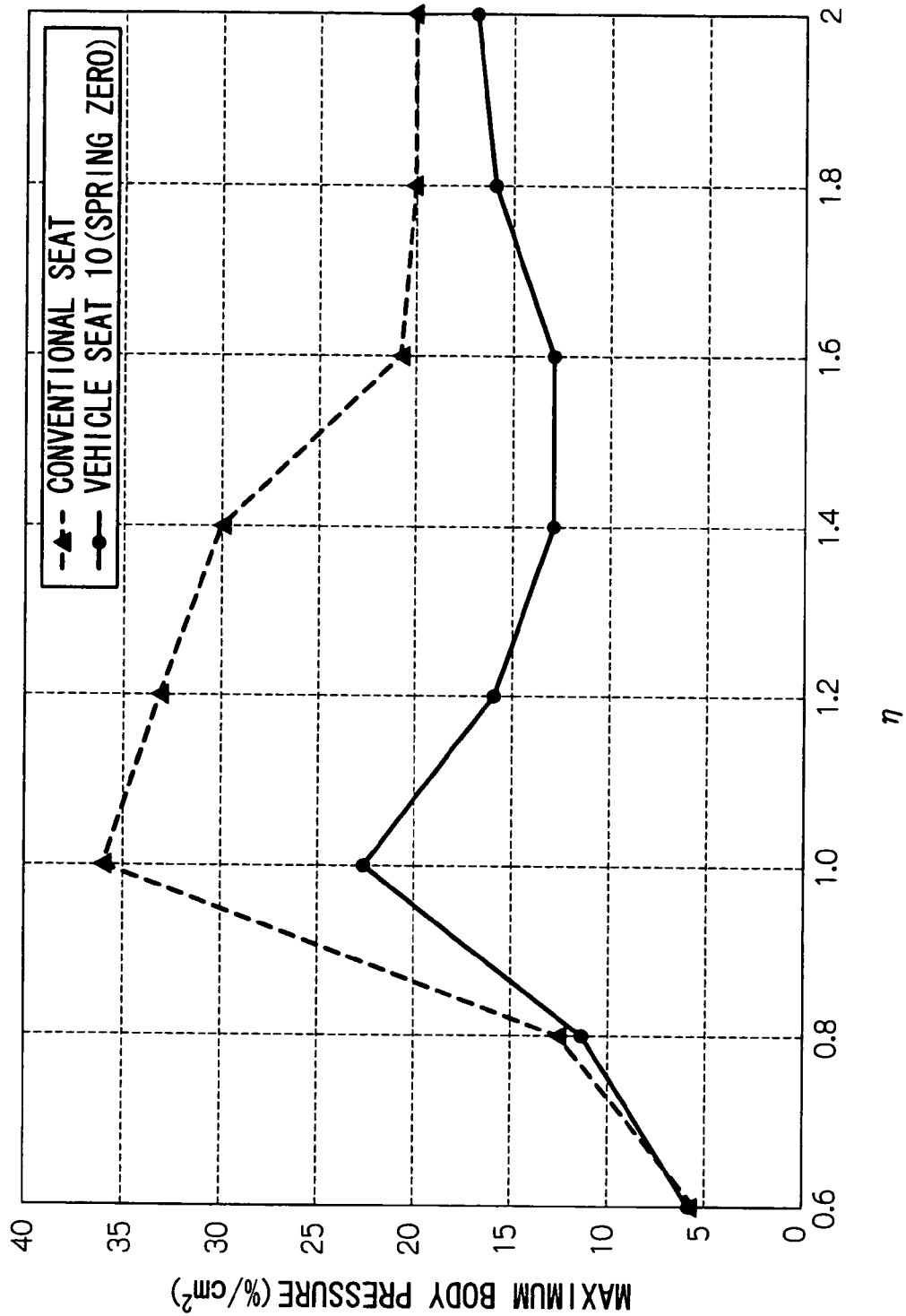
FIG. 31 is a graph showing a relationship between frequency and maximum body pressure at a time of vibration input at the seat cushion which structures the vehicle seat relating to the embodiment of the present invention.
Figure 32A:
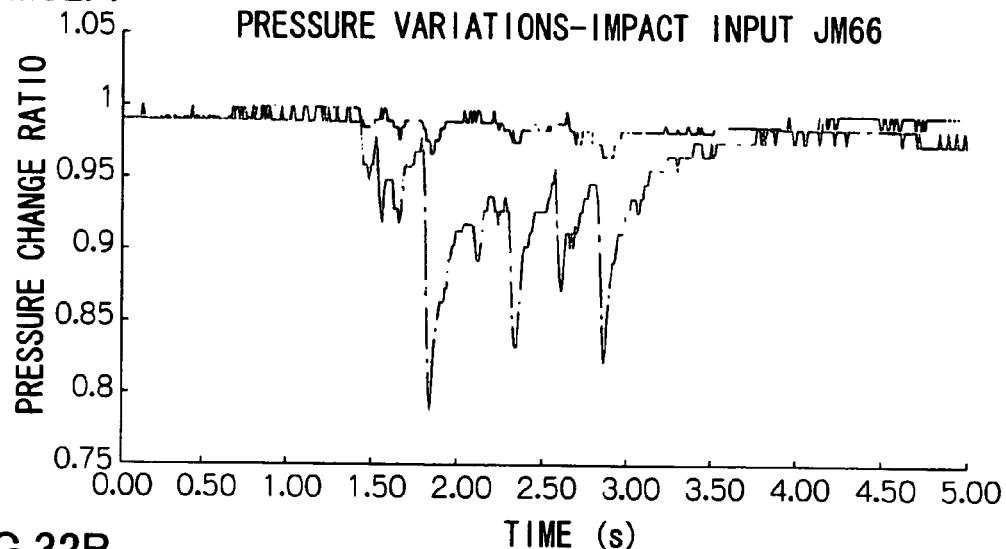
FIG. 32A is a graph showing a relationship between time and body pressure change ratios at a time of impact input at the seat cushion which structures the vehicle seat relating to the embodiment of the present invention.
Figure 32B:
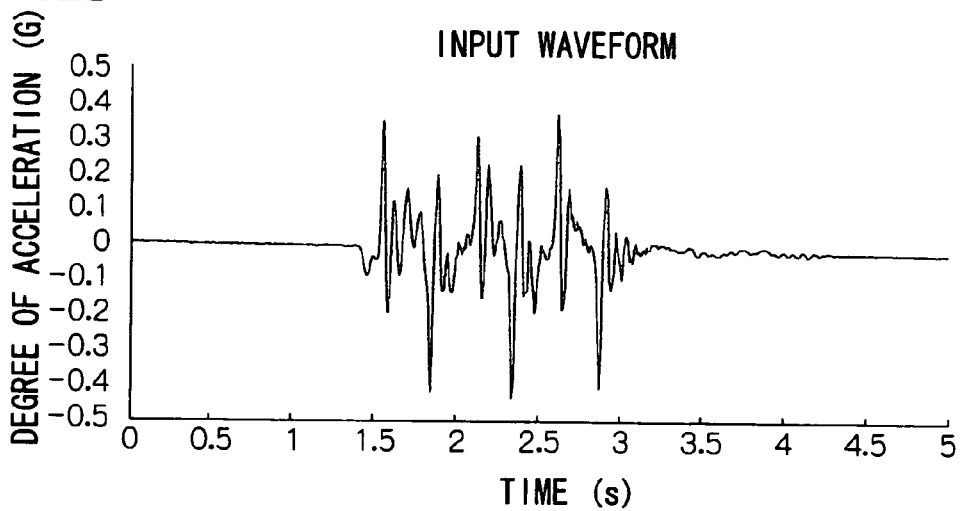
FIG. 32B is a graph showing an impact input waveform.
Figure 32C:
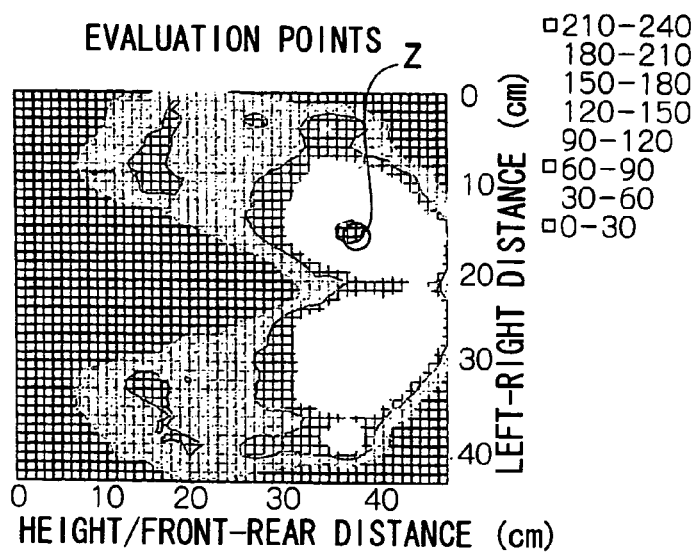
FIG. 32C is a graph showing body pressure measurement points.

Further, in the vehicle seat 10, pressure changes at vibration input times can be effectively suppressed by the spring zero characteristic. FIG. 30A shows a body pressure distribution of the seat cushion 18 when vibrations in the resonance frequency region are input in the sitting state, and FIG. 30B is a body pressure distribution of a seat cushion at a conventional urethane seat when vibration in the resonance frequency region is input in the sitting state. From these drawings, with the seat cushion 18 which realizes the spring zero characteristic in the region below the hipbone joints, body pressure below the hipbone joints is remarkably low. That is, pressure changes are small for the stationary sitting state. FIG. 31 is a graph showing maximum body pressures for each of applied excitation frequencies of the seats used in the tests of FIG. 30 (the uplifts of frequencies summated). From this drawing, it is understood that with the seat cushion 18 a body pressure reduction effect is obtained in a wide range around the resonance frequency. Furthermore, FIG. 32 show pressure variations when a random waveform is input. The solid line shown in FIG. 32A shows body pressure variation ratios (body pressure variation ratios for the stationary state) at Z below a hipbone joint, which is shown in FIG. 32C, when the waveform shown in FIG. 32B is input. The single-dot chain line of FIG. 32A is body pressure variation ratios of a conventional seat in the same conditions, shown for comparison. From these drawings, it is understood that a remarkable body pressure variation suppression effect is obtained in response to a random waveform at the seat cushion 18 with the spring zero characteristic. Thus, at the seat cushion 18, not only is a vibration (displacement) transmission ratio simply reduced at vibration input times, but pressure variations, particularly pressure variations below the hipbone joints, are suppressed. Therefore, application of stress to the sitter is prevented and an amelioration of fatigue is achieved. Further, compression of blood vessels due to pressure rises is suppressed, and consequently an amelioration of fatigue is achieved.

Figure 18B:
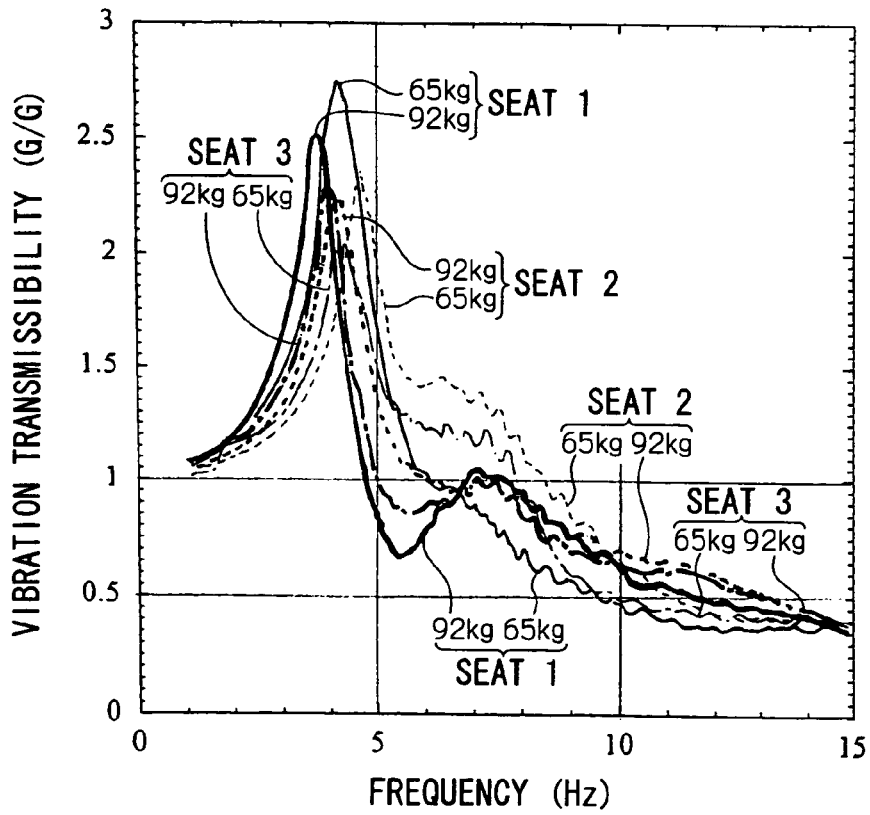
FIG. 18B is a graph showing vibration transmissibilities of conventional types of seat for comparison.

FIG. 18B is a graph showing respective vibration transmissibilities of the vehicle seat 10 and conventional vehicle seats. As shown in this figure, in contrast with the vehicle seat 10 of which the resonance frequency is approximately 3.5 Hz, the resonance frequencies of vibration systems including sitters of the conventional seats are not below 4 Hz. Consequently, with the conventional seats, vibration transmissibilities in frequency regions of around 5 Hz are larger than 1 or vibration transmissibilities at 10 Hz are larger than 0.5. That is, in conventional seats, because resonance frequencies are high, there have been none which provided a vibration characteristic which achieves both a vibration transmissibility of 1 in the resonance frequency region of the spinal column, around 5 Hz, and a vibration transmissibility of 0.5 or less at 10 Hz, while suppressing the dependency on loading mass. Here, for 92 kg with conventional seat 1 shown in the figure, the resonance frequency is smaller than 4 Hz, but this is due to mass dependency of the resonance frequency.

In the seat cushion 18, impedance, compliance and the like of the seat cushion characteristics in a sitting state match impedance, compliance and the like of muscles of a sitter. Therefore, at the sitter, even when vibrations are transmitted as described above, variations in support pressure, restraining force and the like and stresses such as pain, unsettling sensations and the like based thereon are further ameliorated. In particular, the jerk characteristic of the seat cushion 18 is a soft characteristic relative to the jerk characteristic of muscles of the sitter. Therefore, variations in loading, support pressure and the like at vibration input times are absorbed, and the causing of pain at particular regions of the sitter is prevented. Here, at the posture maintenance-type seat which provides the body pressure distribution shown in FIG. 13A, stiffness was high for posture maintenance, muscles would be crushed by a long period of sitting, and amelioration of fatigue in accordance with long periods of sitting was not possible.

Further still, in the vehicle seat 10, attenuation with respect to movements of the sitter to downward is large, because of the structure which achieves the aforementioned compliance-matching, that is, because of the structure in which the torsion bar 46 twists in accordance with sitting and tension of the lower layer sheet 50 is reduced. Therefore, large inputs of impact vibrations and the like can be reliably absorbed. Further, when such a large input acts, because spring force of the upper layer sheet 52 is added to spring force of the torsion bar 46 and restoring force acts, after impact absorption, the sitter returns to an initial sitting posture quickly without using muscle force. Moreover, because the restoring (upward) side attenuation ratio ζu is larger than the downward attenuation ratio ζd, bouncing up of the sitter from the seat cushion 18 at the time of this restoration (overshooting) is prevented. Further, because there is a difference between the upward and downward attenuation ratios ζu and ζd, in comparison with a structure in which the attenuation ratio ζd is made large in order to suppress the above-mentioned bouncing up, overall up-down direction attenuation ratios being made larger and widening of the aforementioned frequency region of the half power points are prevented.

Here, in the aforementioned FIG. 20A, up-down direction attenuation ratios of, beside the vehicle seat 10, conventional types of seat (seats in which there is no connection of the rear end of a cushion material with a sitting portion frame via a resilient member) are shown. As shown in this figure, it is understood that there have been seats with ζu larger than ζd heretofore, but the differences between ζu and ζd are small, or ζd is small at 0.2 or less (that is, the spring constant is large and the resonance frequency is high). Therefore, the latter seats express Lissajous curves as are shown in FIG. 22B and are seats with small attenuation capacities. On the other hand, the vehicle seat 10 expresses high attenuation ability regardless of a small spring constant. Further, FIG. 20B is a graph showing relationships between resonance frequency and downward attenuation ratio ζd (which is a logarithmic axis) at the vehicle seat 10 and the above-mentioned types of seat. From this figure, it is understood that there is a set of types of seat in which, when the resonance frequency, that is, the spring constant of a vibration system including the sitter at the seat cushion 18 falls, the reduction ratio ζd also falls, and a set of types of seat which provide a predetermined attenuation ratio ζd which does not depend on resonance frequency. The vehicle seat 10 is the latter, and it is understood from this figure that in comparison with conventional types of seat, the resonance frequency is set lower.

That is, at a conventional seat which is not provided with a resilient member between a cushion material and a sitting portion frame, it has been necessary to make the attenuation ratio smaller because restoring force is insufficient when the resonance frequency falls, or to set the resonance frequency higher in order to assure the attenuation ratio. However, with the present vehicle seat 10, because the resilient member which causes the rear end of the lower layer sheet 50 (the connecting pipe) to descend while moving forward in accordance with sitting and prevents an increase in tension of the lower layer sheet 50 is provided between the rear end of the lower layer sheet 50 and the rear end of the sitting portion frame 14, the above-described preferable vibration characteristics are realized. In particular, because the movable frame 34 (the arm members 42) which is pivotably supported at the sitting portion frame 14 is provided, the torsion bar 46 can be employed as the resilient member, and two-dimensional (planar) tension being caused to act on the lower layer sheet 50 via the connecting pipe 44 is realized. According to the above, the vehicle seat 10 which, while achieving the above-described functions (effects), is also thin is realized.

Further, in particular, due to the lower layer sheet 50 and the upper layer sheet 52 of which resilient members are three-dimensional woven fabrics and which contribute to body pressure distribution of the sitter being combined, the realizations of compliance-matching with muscle of the sitter, body side support, formation of the resilient dam-like member S, and muscle characteristics are achieved, and hindrance of blood flows of the sitter, pain and the like are consistently prevented. Further, because the upper layer sheet 52 which has been stretched onto the sitting portion frame 14 presses the lower layer sheet 50 and reduces tension of the lower layer sheet 50, this particularly contributes to an increase in downward attenuation force. Moreover, in the vehicle seat 10, tensions due to the area of tension of the seat cushion 18 and the tension coil springs 78 of the seat back 22 absorb differences in physique of sitters, and because mass dependency of the resonance frequency is extremely small, even when persons of different body weights sit, stresses which are a cause of fatigue as described above can be reduced.

Furthermore, at the seat back 22, body side support by the back portion cushion material 24 is realized by the tension coil springs 74 and 76 which are metal springs. Therefore, in other words, rather than body side support with a stiff structure at which support pressure due to the side supports 80 is high, the body side support is realized by a soft structure due to deformation in a three-dimensional form which does not rely on increases in tension of the back portion cushion material 24. Therefore, stresses due to restraint can be ameliorated while posture maintenance is assured. In particular, because the tension coil springs 78 which cause left-right direction tensions to act on a region of the back portion cushion material 24 corresponding to the lumbar portion are provided, support pressure of the lumbar portion is higher, and a posture maintenance characteristic improves. Further, because the resilient member connecting the back portion cushion material 24 with the back portion frame 16 is the tension coil springs 74, 76 and 78 which bend in response to low loads, support pressures in accordance with physiques of sitters are realized. Furthermore, due to resilience of the back portion frame 16, spring constants and attenuation ratios (particularly attenuation ratios) are controlled in order that tension of the back portion cushion material 24 changes in accordance with loading, and these effects are promoted. In particular, when a large acceleration (an impact load) is input at a time of impact or the like, tension of the back portion cushion material 24 is reduced by deformation to the inside of the seat of the front ends of the support pipes 70 and the back portion side frames 64, the attenuation ratio (attenuation force) is increased, and the large input can be effectively absorbed. When an even greater impact load acts, the support pipes 70, of which the upper ends are fixed to the upper portion frame 66 and the lower ends are weakly supported at the back portion side frames 64 via the brackets 72, elastically deform further in the directions which reduce tension of the back portion cushion material 24, and effectively absorb this impact force.

Further here, as shown by the two-dot chain lines in FIG. 26, fatigue is reset by posture changes of the sitter, that is, fluctuations due to natural body movements of the sitter. That is, (regions of) muscles which are employed by fluctuations alter, stresses in accordance with maintaining posture are eliminated, and fatigue is ameliorated by mental uplift due to α waves of 10 Hz to 12 Hz.

In the vehicle seat 10, the body side support due to the seat cushion 18 and the seat back 22 (the side supports 80) and the front-rear direction movement restriction state due to the dam-like member S are maintained, while posture changes due to movements in the center of gravity of the sitter are allowed. Therefore, accumulation of fatigue is prevented by posture changes which the sitter unconsciously carries out utilizing vibration energy which is generated at times of operation of a steering wheel, pedals and the like or running of the vehicle. Further, the sitter uses muscle force by these posture changes, but a basic posture is maintained in the process of a posture change because of friction between the body pressure distribution (area of tension) due to the seat cushion 18 and the sitter. Therefore, large muscle forces are not required except when changing the center of gravity position. Thus, use of muscle force acts as a stimulus in a direction which ameliorates fatigue. Furthermore, after a posture change, the posture after the change can be maintained without using very much muscle force, similarly to before the change, by the center of gravity, the resilient dam-like member S and the aforementioned body side support. Here, in a posture maintenance-type seat which applies the body pressure distribution shown in FIG. 13A, because posture changes are not allowed, a sense of restraint is applied in accordance with stresses on the sitter in a state of a long period of sitting, and a fatigue amelioration effect has been small.

Figure 33:
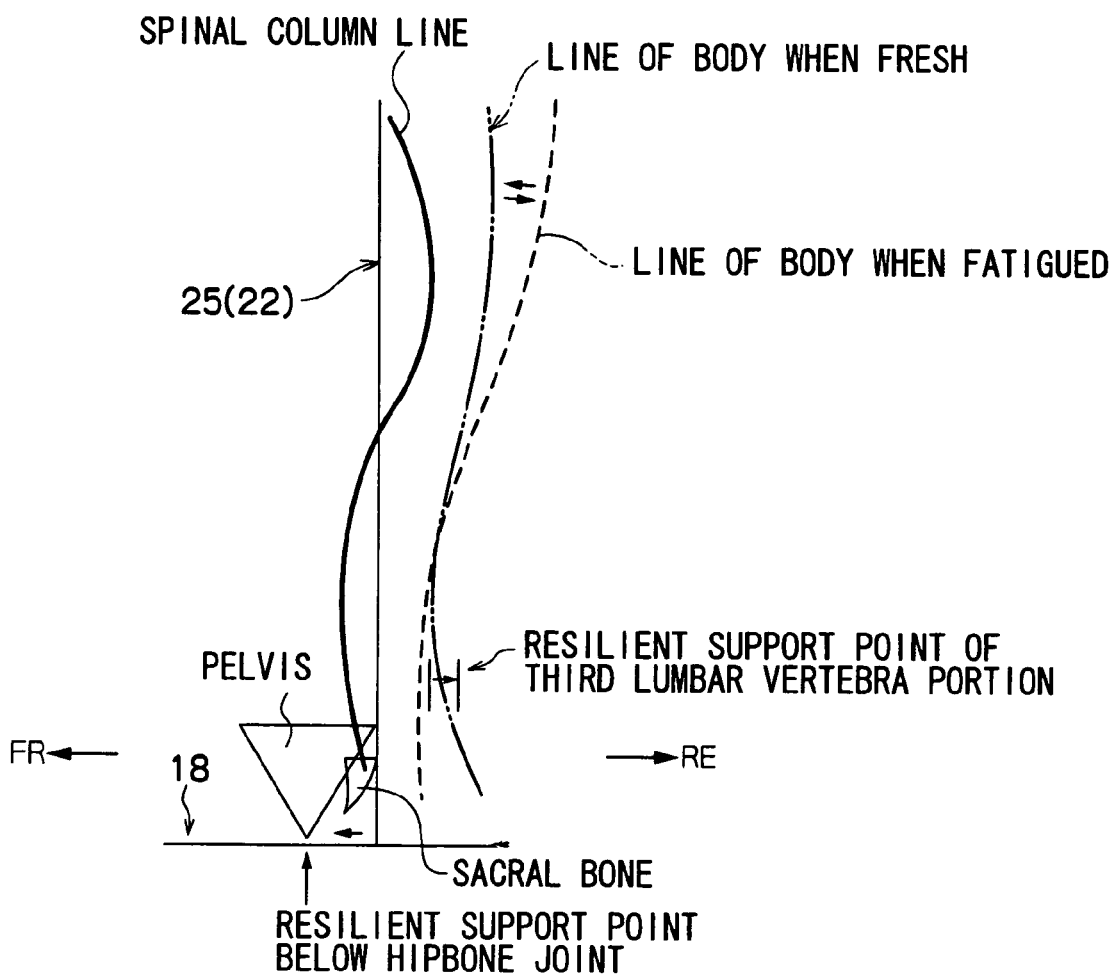
FIG. 33 is a schematic view representing posture changes of a sitter at a seat back which structures a vehicle seat relating to an embodiment of the present invention.

Furthermore, in the vehicle seat 10, because the backrest 25 is substantially flat in the non-sitting state as described earlier, posture changes in accordance with accumulation of fatigue are even easier. Specifically, as shown in FIG. 33, a line of the spinal column of a sitter is disposed so as to intersect with respect to a line of the backrest 25 of the non-sitting state. In a state of little fatigue, a line from the back portion to the buttock portion of the sitter is as shown by the two-dot chain line. On the other hand, when fatigue accumulates and the upper body of the sitter leans backward (buttock-sliding), the position below the hipbone joints moves forward, and the line from the back portion to the buttock portion of the sitter is as shown by the broken line. In the state of little fatigue, in comparison with the buttock-sliding state at the time of fatigue, support pressure of the lumbar portion is comparatively high, and support pressure of the back portion is comparatively low. Consequently, movement forward of the buttock portion (the hipbone joints) in accordance with buttock-sliding while leaning back is easy, and buttock-sliding action of the upper body of the sitter in accordance with a degree of fatigue are allowed, without using very much muscle force in order to press the backrest 25.

Further, at the seat back 22, because tension hardly increases in accordance with sitting and the shape of the back portion cushion material 24 (the backrest 25) is changed to a three dimensions to correspond with the upper body of the sitter, in other words, because the spring zero characteristic is realized in the equilibrium state at the seat back 22, body movements of the sitter in accordance with, for example, breathing and the like are allowed (absorbed) by deformation of the back portion cushion material 24. Therefore, loading on the sitter is ameliorated, a sitting feel is improved, and further, stresses in a case of sitting over a long period are also ameliorated.

Furthermore here, with regard to fatigue, because stresses such as pain, external stimuli and the like are factors which reduce cutaneous blood flows, the positive promotion of cutaneous blood flows can be considered as a reason for reducing fatigue. A characteristic of large-scale changes in random vibrations which are generated by external forces is caused to match a characteristic of vibrations of rhythms (biological rhythms) of cutaneous blood flows. Thus, in other words, vibrations which are input to the vehicle are provided as external forces to biological rhythm vibrations, which are non-linear vibrations, and the drawing-in effect can be caused. When the drawing-in effect occurs, a period of the rhythm vibrations matches a period of external force vibrations, and in particular, certain rhythm vibrations which are non-linear vibrations match in phase with phases of external forces and so resonate. Thus, vibration inputs are utilized to proactively cause biological rhythm vibrations, cutaneous blood flows are promoted, a tension state, a relaxed state and the like are produced by fluctuations of the body, and fatigue can be ameliorated. In the present vehicle seat 10, because of loading of the load-distortion characteristic of the seat cushion 18 which resembles the characteristic of muscle (a 1/f fluctuation characteristic), the vibration characteristic in which the vibration transmissibility at around 5 Hz is approximately 1 and the vibration transmissibility at 10 Hz is 0.5, and the characteristic in which compliance is flat (the spring zero characteristic), a structure in which the biological rhythms are proactively caused and fatigue is ameliorated is realized. That is, in the vehicle seat 10 in which the vibration transmissibility is approximately 1 as described above and a phase difference is made small, because vibrations are transmitted such that phase displacement with respect to the sitter is minimized (the sitter follows the movements of the seat), an important physiological property for beings, meaning altering physiological functions of the sitter, can be produced.

Further, in the vehicle seat 10, because the aforementioned area of tension is produced by the cushion material 20, the movable frame 34 including the torsion bar 46, the tension coil springs 54, the belt member 56 and the tension coil springs 58, a desired stiff surface arrangement, in accordance with the hip-point, sitting angle, design shape, body shapes of expected sitters and the like, can easily be obtained by (changes of) specifications such as characteristics, connection positions, arrangements, provision numbers and the like of these components. Consequently, with the vehicle seat 10 of the structure described above, in comparison with conventional seats, seat development costs are greatly reduced (although the realization of the characteristics of the vehicle seat 10 has been difficult). That is, with a urethane seat, because a stiff surface arrangement is specified by shapes of the urethane, combination of urethanes with different characteristics and the like, it has been necessary to alter urethane forms and investigate (test) stiff surface arrangements (characteristics) in order to obtain a required stiff surface arrangement. However, with the vehicle seat 10, it is possible to easily obtain a desired stiff surface arrangement by specification of the characteristics, connection positions, arrangements, provision numbers and the like of the connecting members as described above. Further, the torsion bar 46, in comparison with other metal springs, can achieve a saving of space.

To summarize the above, at the vehicle seat 10, in a stationary sitting state, because the seat cushion 18 and the seat back 22 respectively absorb fixed frequency fluctuations due to breathing of the sitter, that is, fluctuations in accordance with breathing of the sitter are not hindered, and the accumulation of fatigue due to sitting over a long period is suppressed. Further, at the vehicle seat 10, due to the body side support structure and the characteristic resembling muscle, posture of the sitter is maintained without demand on muscle force, while muscles of the sitter slacking and fatigue causing stress to increase can be prevented, in addition to which, because posture changes for fatigue suppression are allowed, the accumulation of fatigue is suppressed. Thus, the sitter sitting stationary in the vehicle seat 10 is nearly a resting metabolic state.

On the other hand, in a moving sitting state, commonly, active metabolism is performed in the body of a sitter and metabolism is promoted by fatigue. However, with the vehicle seat 10, vibrations (amplitudes and body pressure changes) which are transmitted to the sitter due to inputs of external vibrations as described above are ameliorated, and these external vibration inputs are utilized and caused to generate α waves of 10 Hz to 12 Hz, which generate a relaxed waking state, in the brain of the sitter. Therefore, changes in the active metabolism itself are suppressed to stable biological rhythms. Furthermore, the external vibration inputs are utilized and cutaneous blood flow of the sitter (biological rhythms) are promoted. Therefore, the metabolism of the sitter is further stabilized. Thus, with the vehicle seat 10, a moving degree of fatigue of a sitter matches a stationary degree of fatigue as described above (see FIG. 29).

In sensory evaluations by plural subjects performed with the vehicle seat 10 installed at the driving seat of a test vehicle, evaluations were obtained from the subjects that breathing was comfortable, sleepiness was eliminated, and posture changes were easy to perform. More specifically, with regard to breathing, evaluations were obtained that breathing could be performed comfortably without a sense of compression despite the stability of sitting, and moreover, body movements in accordance with breathing were absorbed and movements of the line of sight were eliminated. This is due to the respective spring zero characteristics of the seat cushion 18 and the seat back 22. Further, with regard to the elimination of sleepiness, evaluations were obtained that, particularly for subjects who sensed sleepiness prior to driving, sleepiness was eliminated immediately after starting driving without moving into a state of agitation, and a relaxed waking state continued throughout a driving period (about 120 minutes). This is thought to be an effect due to α waves of 10 Hz to 12 Hz being drawn out due to vibrations which are transmitted through a vehicle floor. Furthermore, in regard to posture changes, evaluations were obtained that stable sitting states were maintained, while the buttock portion and the lumber portion could easily move in desired directions. In particular, evaluations were obtained that a sense was obtained that force in a direction supporting a posture change was imparted from the vehicle seat 10. This is thought to be an effect due to, in addition to the body side support by the resilient dam-like member S, the seat cushion 18 and the seat back 22, changes in support pressure of the back portion cushion material 24, which is stretched to be substantially flat in the non-sitting state, in accordance with posture changes (for example, when the lumber portion presses the back portion cushion n material 24, the upper back portion is pressed by the back portion cushion material 24). Further, it is thought that movements of the cushion material 20 (the torsion bar 46) and the back portion cushion material 24, due to vibrations transmitted through the vehicle floor, also contribute to supporting posture changes of the sitter. In the above sensory evaluations, in general, the evaluations from the subjects that there was little fatigue in accordance with driving, that is, evaluations generally matching the fatigue line shown in FIG. 29, were obtained.

Furthermore, in the vehicle seat 10, at a time of impact, an attenuation ratio is controlled by deformations of the back portion frame 16 which is a resilient structure, and impact forces can be absorbed (over time) while loads acting on the sitter are substantially ameliorated.

Next, variant examples of the vehicle seat 10 will be described. Here, in regard to components and portions which are basically the same as the above embodiment or previously mentioned structures, reference numerals the same as the above-described embodiment are assigned, and descriptions thereof are omitted.

Figure 35:
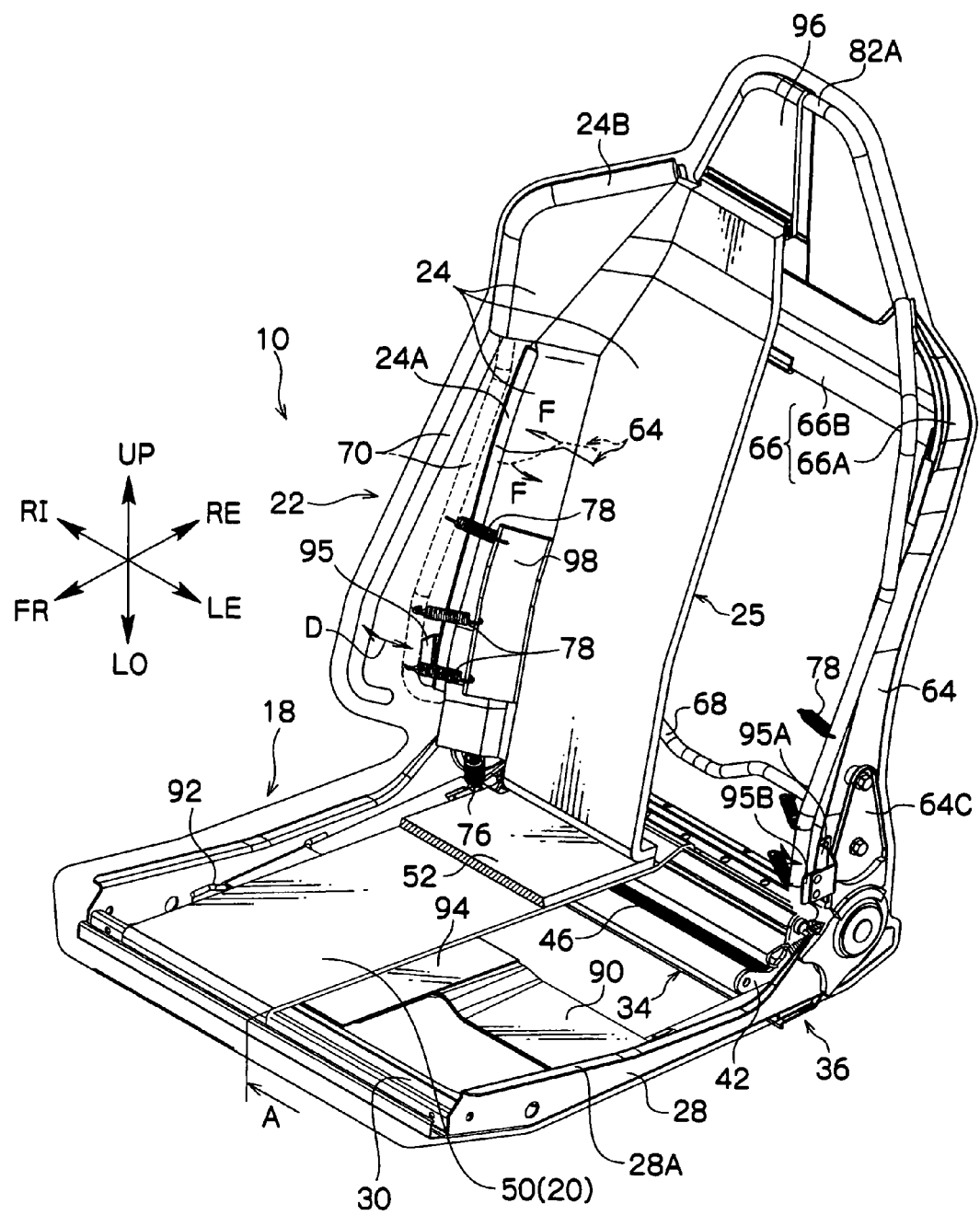
FIG. 35 is a perspective view of a vehicle seat relating to a first variant example of an embodiment of the present invention.
Figure 36:
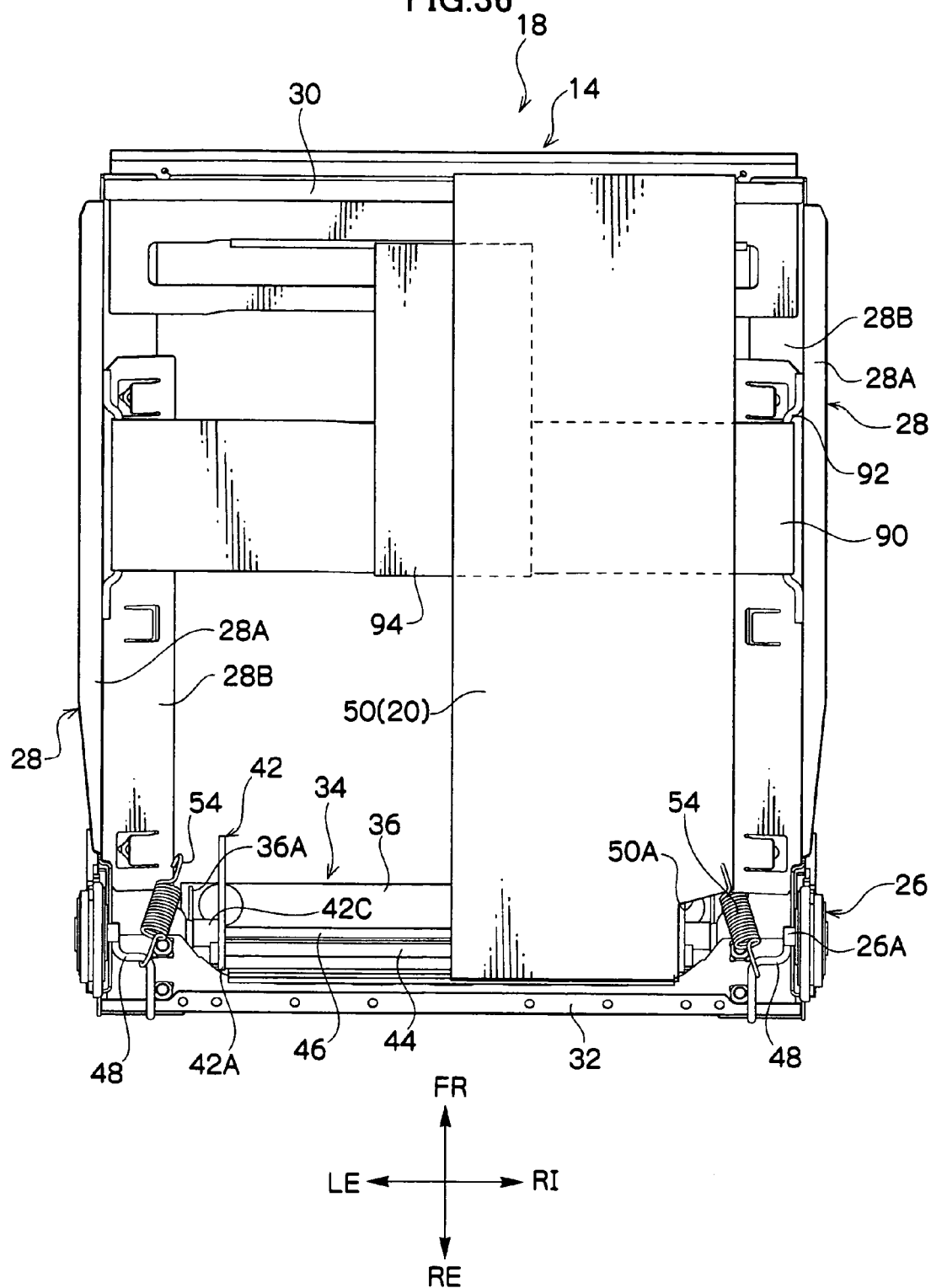
FIG. 36 is a plan view of a seat cushion which structures the vehicle seat relating to the first variant example of an embodiment of the present invention.
Figure 37:
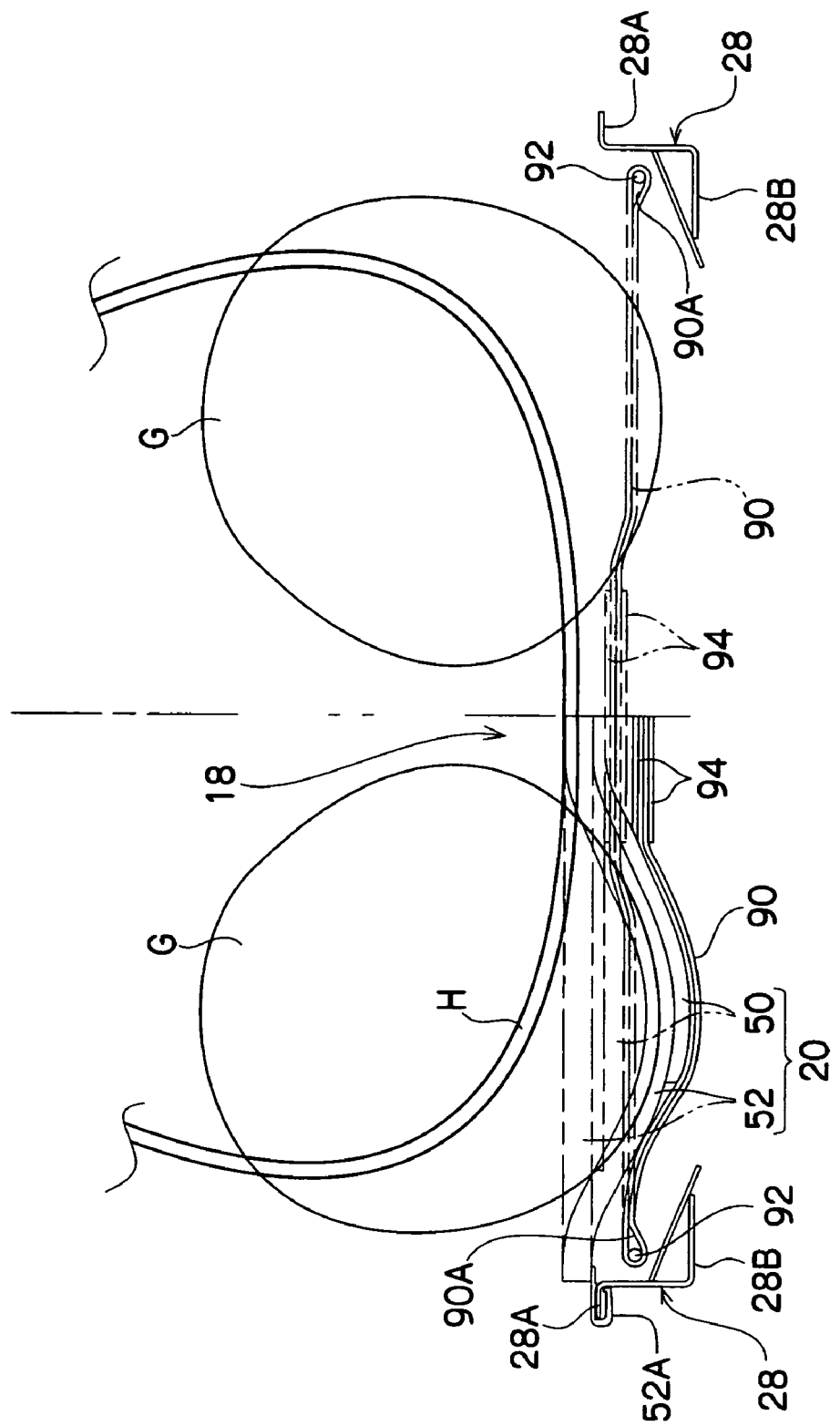
FIG. 37 is a sectional view, corresponding to FIG. 7B, of the vehicle seat relating to the first variant example of an embodiment of the present invention.

In FIGS. 35 to 37, the vehicle seat 10 is shown, which is provided with a resilient belt member 90 having restoring force to serve as a "sheet-form member" relating to a first variant example, in place of the belt member 56 and the tension coil springs 58. As shown in these drawings, the belt member 90 is formed in a substantially rectangular shape with length in the left-right direction, and two end portions of the length direction are anchored at respective anchoring rods 92 which are fixed at inner faces of the side frames 28. In this first variant example, the belt member 90 is formed in a two-layer structure by stitching or the like, and is anchored at the anchoring rods 92 by the anchoring rods 92 being inserted into annular portions 90A (see FIG. 37), which are formed at the two length direction end portions. This belt member 90 is disposed slightly rearward relative to the belt member 56 of the embodiment described above (a front end vicinity of an intermediate portion). Further, the anchoring rods 92, that is, anchoring heights of the anchoring rods 92 to the side frames 28, are set to substantially central portions of the side frames 28 in the up-down direction.

Further, a longitudinal belt member 94 is fitted by stitching or the like to a lower face of a left-right direction central portion of a substantial front half portion of the lower layer sheet 50. The longitudinal belt member 94 is formed in a substantially rectangular form with length in the front-rear direction in plan view, a front end portion is disposed at a front end vicinity of the lower layer sheet 50, and a rear end portion is disposed at a front-rear direction substantially central portion of the lower layer sheet 50. This longitudinal belt member 94 is formed in a two-layer structure which is folded over at the rear end portion, and at a front half portion thereof, upper and lower layers are fixed with stitching or the like. At a rear half portion of the longitudinal belt member 94, the belt member 90 is inserted through. That is, the belt member 90 and the longitudinal belt member 94 are arranged in a substantial 'T' shape at the front portion of the lower layer sheet 50.

For the belt member 90 described above, in a non-sitting state, a central portion which is inserted through the longitudinal belt member 94 is disposed higher than the length direction end portions which are anchored at the anchoring rods 92, and tension hardly acts.

In the vehicle seat 10 which is equipped with the belt member 90 and the longitudinal belt member 94 relating to this first variant example, when the lower layer sheet 50 distorts downward in accordance with sitting, the belt member 90 initially slackens, and when the distorting of the lower layer sheet 50 becomes larger, the belt member 90 restricts distorting to downward of a front portion of the lower layer sheet 50 by tension. In this state, as shown in (a left half portion of) FIG. 37, portions of the lower layer sheet 50 at left-right direction outer sides of the longitudinal belt member 94 principally support the thigh portion G. That is, in the state in which the longitudinal belt member 94 is mounted at the front portion of the lower layer sheet 50 and deformation of the left-right direction central portion with comparatively high surface stiffness is restricted, the belt member 90 restricts distorting to downward of the lower layer sheet 50. Therefore, excessive sinking of the thigh portion G of the sitter is prevented, and body side support from inner and outer sides of the thigh portion G is realized. Thus, left-right direction movement of the sitter is more effectively restricted, and posture maintenance improves.

Further, in this first variant example, the belt member 90 and the longitudinal belt member 94 raise surface stiffness of the front portion of the lower layer sheet 50 in accordance with sitting. Thus, formation of the resilient dam-like member S forward of the position below the hipbone joints of the sitter is similar to in the embodiment described above.

Further, in this first variant example, a support structure by the back portion frame 16 of the back portion cushion material 24 of the seat back 22 differs from the embodiment described above. Specifically, in this first variant example, at the left and right back portion side frames 64, bushes 91, which are formed of a resilient material such as rubber or the like (or may be metallic disk springs), are provided between the back portion side frames 64 and lower portion members 64C (description of which was omitted for the embodiment described above) which are mounted at the reclining mechanism 26, and structure is formed which is easy to pivotably displace in the direction of arrows F shown in FIGS. 35 and 39. That is, the back portion side frames 64 cause the bushes 91 to deform, while being displaceable such that front portions turn to the seat inside and rear portions to the seat outsides.

Furthermore, in this first variant example, lower end vicinity portions of the support pipes 70 are connected to the back portion side frames 64 via support brackets 95, instead of the brackets 72. At the support brackets 95, first brackets 95A which are fixed to the back portion side frames 64 and second brackets 95B which are fixed to the support pipes 70 are connected by fastening means such as nuts and bolts or the like. Bolt holes of the first brackets 95A or the second brackets 95B are formed as long holes with length in the front-rear direction. Thus, the support pipes 70 are structures which are easy to resiliently deform in the direction of arrow E with respect to the back portion side frames 64. Furthermore, as shown in FIG. 39A, respective plate springs 97 are mounted at the back portion side frames 64, and the plate springs 97 urge the support brackets 95, that is, the support pipes 70, in directions of deformation to the seat inside.

At the back portion cushion material 24, the two left and right side portions of an upper end portion thereof are anchored at upper end portions of the respective support pipes 70 by hook portions 24B, which are formed in correspondence with inflection portions of the support pipes 70. That is, in this first variant example, the left and right support pipes 70, which are cantilever structures with fixed upper ends, correspond to the first resilient member. A left-right direction central portion of the upper end of the back portion cushion material 24 is connected to another end portion of a tensioning cloth 96, which is wrapped over the headrest frame 82A and one end portion of which is anchored at the spanning portion 66B of the upper portion frame 66. Of a lower end portion of the back portion cushion material 24, the two left and right side portions are connected with the rear end of the sitting portion frame 14 via the tension coil springs 76, similarly to the embodiment described above, and a left-right direction central portion is connected to the rear edge portion of the upper layer sheet 52 by stitching or the like.

Figure 39A:
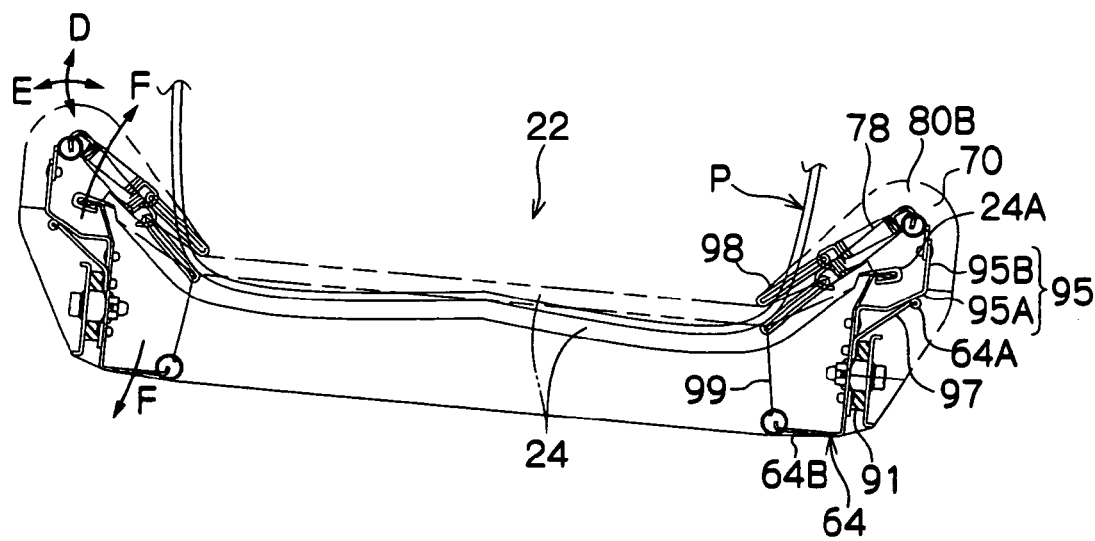
FIG. 39A is a sectional view of a seat back of the vehicle seat relating to the first variant example of an embodiment of the present invention, being a sectional view of a stationary sitting state.
Figure 39B:
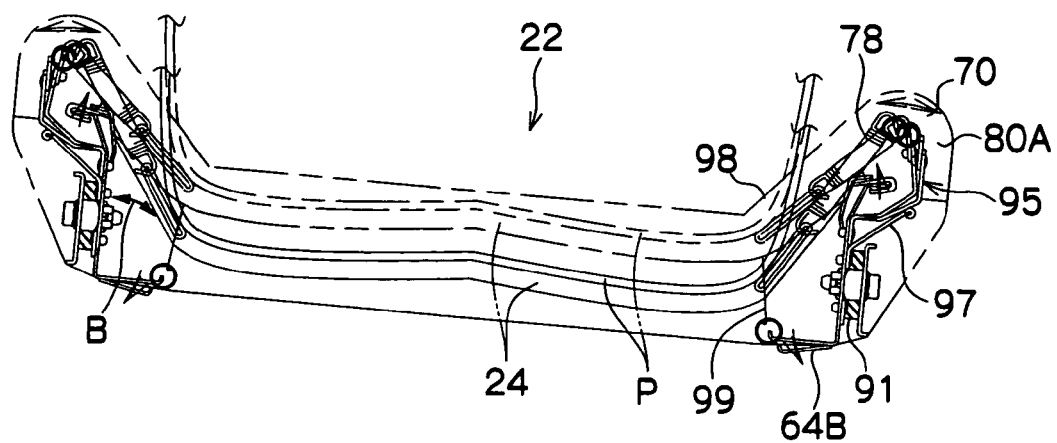
FIG. 39B is a sectional view of the seat back of the vehicle seat relating to the first variant example of an embodiment of the present invention, being a sectional view showing an impact state.

Further, at the back portion cushion material 24, excluding the upper end which is anchored at the support pipes 70 (a portion which is formed along a shoulder portion of a sitter), as shown in FIG. 39A, the two left and right end portions are anchored to the front flange portions 64A of the back portion side frames 64 via the hook portions 24A. At positions corresponding to the lumbar portion of a sitter of the two, left and right, edge portions of the back portion cushion material 24, one end portion of the tension coil springs 78 are connected via tension cloths 98, which are connected by stitching or the like to the front face thereof. The other end portions of the tension coil springs 78 are anchored at the support pipes 70. Further, in this first variant example, three of the tension coil springs 78 are provided at respectively the left and right. The skin materials 80B, which are comparatively thick, cover these tension cloths 98 and tension coil springs 78, and thus the side supports 80 are formed without provision of the cushion members 80A. The skin materials 80B also cover the hook portions 24B.

According to the above, in the seat back 22 relating to the first variant example, the back portion frame 16 (particularly the support pipes 79 and the back portion side frames 64) is a resilient structure. With this seat back 22, in the non-sitting state, the back portion cushion material 24 is disposed substantially between front ends of the left and right back portion side frames 64, and the side supports 80 are formed forward of this back portion cushion material 24. Here, of the back portion cushion material 24, at an upper portion thereof, the tensioning cloth 96 disposes a left-right direction central portion to rearward relative to the side supports 80, and at portions at which the tension coil springs 78 are provided, a left-right direction central portion is disposed to rearward relative to the side supports 80 due to tension of wires 99, which are provided between seat inward side end portions of the tensioning cloths 98 and the rear flange portions 64B. Thus, the backrest 25 which is substantially flat at the non-sitting upper body is formed between the left and right side supports 80.

Further, at the seat back 22, because the support pipes 70 are urged to the seat inside by the plate springs 97, extensions of the tension coil springs 78 are suppressed, and tension of the back portion cushion material 24 is reduced. That is, the back portion cushion material 24, in accordance with sitting, distorts rearward while an increase in tension is suppressed. Thus, at the back portion cushion material 24 at which tension in the up-down direction acts on the two left and right side portions at the upper end portions of the tension coil springs 76 and the support pipes 70, a body side support structure and a spring zero characteristic similar to the embodiment described above are realized, and matching of impedance, compliance and the like with muscles can be fittingly accomplished.

Figure 38:
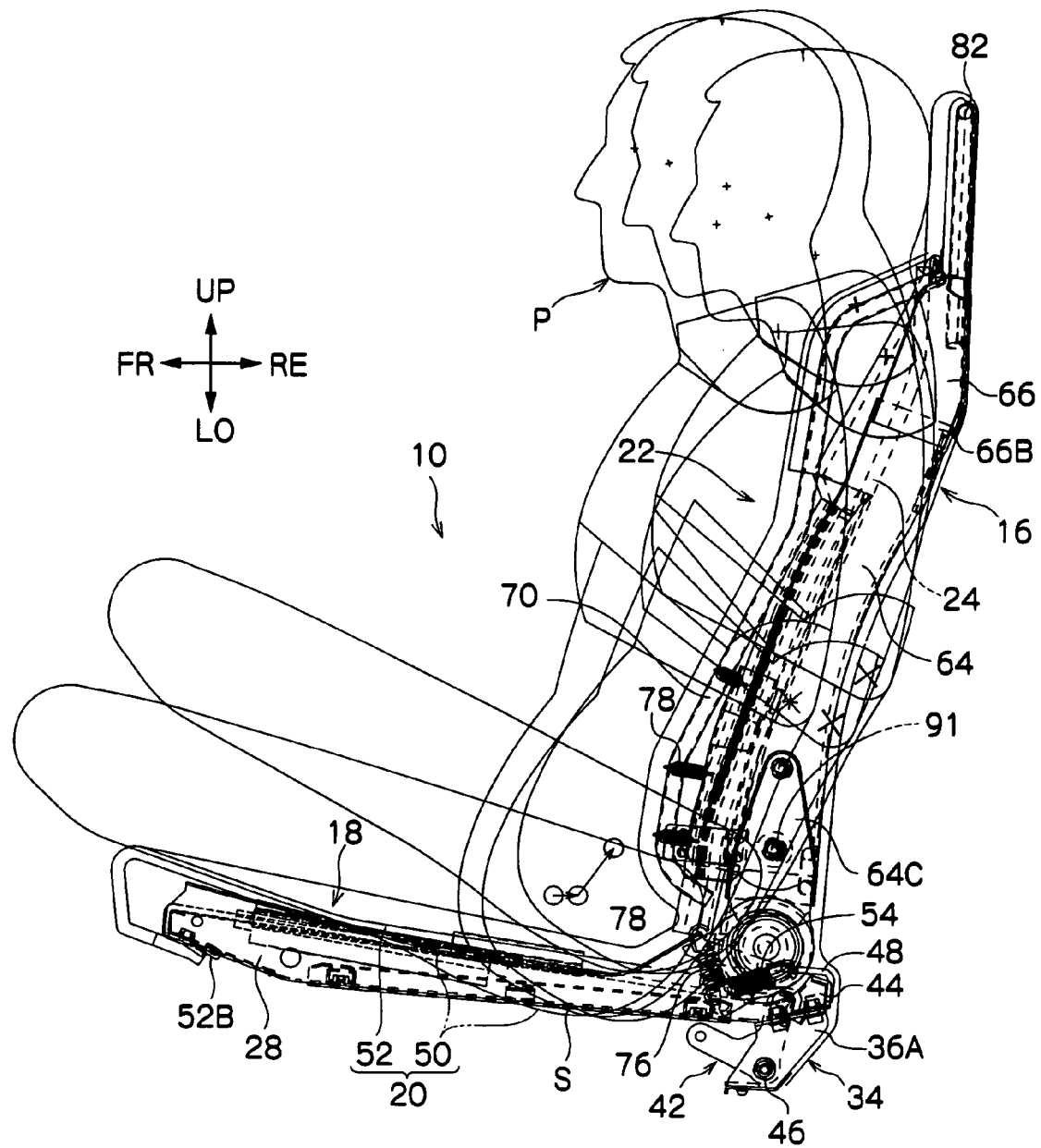
FIG. 38 is a side view showing a sitting state of the vehicle seat relating to the first variant example of an embodiment of the present invention.

Because the back portion side frames 64 are easily displaceable (with low loads) in the directions of arrow F, body movements in accordance with breathing of the sitter (body pressure changes) are absorbed by adjustment of tension of the back portion cushion material 24 due to displacements of the back portion side frames 64 in the directions of arrow F (by the spring zero characteristic). That is, in this first variant example, because the bushes 91 are provided, a structure is formed in which a spring constant is closer to zero in the equilibrium state than the embodiment described above. Thus, in a stationary sitting state shown in FIGS. 38 and 39A, the sitter can perform breathing without substantially using muscle force, and fatigue is ameliorated. Further, in a driving state such that rotational g's are higher, force is received at anchoring positions of the hook portions 24A which are directly attached to the back portion side frames 64, and handling of the vehicle can be performed stably.

Further, at this seat back 22, because the tension coil springs 78 are anchored at the support pipes 70 which are lower in stiffness than the back portion side frames 64, in other words, because a front-rear direction load that acts on the back portion cushion material 24 acts from the tension coil springs 78 directly on the left and right support pipes 70 and these easily deform in the directions of arrows D so as to approach one another, a tension increase of the back portion cushion material 24 is suppressed, and more effective control of an attenuation ratio is possible. Consequently, in, for example, an equilibrium state shown in FIGS. 38 and 39B, the left and right support pipes 70 (the support brackets 95) deform to the seat inward sides and the tension coil springs 78 extend, the back portion cushion material 24 distorts rearward while an increase in tension is suppressed, and can effectively absorb an impact with large attenuation. At this time, the left and right back portion side frames 64 displace in the direction of arrow F, while resiliently deforming to the seat inward sides along the direction of arrow B in a similar manner to the embodiment described above, and this contributes to control of the above-mentioned attenuation ratio.

In this first variant example described above, structures and operational effects other than the above-described are completely the same as the above-described embodiment.

In FIGS. 40 to 44, the vehicle seat 10 is shown provided with a belt member 100, which serves as a "sheet-form member", relating to the first variant example, in place of the belt member 56 and the tension coil springs 58. As shown in these drawings, the belt member 100 is formed in a substantially rectangular shape with length in the left-right direction, and the two end portions in the length direction are fixed to corresponding left-right direction side portions of the upper layer sheet 52 by stitching or the like. That is, the belt member 100 is disposed at the lower side of the lower layer sheet 50, and length direction end portions which protrude to left-right direction outsides of the lower layer sheet 50 are fixed to the upper layer sheet 52. Further, at the belt member 100, a front-rear direction width is large in comparison with the aforementioned belt members 56 and 92, a front end is disposed at a rear portion vicinity of front portions of the side frames 28, and a rear end is disposed rearward relative to a front-rear direction central portion of the lower layer sheet 50.

Figure 41:
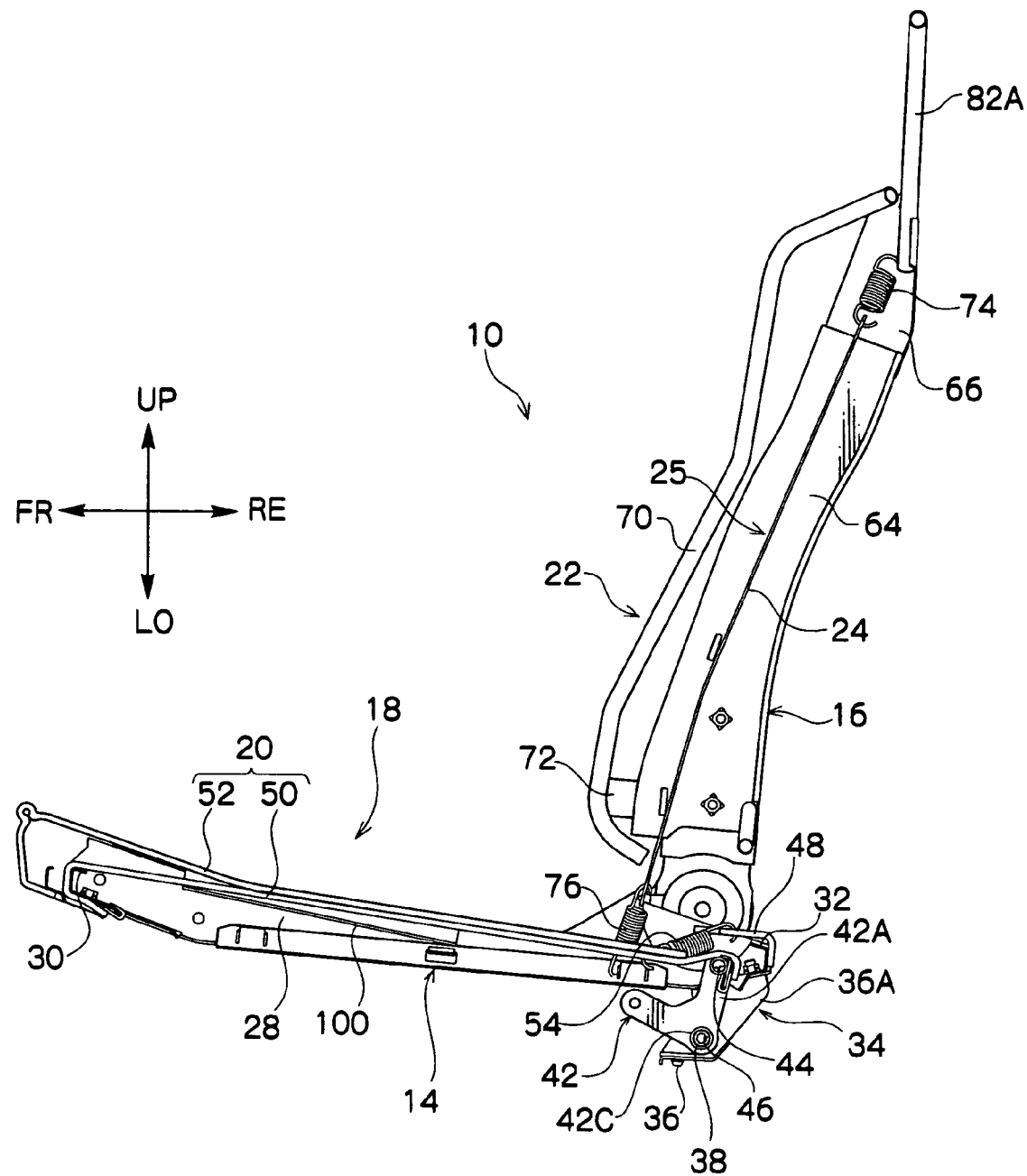
FIG. 41 is a side view of the vehicle seat relating to the second variant example of an embodiment of the present invention.
Figure 42:
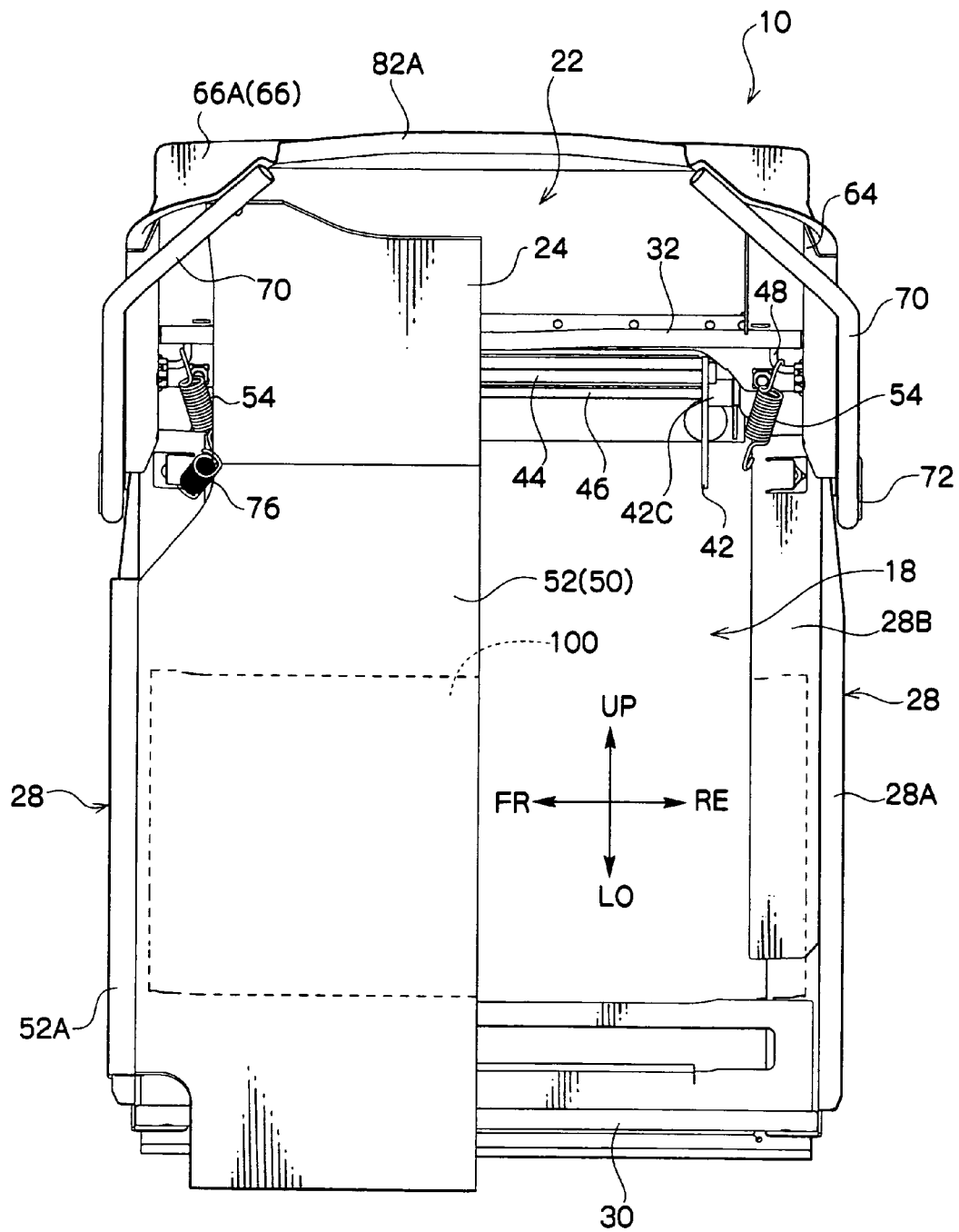
FIG. 42 is a plan view of a seat cushion which structures the vehicle seat relating to the second variant example of an embodiment of the present invention.

Of the belt member 100 described above, in the non-sitting state, the front end is disposed touching or being extremely close to the lower face of the lower layer sheet 50, and the rear end is disposed to be separated downward from the lower face of the lower layer sheet 50 (see FIG. 41). Therefore, in this state, a structure is formed in which tension does not act on the belt member 100.

Figure 44:
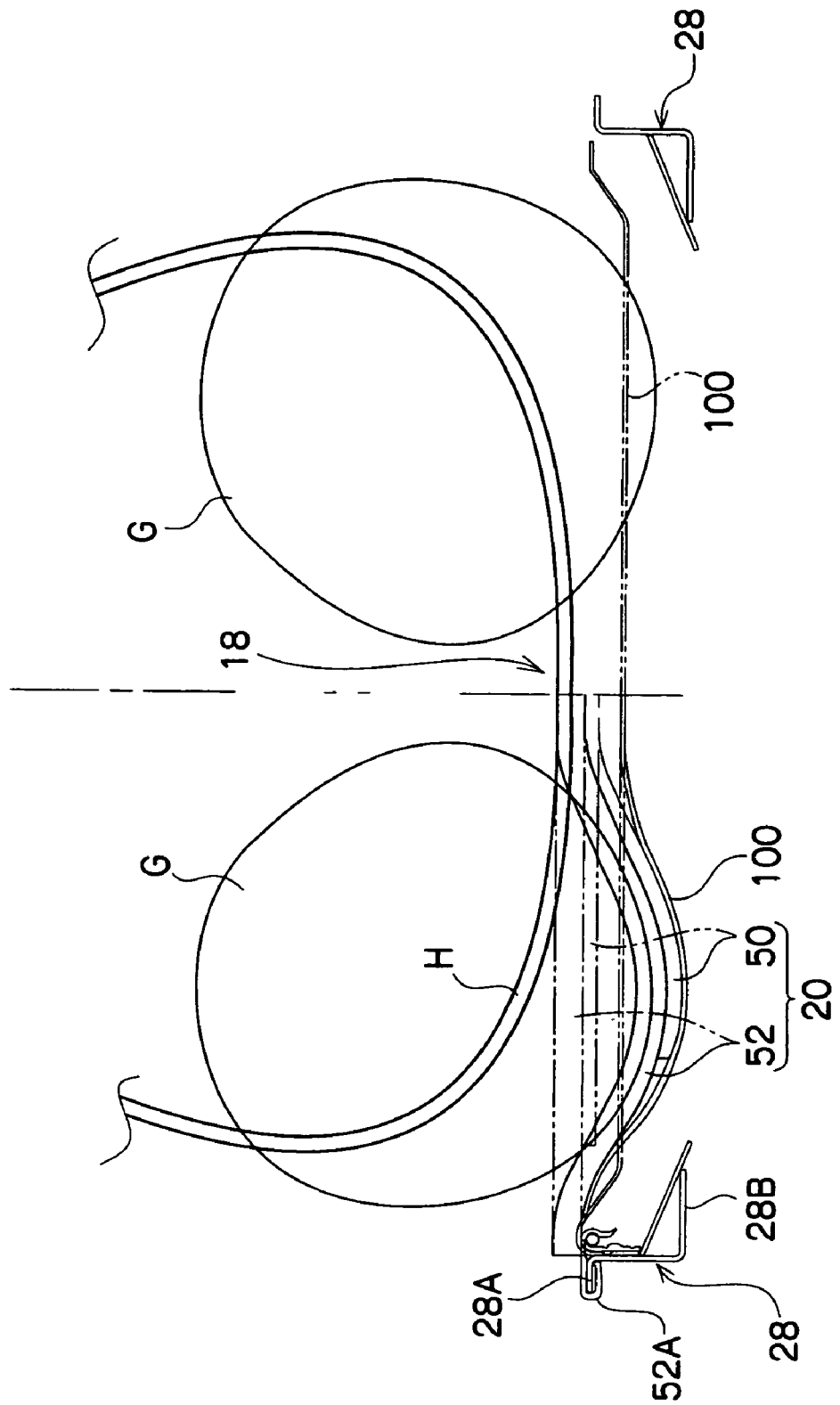
FIG. 44 is a sectional view cut along line 44-44 of FIG. 43.

At the vehicle seat 10 provided with the belt member 100 relating to this second variant example, when the lower layer sheet 50 distorts downward together with the upper layer sheet 52 in accordance with sitting, as shown in (a left half portion of) FIG. 44, the two left-right direction side portions of the upper layer sheet 52 hardly displace, and therefore the belt member 100 is pressed by the lower layer sheet 50 and tension acts. Due to a reaction force of this tension, the belt member 100 restricts distorting downward of a front portion of the lower layer sheet 50 by tension. In this state, portions of the lower layer sheet 50 at left-right direction outer sides of the longitudinal belt member 94 principally support the thigh portion G. Thus, excessive sinking of the thigh portion G of a sitter is prevented, while the aforementioned body side support of the thigh portion G is realized. Consequently, left-right direction movements of the sitter are more effectively restricted, and posture maintenance improves.

Figure 40:
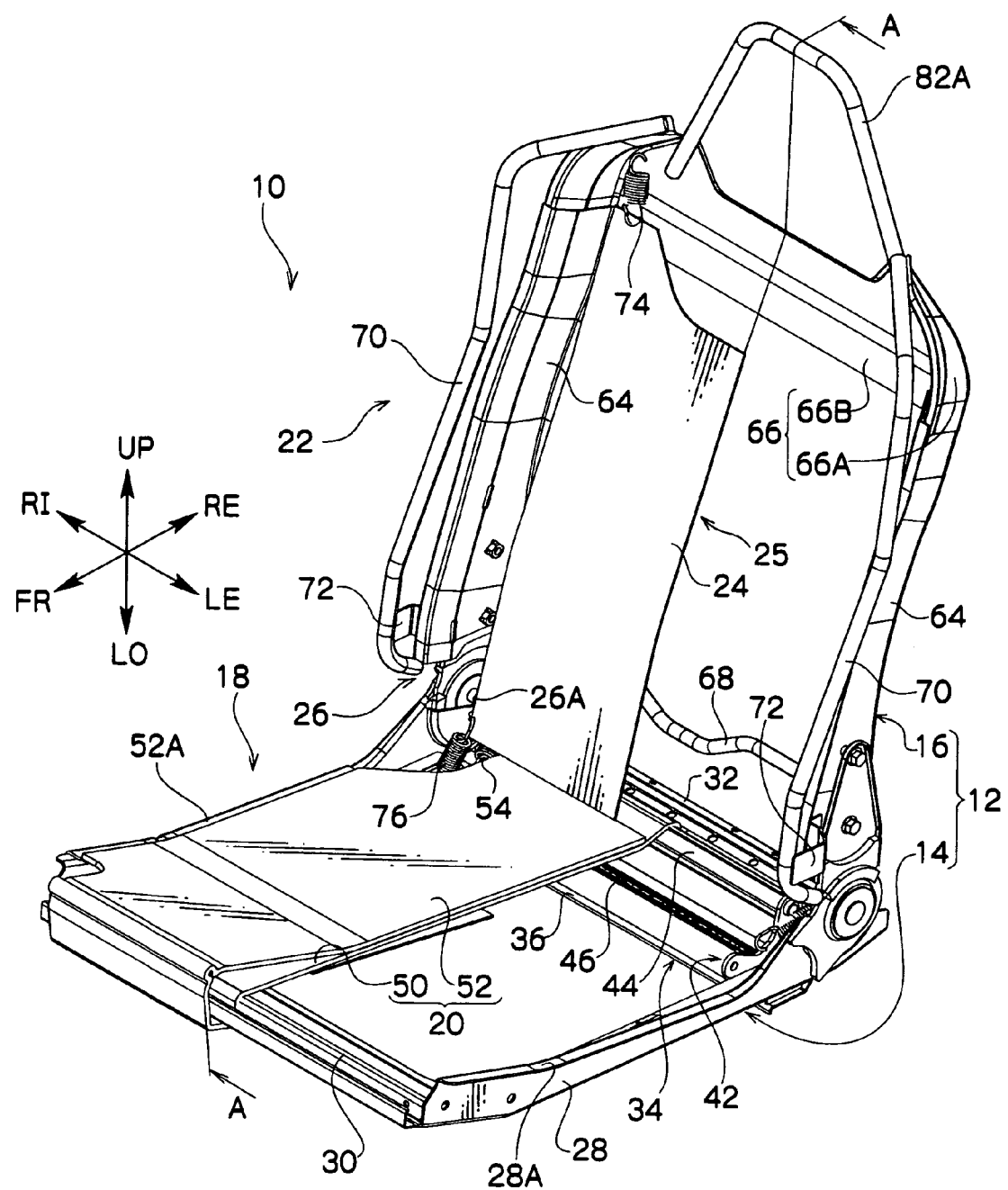
FIG. 40 is a perspective view of a vehicle seat relating to a second variant example of an embodiment of the present invention.
Figure 43:
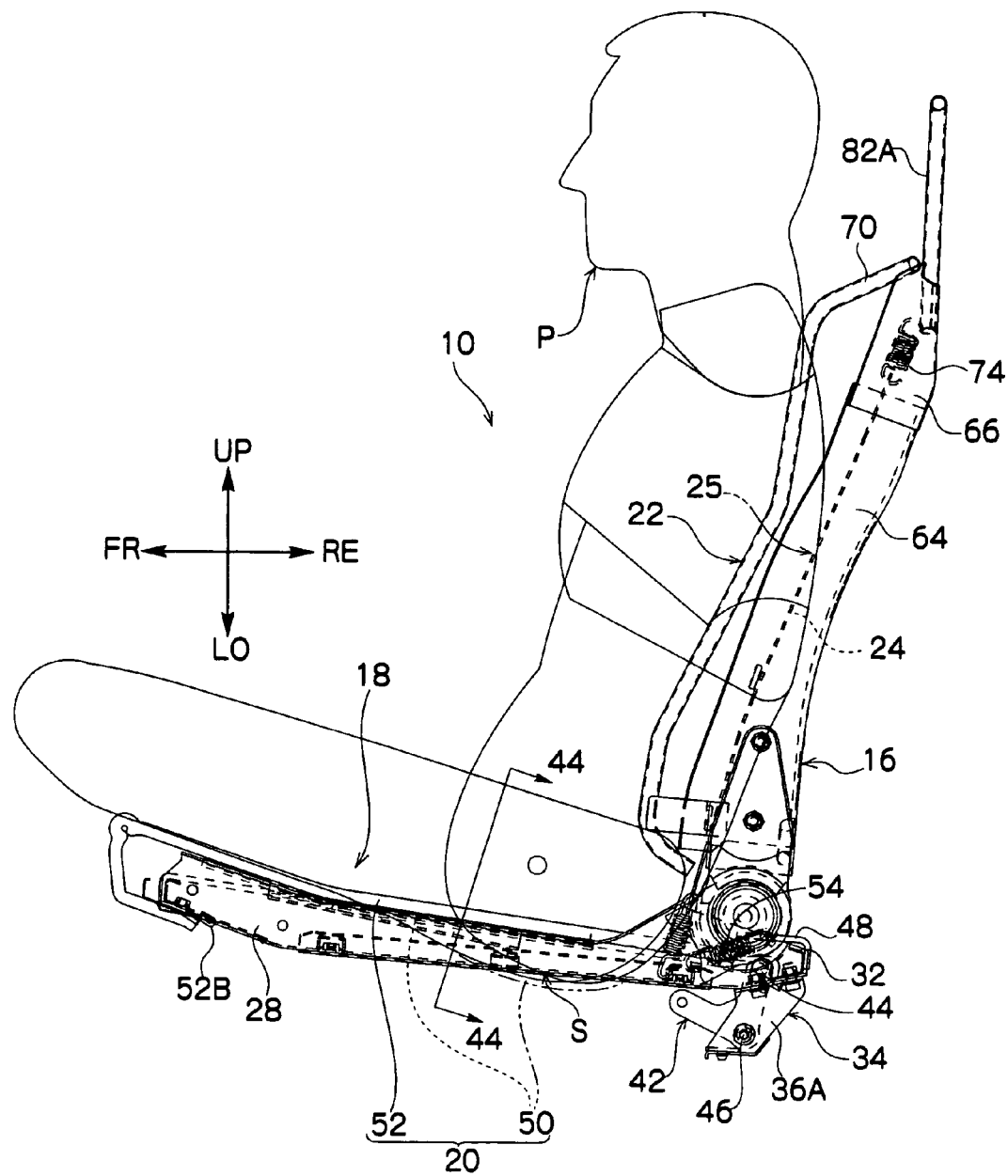
FIG. 43 is a side view showing a sitting state of the vehicle seat relating to the second variant example of an embodiment of the present invention.

Further, in this second variant example, the belt member 100 raises surface stiffness of the front portion of the lower layer sheet 50 in accordance with sitting, and formation of the dam-like member S forward of a position below the hipbone joints of the sitter is similar to the embodiment described above. Furthermore, in this second variant example, structures other than the above-described are completely the same as the embodiment described above, and the same effects as the embodiment described above are provided. Here, in FIGS. 40, 36 and 43, illustration of the tension coil springs 78 is omitted.

Here, for the above-described embodiment and the variant examples, preferable structures have been illustrated which achieve both vibration transmission characteristics which set a resonance frequency to approximately 3.5 Hz and attenuation characteristics in which up and down attenuation ratios ζd and ζu are caused to differ. However, the present invention is not limited to these, and structures which realizes at least one of these characteristics are sufficient.

Further, for the above-described embodiment and variant examples, preferable structures have been illustrated which are provided with the torsion bar 46, which is connected to the rear end of the lower layer sheet 50 via the movable frame 34, to serve as a resilient member which causes the back edge side of the lower layer sheet 50 to descend while being moved forward in accordance with sitting. However, the present invention is not limited to these, and it is also possible to employ other resilient members. Therefore, for example, another end portion of a tension coil spring of which one end portion is anchored at the sitting portion frame 14 may be connected to the connecting pipe 44, and a structure in which torsion coil springs are provided between the arm members 42 and the sitting portion frame 14 (the support bracket 36) is also possible. Further, guiding means which causes the back edge side of the lower layer sheet 50 to descend while being moved forward is not limited to the movable frame 34 which turns about the support shaft 38 and, for example, a guide member which simply moves the back edge side of the lower layer sheet 50 in a straight line form or the like is also acceptable.

Furthermore, for the above-described embodiment and the variant examples, preferable structures have been illustrated in which the cushion material 20 of the seat cushion 18 is a two-layer structure. However, the present invention is not limited to these. For example, the cushion material 20 may be structured of a single layer, and may be another layered structure of three layers or more. Further, the present invention is not limited to a structure in which the upper layer sheet 52 is combined with the skin material of the seat cushion 18. For example, the upper side of the upper layer sheet 52 may be covered with a skin material of leather or the like. It is also possible for this skin material to be integrated with the skin materials 62B of the side supports 62.

Further still, for the above-described embodiments and the variant examples, preferable structures have been formed which are provided with the tension coil springs 54 which impart tension to the two left-right direction edge portions of the lower layer sheet 50 in accordance with sitting. However, the present invention is not limited to these. Another resilient member may be provided instead of the tension coil springs 54, and a member corresponding to the tension coil springs 54 may be omitted.

Further, for the above-described embodiments and the variant examples, preferable structures have been illustrated in which the back portion cushion material 24 of the seat back 22 is a single-layer structure. However, the present invention is not limited to these. For example, the back portion cushion material 24 may be a multi-layer structure of two layers or more. Further, the back portion cushion material 24 is not limited to a structure which is connected to the back portion frame 16 via the tension coil springs 74, 76 and 78, and may be, for example, connected to the back portion frame 16 via other resilient members.

Furthermore, for the above-described embodiments and the variant examples, preferable structures have been illustrated in which two of the tension coil springs 78 corresponding to the third resilient member have been provided at different up-down positions at each side of left and right. However, the present invention is not limited to these. For example, one or three or more of the tension coil springs 78 may be provided at each side, and structures in which a resilient member corresponding to the third resilient member is omitted are also possible.

Furthermore, for the embodiment and variant examples described above, preferable structures have been formed which are provided with both the seat cushion 18 and the seat back 22 relating to the present invention. However the present invention is not limited to these. It is sufficient if at least one of the seat cushion 18 and the seat back 22 is provided.

Further still, for the embodiments and variant examples described above, structures have been formed in which the present invention is applied to the vehicle seat 10. However, the present invention is not limited to this, and can be applied to, for example, seats for various types of transport such as railroad vehicles, boats, aircraft and the like, various types of seat such as office chairs, domestic chairs and the like, and so forth.

EXPLANATION OF REFERENCE NUMERALS

10 Vehicle seat
14 Sitting portion frame
16 Back portion frame
18 Seat cushion
20 Cushion material
22 Seat back
24 Back portion cushion material
25 Backrest
42 Arm member (pivoting member)
44 Connecting pipe (pivoting member)
46 Torsion bar (resilient member)
50 Lower layer sheet (sheet material)
52 Upper layer sheet (sheet material)
54 Tension coil spring (other resilient member)
56 Belt member (sheet-form member)
74 Tension coil spring (first resilient member)
76 Tension coil spring (second resilient member)
78 Tension coil spring (third resilient member)
90 Belt member (sheet-form member)
100 Belt member (sheet-form member)
110 Three-dimensional woven fabric

The invention claimed is:

1. A seat structure comprising:
a sitting portion frame that is substantially flat;
a cushion material including a first sheet material, of which only (1) a front edge side is fixed directly to a front edge side of the sitting portion frame and (2) a back edge side is directly connected to a back edge side of the sitting portion frame via a resilient member extending along the back edge side substantially parallel to the front edge side; and
a second sheet material which is easier to stretch in a left-right direction rather than in a front-rear direction, which is tensioned onto left and right sides of the sitting portion frame at an upper side of the first sheet material, and which presses a region of the first sheet material corresponding to a buttock portion of a sitter such that the resilient member is deformed, wherein
the resilient member deforms such that the back edge side of the first sheet material moves forward or downward when a downward load acts on the cushion material, and
in a process where the second sheet material is displaced upward, the extension of the second sheet material in the left-right direction becomes smaller such that the seat structure has an attenuation ratio that is larger when the sitter displaces upward than an attenuation ratio when the sitter displaces downward.

2. The seat structure described in claim 1, wherein a vibration transmissibility is approximately 1 when a vibration in a resonance frequency of approximately 5 Hz is input via the sitting portion frame, and a vibration transmissibility is at most approximately 0.55 when a vibration in a frequency region of 8 Hz-13 Hz is input via the seat frame.

3. The seat structure described in claim 1, wherein a resonance frequency of a system including the sitter, the cushion material and the resilient member is in a range of at least 3 Hz and at most 4 Hz.

4. The seat structure described in claim 1, wherein the second sheet material is structured with a three-dimensional woven fabric or a two-dimensional woven fabric.

5. The seat structure described in claim 1, further comprising a pivoting member, of which a lower end side is supported at the back edge side of the sitting portion frame so as to be pivotable about a pivoting axis along a left-right direction of the sitting portion frame, and an upper end side is anchored at the back edge side of the first sheet material which is connected to the sitting portion frame via the resilient member,
the resilient member including a torsion bar which is provided at the pivoting axis of the pivoting member, and which resiliently twistingly deforms in accordance with pivoting of the pivoting member.

6. The seat structure described in claim 1, further comprising other resilient members which are provided between the back edge side of the sitting portion frame and two respective left-right direction edge portions at the back edge side of the first sheet material connected to the sitting portion frame via the resilient member, the other resilient members increasing a front-rear direction tension of the first sheet material accompanying sitting.

7. The seat structure described in claim 1, further comprising a sheet-form member, which is provided forward of a position corresponding to a hipbone joint of the sitter in a sitting state, and which, by tension which acts accompanying sitting restricts downward distorting of the first sheet material connected to the sitting, portion frame via the resilient member.

8. The seat structure described in claim 1, further comprising a seat back which includes:
a back portion frame which is a resilient structure;
a back portion cushion material;
first resilient members which respectively connect two left-right direction edge portions of an upper end side of the back portion cushion material to an upper end side of the back portion frame; and
second resilient members which respectively connect two left-right direction edge portions of a lower end side of the back portion cushion material to a lower end side of the back portion frame, and
the seat back being formed so as to support an upper body of a sitter by the resilient members.

9. The seat structure described in claim 1, wherein the cushion material has spring characteristics in which, in a stationary sitting state, a spring constant of a portion that supports a protrusion portion of a sitter is smaller than a spring constant of another portion.

10. A seat structure comprising:
a sitting portion frame that is substantially flat;
a cushion material including a first sheet material of which only a front edge side is fixed directly to a front edge side of the sitting portion frame;
a resilient member extending along a back edge side of the first sheet material substantially parallel to the front edge side, located between a rear portion of the sitting portion frame and the back end side, tensioning the first sheet material onto the sitting portion frame; and
a second sheet material which is easier to stretch in a left-right direction rather than in a front-rear direction, which is tensioned onto left and right sides of the sitting portion frame at an upper side of the first sheet material, and which presses a region of the first sheet material corresponding to a buttock portion of a sitter such that the resilient member is deformed, wherein
the resilient member deforms such that the back edge side of the first sheet material moves forward or downward when a downward load acts on the cushion material, and
in a process where the second sheet material is displaced upward, the extension of the second sheet material in the left-right direction becomes smaller such that the seat structure has an attenuation ratio that is larger when the sitter displaces upward than an attenuation ratio when the sitter displaces downward.

* * * * *